US007194105B2

(12) United States Patent
Hersch et al.

(10) Patent No.: US 7,194,105 B2
(45) Date of Patent: Mar. 20, 2007

(54) AUTHENTICATION OF DOCUMENTS AND ARTICLES BY MOIRÉ PATTERNS

(76) Inventors: Roger D. Hersch, Ecole Polytechnique Fédérale de Lausanne IC / LSP, Lausanne (CH) 1015; Sylvain Chosson, Ecole Polytechnique Fédérale de Lausanne IC / LSP, Lausanne (CH) 1015

( * ) Notice: Subject to any disclaimer, the term of this patent is extended or adjusted under 35 U.S.C. 154(b) by 881 days.

(21) Appl. No.: 10/270,546

(22) Filed: Oct. 16, 2002

(65) Prior Publication Data

US 2004/0076310 A1 Apr. 22, 2004

(51) Int. Cl.
*G06K 9/00* (2006.01)

(52) U.S. Cl. ...................................... 382/100; 713/176

(58) Field of Classification Search ................ 382/100, 382/135, 137, 181, 279; 283/17, 67, 72, 283/73, 85, 96, 91, 93, 107, 94, 902; 359/2, 359/23, 567, 619, 622, 623; 380/54, 26, 380/229, 232, 239, 247, 258, 281, 284; 713/155, 713/161, 168–170, 176

See application file for complete search history.

(56) References Cited

U.S. PATENT DOCUMENTS

| | | | | |
|---|---|---|---|---|
| 4,761,253 A | | 8/1988 | Antes | |
| 4,984,824 A | | 1/1991 | Antes et al. | |
| 5,018,767 A | | 5/1991 | Wicker | |
| 5,032,003 A | * | 7/1991 | Antes | 359/567 |
| 5,396,559 A | * | 3/1995 | McGrew | 380/54 |

(Continued)

FOREIGN PATENT DOCUMENTS

| | | |
|---|---|---|
| EP | 99114740.6-2202 | 7/1999 |
| GB | 1138011 | 12/1968 |
| WO | PCTIB02/02686 | 7/2002 |

OTHER PUBLICATIONS

U.S. Appl. No. 09/477,544, filed Jan. 4, 2000, Ostromoukhov, Hersch.

U.S. Appl. No. 09/902,445, filed Jun. 11, 2001, Amidror and Hersch.

(Continued)

*Primary Examiner*—Jingge Wu
*Assistant Examiner*—Abolfazi Tabatabai

(57) ABSTRACT

The present invention relies on the moiré patterns generated when superposing a base layer made of base band patterns and a revealing line grating (revealing layer). The produced moiré patterns comprise an enlargement and a transformation of the individual patterns located within the base bands. Base bands and revealing line gratings may be rectilinear or curvilinear. When translating or rotating the revealing line grating on top of the base layer, the produced moiré patterns evolve smoothly, i.e. they may be smoothly shifted, sheared, and possibly be subject to further transformations. Base band patterns may incorporate any combination of shapes, intensities and colors, such as letter, digits, text, symbols, ornaments, logos, country emblems, etc. . . . . They therefore offer great possibilities for creating security documents and valuable articles taking advantage of the higher imaging capabilities of original imaging and printing systems, compared with the possibilities of the reproduction systems available to potential counterfeiters. Since the revealing line grating reflects a relatively high percentage of the incident light, the moiré patterns are easily apparent in reflective mode and under normal illumination conditions. They may be used for the authentication of any kinds of documents (banknotes, identity documents, checks, diploma, travel documents, tickets) and valuable articles (optical disks, CDs, DVDs, CD-ROMs, packages for medical drugs, bottles, articles with affixed labels).

24 Claims, 35 Drawing Sheets

U.S. PATENT DOCUMENTS

| | | | | |
|---|---|---|---|---|
| 5,712,731 | A * | 1/1998 | Drinkwater et al. | 359/619 |
| 5,995,638 | A * | 11/1999 | Amidror et al. | 382/100 |
| 6,249,588 | B1 | 6/2001 | Amidror et al. | |
| 6,273,473 | B1 | 8/2001 | Taylor et al. | |
| 6,692,030 | B1 * | 2/2004 | Phillips | 283/91 |

OTHER PUBLICATIONS

U.S. Appl. No. 09/902,227, filed Jul. 11, 2001, Hersch and Wittwer.

U.S. Appl. No. 09/998,229, Dec. 3, 2001, Hersch et al.

U.S. Appl. No. 10/183,550, filed Jun. 28, 2002, Amidror.

I. Amidror and R.D. Hersch, Fourier-based analysis and synthesis of moirés in the superposition of geometrically transformed periodic structures, Journal of the Optical Society of America A, vol. 15, 1998; pp. 1100-1113.

I. Amidror, The Theory of the Moiré Phenomenon, Kluwer Academic Publishers, 2000, p. 21, pp. 353-360.

I. Amidror, R.D. Hersch, Quantitative analysis of multichromatic moiré effects in the superposition of coloured periodic layers, Journal of Modern Optics, vol. 44, No. 5, 1997, 883-899.

R.N. Bracewell, Two Dimensional Imaging, Prentice Hall, 1995, pp. 120-122.

W. Hospel, Application of laser technology to introduce security features on security in order to reduce counterfeiting, SPIE vol. 3314, 1998, pp. 254-259.

H.R. Kang, Digital Color Halftoning, SPIE Press, 1999, pp. 214-225, 279-282.

O. Mikami, New imaging functions of Moiré by fly's eye lenses, Japan Journal of Applied Physics, vol. 14, No. 3, 1975; pp. 417-418.

O. Mikami, New image-rotation using Moiré lenses, Japan Journal of Applied Physics, vol. 14, No. 7, 1975; pp. 1065-1066.

J.F. Moser, Document Protection by Optically Variable Graphics (Kinemagram), in Optical Document Security, Ed. R.L. Van Renesse, Artech House, London, 1998, pp. 247-266.

K. Patorski, The moiré Fringe Technique, Elsevier 1993, pp. 14-21.

G. Oster, The Science of moiré Patterns, Edmund Scientific, 1969.

V. Ostromoukhov and R.D. Hersch, Artistic screening, SIGGRAPH Annual Conference, 1995, pp. 219-228.

V. Ostromoukhov and R. D. Hersch, Multi-color and artistic dithering, SIGGRAPH Annual Conference, 1999, pp. 425-432.

N. Rudaz, R.D. Hersch, Protecting identity documents with a just noticeable microstructure, Conf. Optical Security and Counterfeit Deterrence Techniques IV, 2002, SPIE vol. 4677, pp. 101-109.

B. Saleh, M.C. Teich, Fundamentals of Photonics, John Wiley, 1991, p. 116.

Thomas Sederberg, "A Physically Based Approach to 2D Shape Blending", Proc. Siggraph'92, Computer Graphics, vol. 26, No. 2, Jul. 1992, 25-34.

Oleg Veryovka and John Buchanan, "Texture-based Dither Matrices", Computer Graphics Forum, vol. 19, No. 1, 2000, 51-64.

* cited by examiner

AUTHENTICATION OF DOCUMENTS AND ARTICLES BY MOIRÉ PATTERNS

BACKGROUND OF THE INVENTION

The present invention relates generally to the field of anticounterfeiting and authentication methods and devices and, more particularly, to methods, security devices and apparatuses for authentication of documents and valuable articles by moiré patterns.

Counterfeiting of documents such as banknotes is becoming now more than ever a serious problem, due to the availability of high-quality and low-priced color photocopiers and desk-top publishing systems. The same is also true for other valuable products such as CDs, DVDs, software packages, medical drugs, etc., that are often marketed in easy to falsify packages.

The present invention is concerned with providing a novel security element and authentication means offering enhanced security for banknotes, checks, credit cards, identity cards, travel documents, industrial packages or any other valuable articles, thus making them much more difficult to counterfeit.

Various sophisticated means have been introduced in the prior art for counterfeit prevention and for authentication of documents or valuable articles. Some of these means are clearly visible to the naked eye and are intended for the general public, while other means are hidden and only detectable by the competent authorities, or by automatic devices. Some of the already used anti-counterfeit and authentication means include the use of special paper, special inks, watermarks, micro-letters, security threads, holograms, etc. Nevertheless, there is still an urgent need to introduce further security elements, which do not considerably increase the cost of the produced documents or goods.

Moiré effects have already been used in prior art for the authentication of documents. For example, United Kingdom Pat. No. 1,138,011 (Canadian Bank Note Company) discloses a method which relates to printing on the original document special elements which, when counterfeited by means of halftone reproduction, show a moiré pattern of high contrast. Similar methods are also applied to the prevention of digital photocopying or digital scanning of documents (for example, U.S. Pat. No. 5,018,767, inventor Wicker). In all these cases, the presence of moiré patterns indicates that the document in question is counterfeit. Other prior art methods, on the contrary, take advantage of the intentional generation of a moiré pattern whose existence, and whose precise shape, are used as a means of authenticating the document. One known method in which a moiré effect is used to make visible an image encoded on the document (as described, for example, in the section "Background" of U.S. Pat. No. 5,396,559 (McGrew)) is based on the physical presence of that image on the document as a latent image, using the technique known as "phase modulation". In this technique, a uniform line grating or a uniform random screen of dots is printed on the document, but within the pre-defined borders of the latent image on the document the same line grating (or respectively, the same random dot-screen) is printed in a different phase, or possibly in a different orientation. For a layman, the latent image thus printed on the document is hard to distinguish from its background; but when a revealing transparency comprising an identical, but unmodulated, line grating (respec-methods are also applied to the prevention of digital photocopying or digital scanning of documents (for example, U.S. Pat. No. 5,018,767, inventor Wicker). In all these cases, the presence of moiré patterns indicates that the document in question is counterfeit. Other prior art methods, on the contrary, take advantage of the intentional generation of a moiré pattern whose existence, and whose precise shape, are used as a means of authenticating the document. One known method in which a moiré effect is used to make visible an image encoded on the document (as described, for example, in the section "Background" of U.S. Pat. No. 5,396,559 (McGrew)) is based on the physical presence of that image on the document as a latent image, using the technique known as "phase modulation". In this technique, a uniform line grating or a uniform random screen of dots is printed on the document, but within the pre-defined borders of the latent image on the document the same line grating (or respectively, the same random dot-screen) is printed in a different phase, or possibly in a different orientation. For a layman, the latent image thus printed on the document is hard to distinguish from its background; but when a revealing transparency comprising an identical, but unmodulated, line grating (respectively, random dot-screen) is superposed on the document, thereby generating a moiré effect, the latent image pre-designed on the document becomes clearly visible, since within its pre-defined borders the moiré effect appears in a different phase than in the background. However, this previously known method has the major flaw of being simple to simulate, since the form of the latent image is physically present on the document and only filled by a different texture. A second limitation of this technique resides in the fact that there is no enlargement effect: the pattern image revealed by the superposition of the base layer and of the revealing transparency has the same size as the latent image.

In U.S. Pat. No. 5,712,731 (Drinkwater et al.) a moiré based method is disclosed which relies on a periodic 2D array of microlenses. However, this last disclosure has the disadvantage of being limited only to the case where the superposed revealing structure is a microlens array and the periodic structure on the document is a constant 2D dot-screen with identical dot-shapes replicated horizontally and vertically. Thus, in contrast to the present invention, that invention excludes the use of gratings of lines as the revealing layer, both imaged on a transparent support (e.g., film) or as a grating of cylindric microlenses. Furthermore, that invention does not allow to create, as in the present invention, a document with a base layer comprising patterns-made of varying shapes, intensities and colors.

Other moiré based methods disclosed by Amidror and Hersch in U.S. Pat. No. 6,249,588 and its continuation-in-part U.S. Pat. No. 5,995,638 rely on the superposition of arrays of screen dots which yields a moiré intensity profile indicating the authenticity of the document. These inventions are based on specially designed 2D periodic structures, such as dot-screens (including variable intensity dot-screens such as those used in real, gray level or color halftoned images), pinhole-screens, or microlens arrays, which generate in their superposition periodic moiré intensity profiles of chosen colors and shapes (typographic characters, digits, the country emblem, etc.) whose size, location and orientation gradually vary as the superposed layers are rotated or shifted on top of each other.

In a third invention, U.S. patent application Ser. No. 09/902,445, Amidror and Hersch disclose new methods improving their previously disclosed methods mentioned above. These new improvements make use of the theory developed in the paper "Fourier-based analysis and synthesis of moirés in the superposition of geometrically transformed periodic structures" by I. Amidror and R. D. Hersch, Journal of the Optical Society of America A, Vol. 15, 1998, pp. 1100–1113 (hereinafter, "[Amidror98]"), and in the book "The Theory of the Moiré Phenomenon" by I. Amidror, Kluwer, 2000 (hereinafter, "[Amidror00]"). According to this theory, said invention discloses how it is possible to synthesize aperiodic, geometrically transformed dot screens which in spite of being aperiodic in themselves, still generate, when they are superposed on top of one another, periodic moiré intensity profiles with undistorted elements, just like in the periodic cases disclosed by Hersch and Amidror in their previous U.S. Pat. No. 6,249,588 and its continuation-in-part U.S. Pat. No. 5,995,638. U.S. patent application Ser. No. 09/902,445 further disclosed how cases which do not yield periodic moirés can still be advantageously used for anticounterfeiting and authentication of documents and valuable articles.

In U.S. patent application Ser. No. 10/183,550 "Authentication with build-in encryption by using moiré intentsity profiles between random layers", inventor Amidror discloses how a moiré intensity profile is generated by the superposition of two specially designed random or pseudorandom dot screens. An advantage of that invention relies in its intrinsic encryption system offered by the random number generator used for synthesizing the specially designed random dot screens.

However, the disclosures above made by inventors Hersch and Amidror (U.S. Pat. No. 6,249,588, U.S. Pat. No. 5,995,638. U.S. patent application Ser. No. 09/902,445) or Amidror (U.S. application Ser. No. 10/183,550) making use of the moiré intensity profile to authenticate documents have two drawbacks. The first drawback is due to the fact that the revealing layer is made of dot screens, i.e. of a set (2D array) of tiny dots laid out on a 2D surface. When dot screens are embodied by an opaque layer with tiny transparent dots or holes (e.g. a film with small transparent dots), only a limited amount of light is able to traverse the dot screen and the resulting moiré intensity profile is not easily visible. In these inventions, to make the moiré intensity profile clearly visible, one needs to work in transparent mode; both the revealing and the base layers need to placed in front of a light table and the base layer should be preferably printed on a partly transparent support. In reflective mode, when the revealing layer is embodied by an opaque layer with tiny transparent dots or holes, the moiré intensity profile can hardly be seen. In reflective mode, one needs to use of a microlens array as master screen. In that case, due to the light focussing capabilities of the microlenses, the moiré intensity profile becomes clearly visible. The second drawback is due to the fact that the base layer is made of a two-dimensional array of similar dots (dot screen) where each dot has a very limited space within which one or a very small number of tiny shapes such as typographic characters, digits or logos must be placed. This space is limited by the 2D frequency of the dot screen, i.e. by its two period vectors. The higher the 2D frequency, the less space there is for placing the tiny shapes which, when superposed with a 2D circular dot screen as revealing layer, produce as 2D moiré an enlargement of these tiny shapes. Nevertheless, high enough frequencies are needed to ensure a good protection against counterfeiting attempts.

The present disclosure is based on the discovery that a band grating incorporating original shapes superposed with a revealing line grating yields a band moiré comprising moiré shapes which are a linear or possibly non-linear transformation of the original shapes incorporated into the band grating. Since band moiré have a much better light efficiency than moiré intensity profiles relying on dots screens, the present invention can be advantageously used in all case where the previous disclosures fail to show strong enough moiré patterns. In particular, the base band grating incorporating the original pattern shapes may be printed on a reflective support and the revealing line screen may simply be a film with thin transparent lines. Due to the high light efficiency of the revealing line screen, the strong band moiré patterns representing the transformed original band patterns are clearly revealed. A further advantage of the present invention resides in the fact that the produced moiré may comprise a large number of patterns, for example a text sentence (several words) or a paragraph of text.

It should be stressed that the present invention completely differs from the above mentioned technique of phase modulation (U.S. Pat. No. 5,396,559, McGrew) since in the present invention no latent image is present on the document and since the resulting band moiré is a transformation of the original pattern shapes embedded within the base band grating. This transformation comprises always a scaling transformation (enlargement), and possibly a mirroring, a shearing and/or a bending transformation.

Let us also note that the properties of the moiré produced by the superposition of two line gratings are well known (see for example K. Patorski, The moiré Fringe Technique, Elsevier 1993, pp. 14–16). Moiré fringes (moiré lines) produced by the superposition of two line gratings (i.e. set of lines) are exploited for example for the authentication of banknotes as disclosed in U.S. Pat. No. 6,273,473, Self-verifying security documents, inventors Taylor et al.

In the present invention, instead of using a line grating as base layer, we use as base layer a band grating incorporating original patterns of varying shapes, sizes, intensities and possibly colors. Instead of obtaining simple moiré fringes (moiré lines) when superposing the base layer and the revealing line grating, we obtain band moiré patterns which are enlarged and transformed instances of the original band patterns.

It should be noted that the approach on which the present invention is based further differs from prior methods relying on the moiré intensity profile by being able to compute and therefore predict the generated moiré pattern image from the base band image and the parameters of the revealing layer without necessarily needing to analyze the moiré in the Fourier space.

SUMMARY

The present invention relates to security documents (such as banknotes, checks, trust papers, securities, identification cards, passports, travel documents, tickets, etc.) and valuable articles (such as optical disks, CDs, DVDs, software packages, medical products, etc.) which need advanced authentication means in order to prevent counterfeiting attempts. The invention also relates new methods, apparatuses and computing systems for authenticating such documents or valuable articles.

The present invention relies on the moiré patterns generated when superposing a base layer made of base band patterns and a revealing line grating (revealing layer). The produced moiré patterns are a transformation of the individual patterns incorporated within the base bands, said transformation comprising an enlargement. When translating or rotating the revealing line grating on top of the base layer, the produced moiré patterns evolve smoothly, i.e. they are smoothly shifted, sheared, and possibly subject to further transformations. Base band patterns may incorporate any combination of shapes, intensities and colors, such as letter, digits, text, symbols, ornaments, logos, country emblems, etc. . . . They therefore offer great possibilities for creating security documents and valuable articles taking advantage of the higher imaging capabilities of original imaging and printing systems, compared with the possibilities of the reproduction systems available to potential counterfeiters.

The present invention teaches various methods for the creation of base band patterns and describes the moiré patterns that are to be expected for a given base band period, a given revealing line grating period and a given angle between base band layer and revealing line grating. It also shows that geometric transformations may be applied to the base band layer and possibly to the revealing layer in order to create either curvilinear or possibly straight moiré patterns. Due to the additional parameters required to describe the geometric transformations, they present an increase robustness against possible counterfeiting attempts and at the same time allow to produce individualized pairs of base and revealing layers.

The patterns incorporated within successive base bands may either be identical or slightly evolve from one base band to the next. If they slightly evolve, the resulting moiré patterns will also evolve from one instance to the next.

A possible additional variant of the present invention is the synthesis of a dithered image (gray or color), dithered with a dither matrix incorporating the desired base band patterns (microstructure). The dithering process may create within the base bands patterns of gradually varying sizes and shapes according to the local intensity (or color) of the image to be dithered.

Alternately, the dither process may modify the intensity of the patterns or of their background according to the local intensity of the image to be dithered. Without revealing layer, an image dithered with such a dither matrix appears as the original image. With the revealing layer superposed on top of the dithered image, the moiré patterns are revealed and allow to verify the authenticity of the document.

To further enhance the security of documents, multicolor dithering allows to synthesize a base band layer with non-overlapping shapes of different colors, for example created with nonstandard inks, such as iridescent or metallic inks, which are not available in standard color copiers or printers.

One further variant of the present invention is the combination of several sets of base bands on the same base layer for example at different orientations and possibly periods, yielding, when revealed by one or several line gratings, different moiré patterns.

An additional variant of the present invention is the synthesis of multi-pattern moiré. It relies on the incorporation of several base band patterns at different phases within the base band layer. This creates a base band with multiple interlaced patterns. The produced moiré patterns comprise transformed and blended instances of the multiple interlaced patterns. If the patterns represent intermediate stages of a blending (or morphing) between two fundamental shapes, then the multi-pattern moiré will yield a moiré image that evolves between these two fundamental shapes. Multi-pattern moiré may also be generated by images dithered with a dither matrix incorporating multi-pattern base bands.

The present invention also concerns new methods for authenticating documents which may be printed on various supports, opaque or transparent materials. It should be noted that the term "documents" refers throughout the present disclosure to all possible printed articles, including (but not limited to) banknotes, passports, identity cards, credit cards, labels, optical disks, CDs, DVDs, packages of medical drugs or of any other commercial products, etc. Let us describe several embodiments of particular interest given here by the way of example, without limiting the scope of the invention to these particular embodiments.

In one embodiment of the present invention, the moiré pattern shapes can be visualized by superposing a base layer and a revealing layer which are both located on two different areas of the same document, where the base layer is either opaque or transparent, and where the revealing layer is made of a partly transparent line grating. In a second embodiment of the present invention, only the base layer (opaque or transparent) appears on the document itself, and the revealing layer is superposed on it by the human operator or the apparatus which visually, optically or electronically validates the authenticity of the document. In a third embodiment of this invention, the revealing layer is a sheet of cylindric microlenses. Such microlenses offer a higher light efficiency and allow to reveal moiré patterns whose base band patterns are imaged at a higher frequency on the base band layer. In a forth embodiment of the invention, the base layer may be reproduced on an optically variable device and revealed by a line grating, embodied by a partly transparent support, by cylindric microlenses, or by a diffractive device emulating cylindric microlenses.

The fact that the generated moiré patterns are very sensitive to any microscopic variations in the base and revealing layers makes any document protected according to the present invention extremely difficult to counterfeit, and serves as a means to distinguish between a real document and a falsified one.

Since the base layer which appears on the document in accordance with the present invention may be printed like any halftoned image using a standard or slightly enhanced printing process, little or no additional cost is incurred in the document production.

In the present disclosure different variants of the invention are described, some of which may be disclosed for the use of the general public (hereinafter: "overt" features), while other variants may be hidden (for example one of the set of base bands in a base layer combining multiple sets of base bands) and only detected by the competent authorities or by automatic devices (hereinafter: "covert" features).

BRIEF DESCRIPTION OF THE DRAWINGS

For a better understanding of the present invention, one may refer by way of example to the accompanying drawings, in which.

DETAILED DESCRIPTION OF THE INVENTION

In U.S. Pat. No. 6,249,588, its continuation-in-part U.S. Pat. No. 5,995,638, U.S. patent application Ser. No. 09/902,445, Amidror and Hersch, and in U.S. patent application Ser. No. 10/183,550, Amidror disclose methods for the authentication of documents by using the moiré intensity profile. These methods are based on specially designed two-dimensional structures (dot-screens, pinhole-screens, microlens structures), which generate in their superposition two-dimensional moiré intensity profiles of any preferred colors and shapes (such as letters, digits, the country emblem, etc.) whose size, location and orientation gradually vary as the superposed layers are rotated or shifted on top of each other. In reflective mode and with a revealing layer (called master screen in the above mentioned inventions) embodied by an opaque layer with tiny transparent dots or holes (e.g. a film with tiny transparent holes), the amount of reflected light is too low and therefore the moiré shapes are nearly invisible. In addition, in these inventions, the base layer is made of a set (2D array) of similar dots (dot screen) where each dot has a very limited space within which one or a very small number of tiny shapes such as characters, digits or logos must be placed. This space is limited by the 2D frequency of the dot screen, i.e. by its two period vectors. The higher the 2D frequency, the less space there is for placing the tiny shapes which, when superposed with a 2D circular dot screen as revealing layer, produce as 2D moiré an enlargement of these tiny shapes.

Figure 1A:
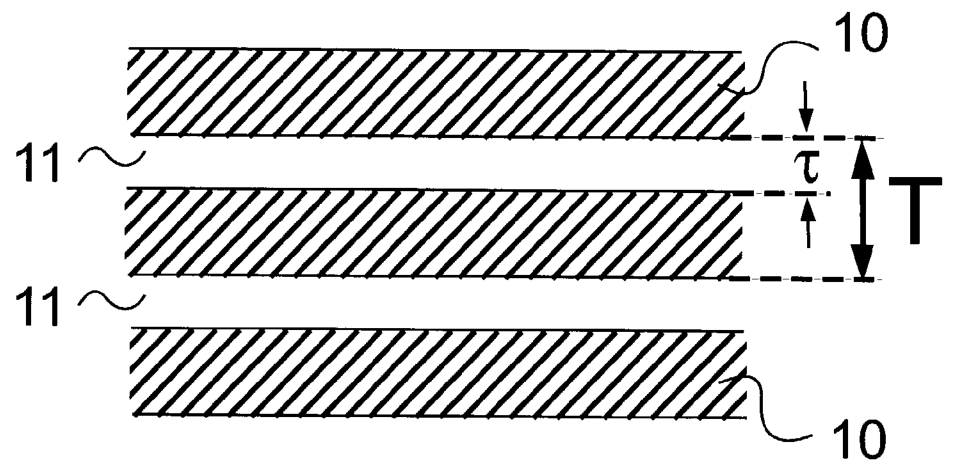
FIGS. 1A and 1B show respectively a grating of transparent lines and a 2D circular dot screen.
Figure 1B:
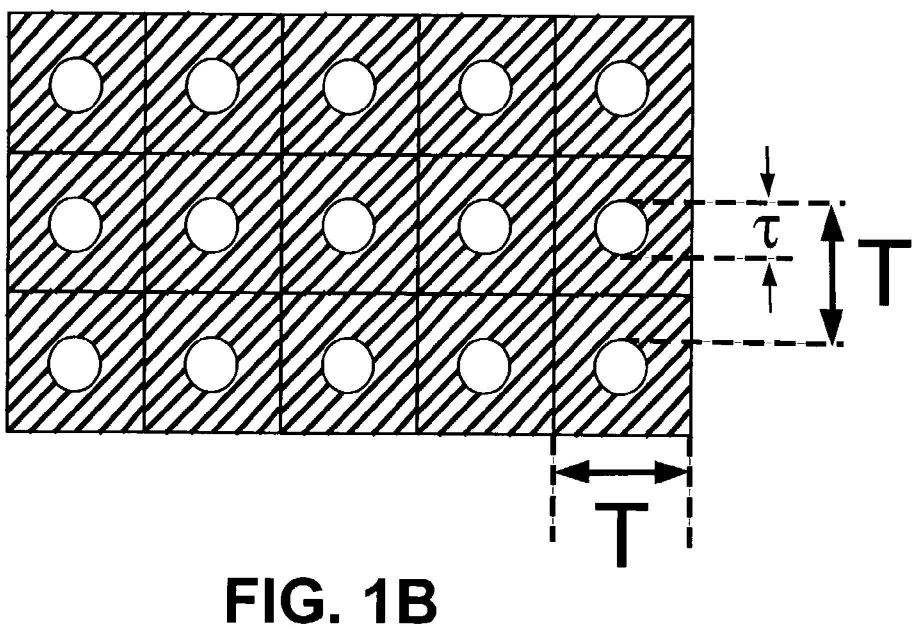

To make the moiré patterns visible under normal light conditions, in reflective mode or in transparent mode without a light table, the present inventors disclose a new category of moiré based methods, in which the base layer is formed by bands incorporating original patterns and the revealing layer is made of a grating of transparent lines. Such a grating is shown in FIG. 1A, where the transparent lines 11 have an aperture $\tau$ and the opaque parts 10 have a width $T-\tau$. The moiré patterns, representing the enlarged and transformed original patterns, are very well visible because much more light is able to pass through a grating of transparent lines than through a 2D circular dot screen. For a revealing line grating of period T and aperture $\tau$ (FIG. 1A), the relative amount of light able to pass through the transparent part of the grating is $\tau/T$. For a revealing grating made of a dot screen, i.e. horizontally and vertically repeated circular dots with horizontal and vertical repetition period T, and with a dot diameter $\tau$ (FIG. 1B), the relative amount of light able to pass through the transparent part of the dot screen is $(\pi/4)*(\tau/T)^2$. When comparing the two methods, a line grating allows $(4/\pi)*(T/\tau)$ times more light to pass through its aperture than the corresponding 2D circular dot screen. With an aperture $\tau/T$ of 1/4, 5.09 times more light passes through the line grating aperture than through the 2D circular dot screen. With an aperture of $\tau/T$ of 1/6, the corresponding ratio is 7.6 and with an aperture of $\tau/T=1/10$, the corresponding ratio is 12.7. Please note that the smaller the aperture, the sharper the revealed moiré patterns.

Figure 2:
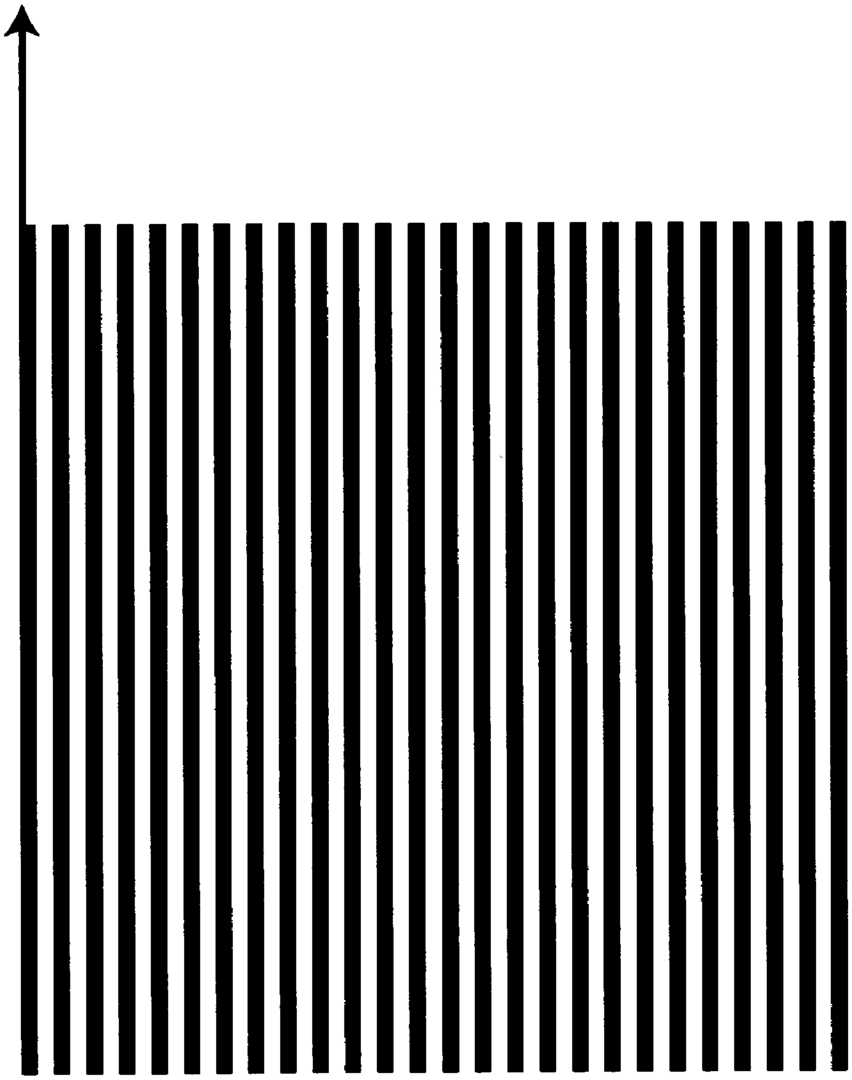
FIG. 2 shows the generation of moiré fringes when two line gratings are superposed (prior art)
Figure 3:
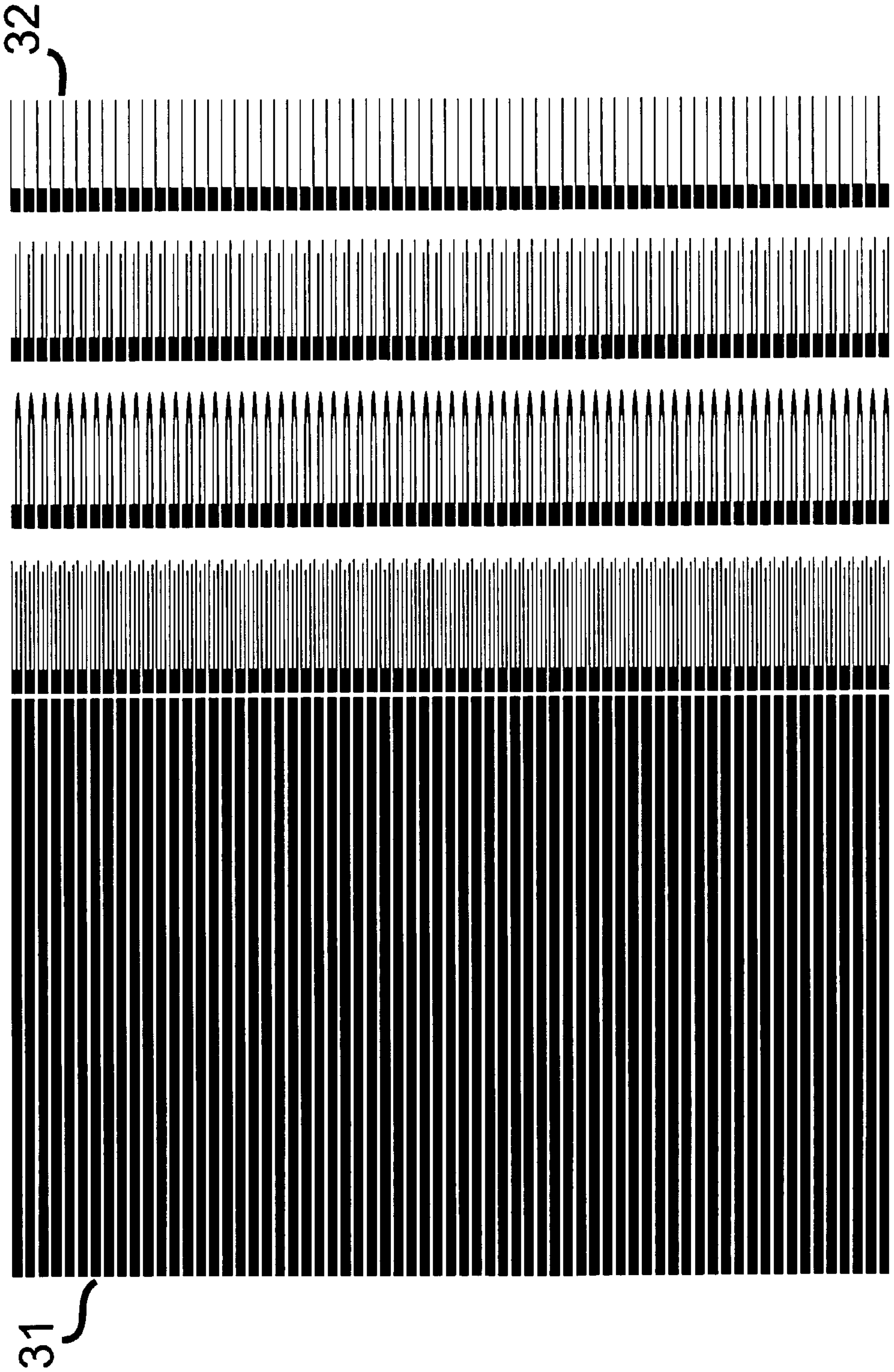
FIG. 3 shows the moiré fringes and moiré patterns generated by the superposition of a revealing line grating and of a base layer incorporating a grating of lines on the left side and base bands with the patterns "EPFL" on the right side.
Figure 4:
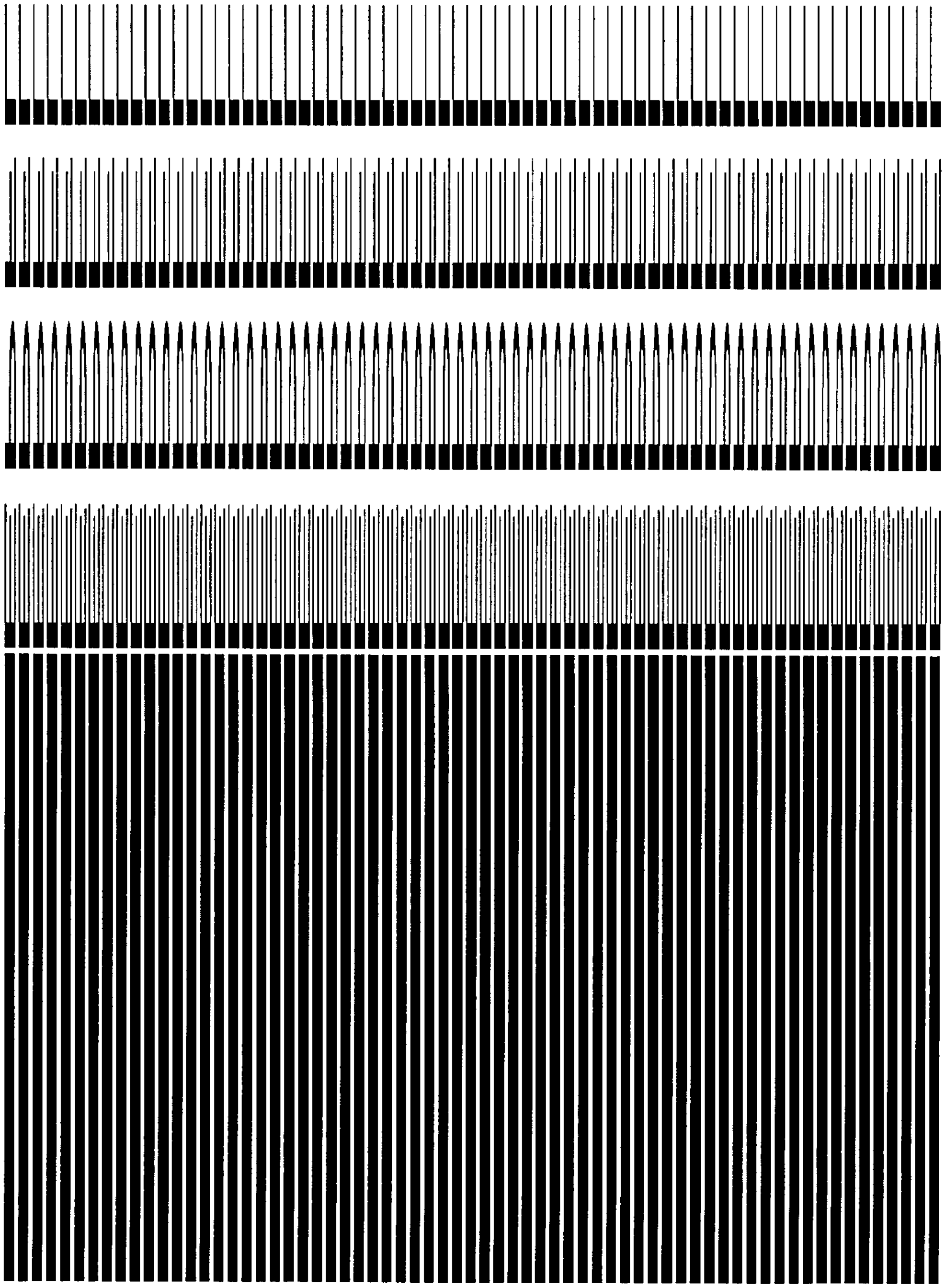
FIG. 4 shows separately the base layer of FIG. 3.
Figure 5:
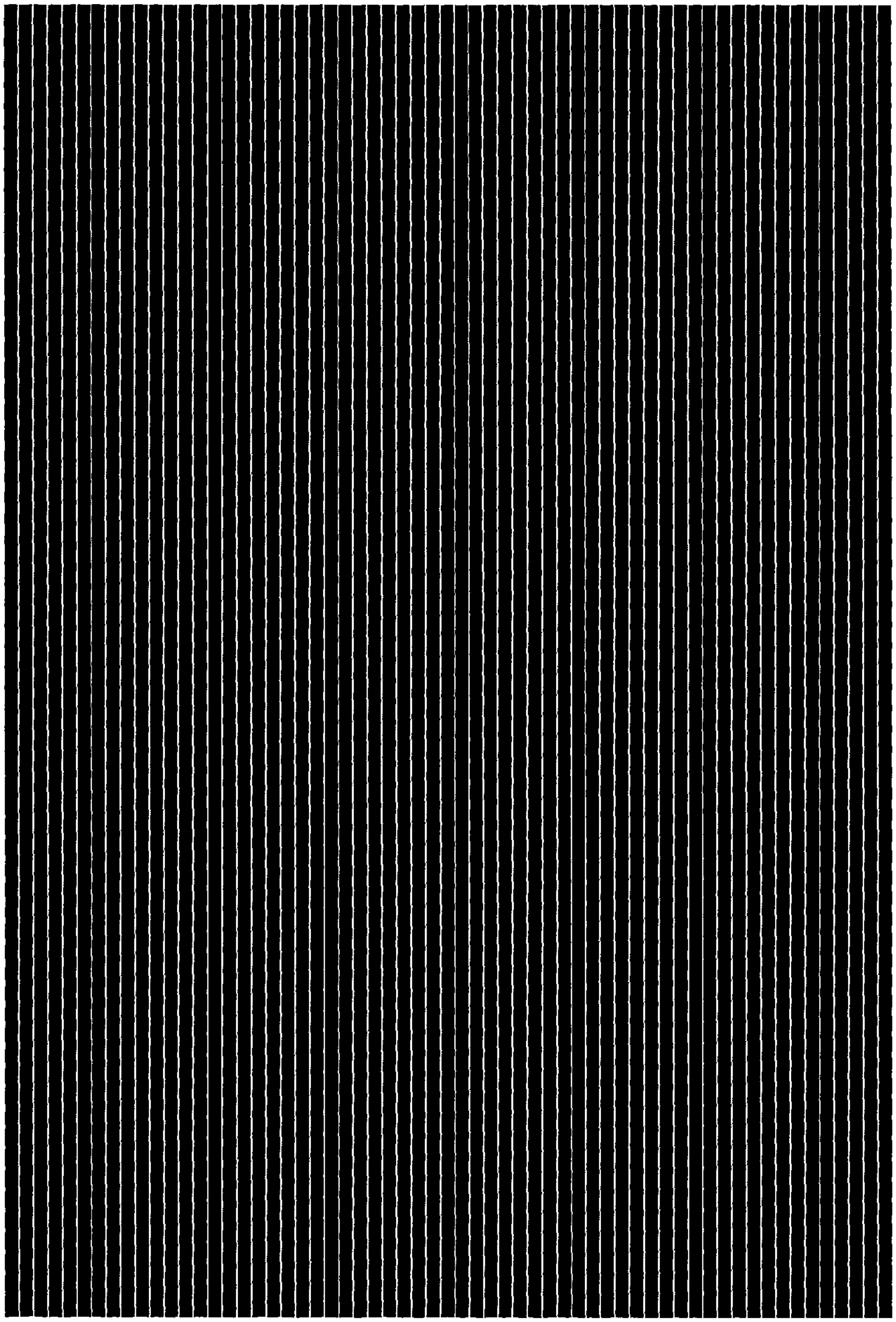
FIG. 5 shows separately the revealing layer of FIG. 3.

It is well known from the prior art that the superposition of two line gratings generates moiré fringes, i.e. moiré lines as shown in FIG. 2 (see for example K. Patorski, The Moiré Fringe Technique, Elsevier 1993, pp. 14–16). In the present invention, we extend the concept of line grating to band grating. A band of width T1 corresponds to one line instance of a line grating (of period T1) and may incorporate as original shapes any kind of patterns, which may vary along the band, such as black white patterns (e.g. typographic characters), variable intensity patterns and color patterns. For example, in FIG. 3, a line grating 31 and its corresponding band grating 32 incorporating in each band the vertically compressed and mirrored letters EPFL are shown. When revealed with a revealing line grating 33, one can observe on the left side the well known moiré fringe 35 and on the right side, band moiré patterns 34 (EPFL), which are an enlargement and transformation of the letters located in the base bands. These band moiré patterns 34 have the same orientation and repetition period as the moiré fringes 35. FIG. 4 gives the base layer of FIG. 3 and FIG. 5 gives its revealing layer. The revealing layer (line grating) may be photocopied on a transparent support and placed on top of the base layer. The reader may verify that when shifting the revealing line grating vertically, the band moiré patterns also undergo a vertical shift. When rotating the revealing line grating, the band moiré patterns are subject to a shearing and their global orientation is accordingly modified.

FIG. 3 also shows that the base band layer (or more precisely a single set of base bands) has only one spatial frequency component given by period T1. Therefore, while the space between each band is limited by period T1, there is no spatial limitation along the long side of the band. Therefore, a large number of patterns, for example a text sentence, may be place along each band. This is an important advantage over the prior art moiré profile based authentication methods relying on two-dimensional structures (U.S. Pat. No. 6,249,588, its continuation-in-part U.S. Pat. No. 5,995,638, U.S. patent application Ser. No. 09/902,445, Amidror and Hersch, and in U.S. patent application Ser. No. 10/183,550, Amidror).

In the section "Geometry of straight band grating moirés", we show that a revealing layer made of a straight line grating (set of transparent lines) generates as band moiré patterns a linear transformation of the original patterns located within the individual bands. This transformation comprises an enlargement, possibly a mirroring, and possibly a shearing of the original patterns.

Figure 6A:
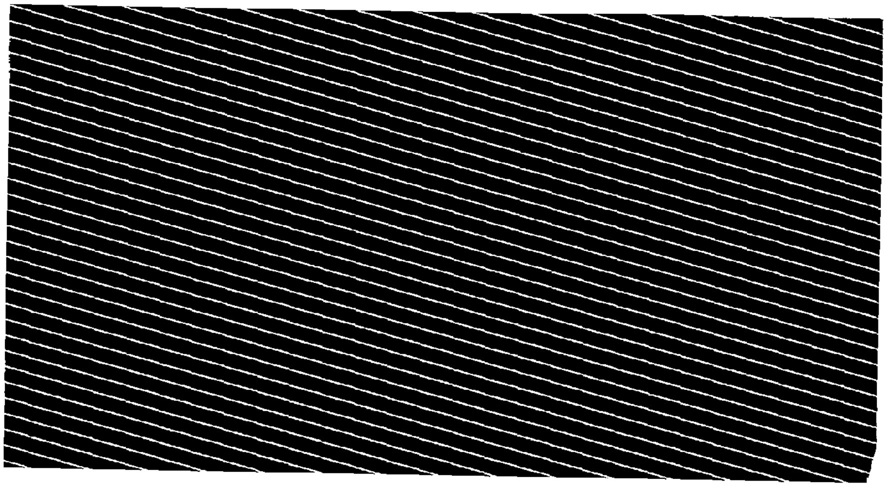
FIGS. 6A, 6B and 6C illustrate how the superposition of a revealing line grating with an oblique orientation and of a horizontal base layer with replicated base band patterns produces horizontal moiré patterns.
Figure 6B:
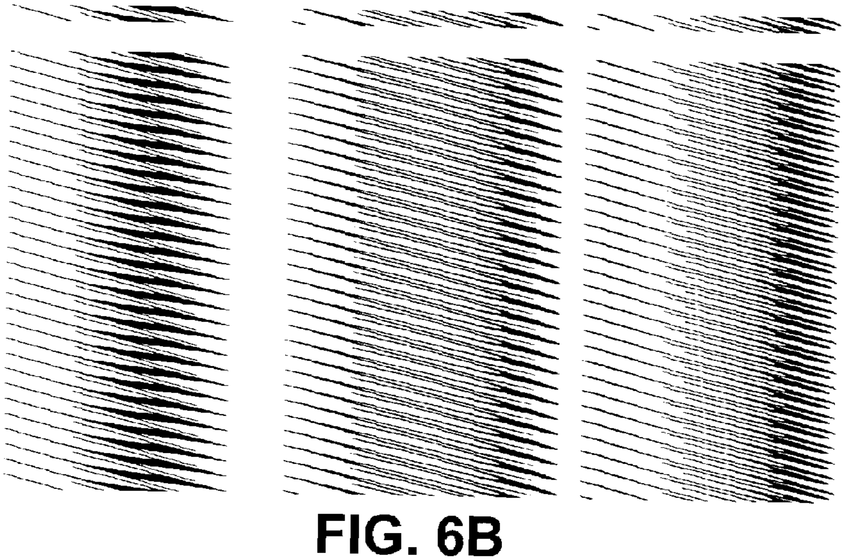
Figure 6C:
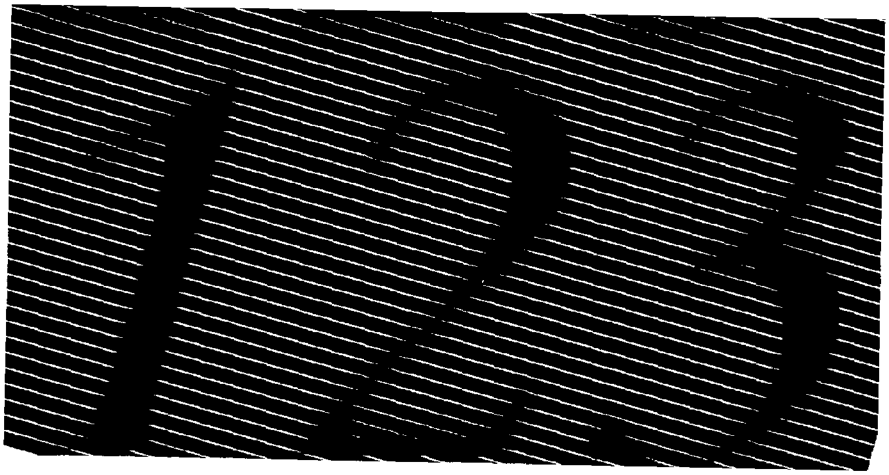

FIGS. 6A, 6B and 6C show a further example with a revealing layer having an oblique orientation. FIG. 6A gives the revealing line grating. It can be photocopied on a transparency and used as the revealing layer to be put on top of the base band grating shown in FIG. 6B. FIG. 6C shows the moiré patterns ("1 2 3") generated when the base band grating and revealing line grating are superposed one on top of the other. A single horizontal base band is shown on top of FIG. 6B.

By rotating the revealing layer, one can see how the moiré patterns modify their shape. Rotating the revealing layer modifies the angle and therefore the transformation between original shape and moiré shape, yielding a transformation comprising a change of orientation of the moiré band, and a shearing of the moiré pattern.

We describe first the geometry of moirés obtained by the superposition of a base layer made of straight base bands and of a revealing layer made of a straight line grating. Then we explain how to obtain curvilinear moirés by applying geometric transformations to the base layer and possibly to the revealing layer.

Please note that all drawings showing base band patterns and revealing line grating layers are strongly enlarged in order to allow to photocopy the drawings and verify the appearance of the moiré patterns. However, in real security documents, the base band periods (T1) the revealing line grating periods (T2) will be much lower, making it very difficult or impossible to make photocopies of the base band patterns with standard photocopiers or desktop systems.

Terminology

The term security document refers to banknotes, checks, trust papers, securities, identification cards, passports, travel documents, tickets, etc.). It also refers to valuable articles (such as optical disks, CDs, DVDs, software packages, medical products, etc.) which need to be protected by a security device. A security device is a means allowing to verify the authenticity of a valuable item. Generally a security device is incorporated into a document, into the package of a valuable article or into the valuable article itself.

The term "image" characterizes images used for various purposes, such as illustrations, graphics and ornamental patterns reproduced on various media such as paper, displays, or optical media such as holograms, kinegrams, etc. . . . Images may have a single channel (e.g. gray or single color) or multiple channels (e.g. RGB color images). Each channel comprises a given number of intensity levels, e.g. 256 levels). Multi-intensity images such as gray-level images are often called bytemaps. Hereinafter, bilevel images (e.g. intensity "0" for black and intensity "1" for white) are called bitmaps.

Printed images may be printed with standard colors (cyan, magenta, yellow and black, generally embodied by inks or toners) or with non-standard colors (i.e. colors which differ from standard colors), for example fluorescent colors (inks), ultra-violet colors (inks) as well as any other special colors such as metallic or iridescent colors (inks).

The term moiré pattern image or simply moiré image characterizes the moiré patterns produced by the superposition of a base layer made of base bands (also called base band layer) and of a line grating as the revealing layer. The terms band moiré or band moiré patterns indicate that the considered moiré patterns are produced by the superposition of a base layer made of base bands and of a revealing layer made of a grating of lines.

The base layer may comprise several different sets of base bands. Different sets of base bands are characterized by having different geometric layouts, e.g. their orientations, period or the geometric transform characterizing the layout of a set of curvilinear base bands may vary. The terms "set of base bands" or "base band grating" are equivalent.

In the present invention, we use the term line gratings in a generic way: a line grating may be embodied by a set of transparent lines (e.g. FIG. 1A, 11) on an opaque or partially opaque support (e.g. FIG. 1A, 10), by cylindric microlenses or by diffractive devices acting as cylindric microlenses. Sometimes, we use instead of the term "line grating" the term "grating of lines". In the present invention, these two terms should be considered as equivalent.

In the literature, line gratings are generally set of parallel lines, where the transparent (or white) part (FIG. 2) is half the full width, i.e. with a ratio of $\tau T=1/2$. In the present invention, regarding the line gratings used as revealing layers, the relative width of the transparent part (aperture) will be generally lower than 1/2, for example 1/3, 1/5, 1/8, or 1/10. In the case that the line grating is embodied by an optical device such as cylindric microlenses or diffractive devices acting as cylindric microlense, an even smaller relative sampling width may chosen.

In the present invention, we assume that base bands and line gratings may be rectilinear, i.e. formed by respectively straight bands and straight lines, or curvilinear, i.e. formed respectively by curved bands and curved lines. In addition, gratings of lines need not be made of continous lines. A revealing line grating may be made of interrupted lines and still be able to produce band moiré patterns.

The term "printing" is not limited to a traditional printing process, such as the deposition of ink on a substrate. Hereinafter, it has a broader signification and encompasses any process allowing to create a pattern or to transfer a latent image on a substrate, for example engraving, photolithography, light exposition of photo-sensitive media, etching, perforating, embossing, thermoplastic recording, foil transfer, inkjet, dye-sublimation, etc.

The Geometry of Straight Band Grating Moirés

Figure 7:
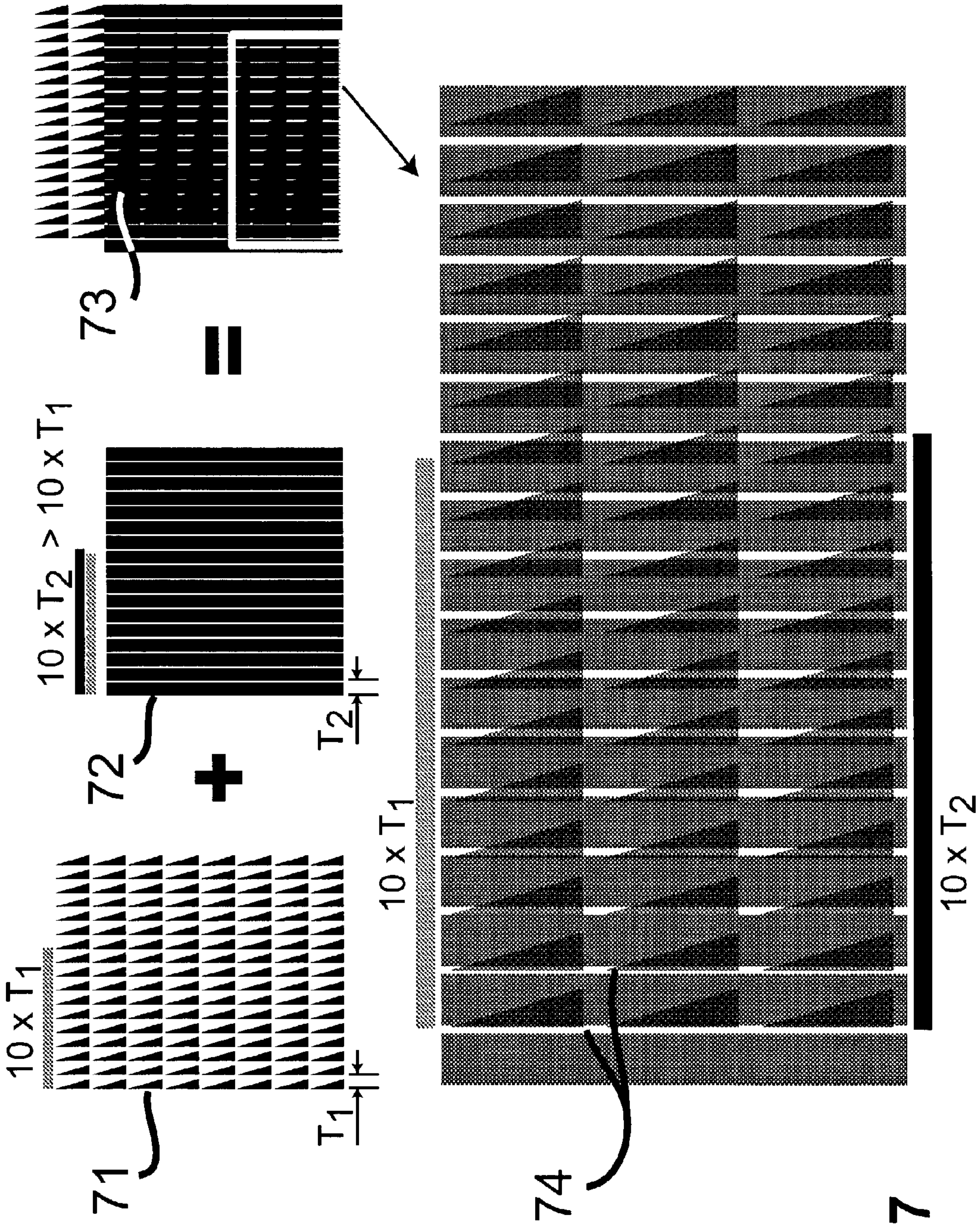
FIG. 7 shows a detailed view of the superposition of a base layer with replicated base bands and of a revealing line grating whose lines samples different instances of the base band patterns.

The example given in FIG. 7 shows in detail that the superposition of a base band layer 71 with base band period T1 and a revealing layer line grating 72 with line period T2 produces band moiré patterns 73 which are a transformed instance of the patterns (triangles) located in the base bands, where the transformation comprises an enlargement. Since the revealing line grating has a larger period T2 than the base band period T1, it samples different instances of base band triangles at successively different relative positions within the base bands 74.

Figure 8:
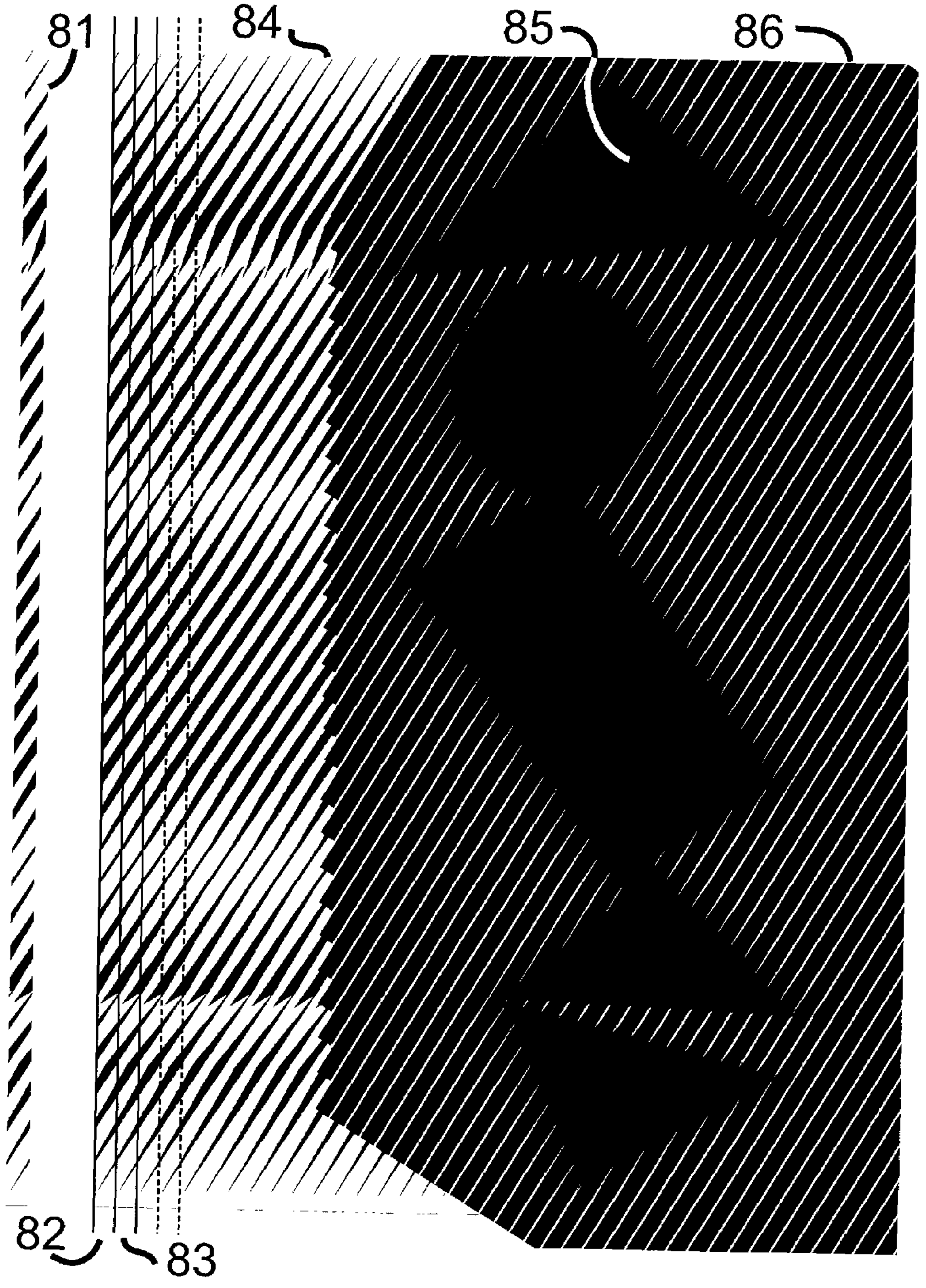
FIG. 8 shows that the produced moiré patterns are a transformation of the original base band patterns.

FIG. 8 shows that the moiré patterns are a transformation of the original base band patterns 81 that are located in the present embodiment within each repetition of the base bands 82, 83, . . . of the base band layer. Patterns laid out within individual bands need not be repetitive. Single base band example 81 incorporates non repetitive patterns. In the general case, the patterns incorporated in successive base bands should be similar in order to produce moiré patterns which are a transformation (including an enlargement) of the base band patterns.

By purely geometric considerations, one can derive the transformations between the individual bands $B_0$, $B_1$, $B_2$, . . . incorporating the original patterns (original base band space) and the x-y space where the moiré appears (moiré space). For this purpose, consider the geometry described in FIG. 9.

Each individual band $B_i$ of the band grating $B_0$, $B_1$, $B_2$, . . . is given by one band of period T1. Without loss of generality, we assume for the sake of the explanation that base bands are horizontal, i.e. their boundaries are parallel to the x-axis.

For the present geometric explanation, we assume that successive horizontal bands $B_0$, $B_1$, $B_2$ . . . are simply translated replications of the base band $B_0$. In the present case (FIG. 9), the translation is perpendicular to the band orientation and the corresponding translation vector is (0, T1).

Figure 9:
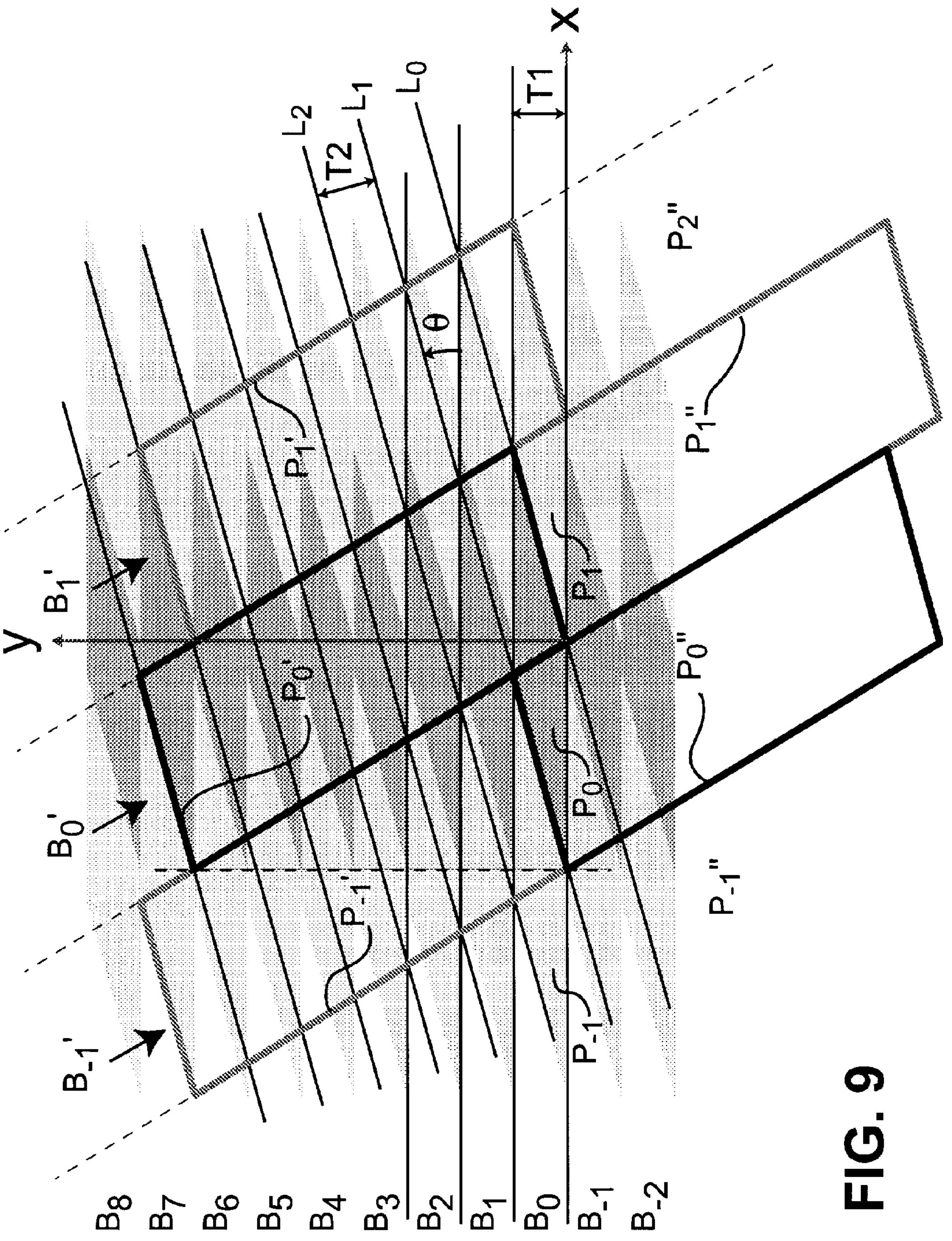
FIG. 9 shows the geometry of the superposition of a base band layer and of a revealing line grating layer.

The revealing layer is made of a grating of single lines (called impulses when their width becomes infinitely small, see R. N. Bracewell, Two Dimensional Imaging, Prentice Hall, 1995, pp 120–122, 125–127). Single lines $L_0$, $L_1$, $L_2$ . . . are defined by their line equation $$y=(\tan\theta)x+k^*(T2/\cos\theta), \qquad \text{(eq. 1)}$$

where k is an integer giving the index of the line $L_k$. Line impulses have a slope of tan θ, where θ is the angle between line impulses and the base line grating. Without loss of generality, we assume that the origin of the x-y coordinate system is at the intersection between the lower boundary of band $B_0$ and line impulse $L_0$ (FIG. 9).

Figure 10:
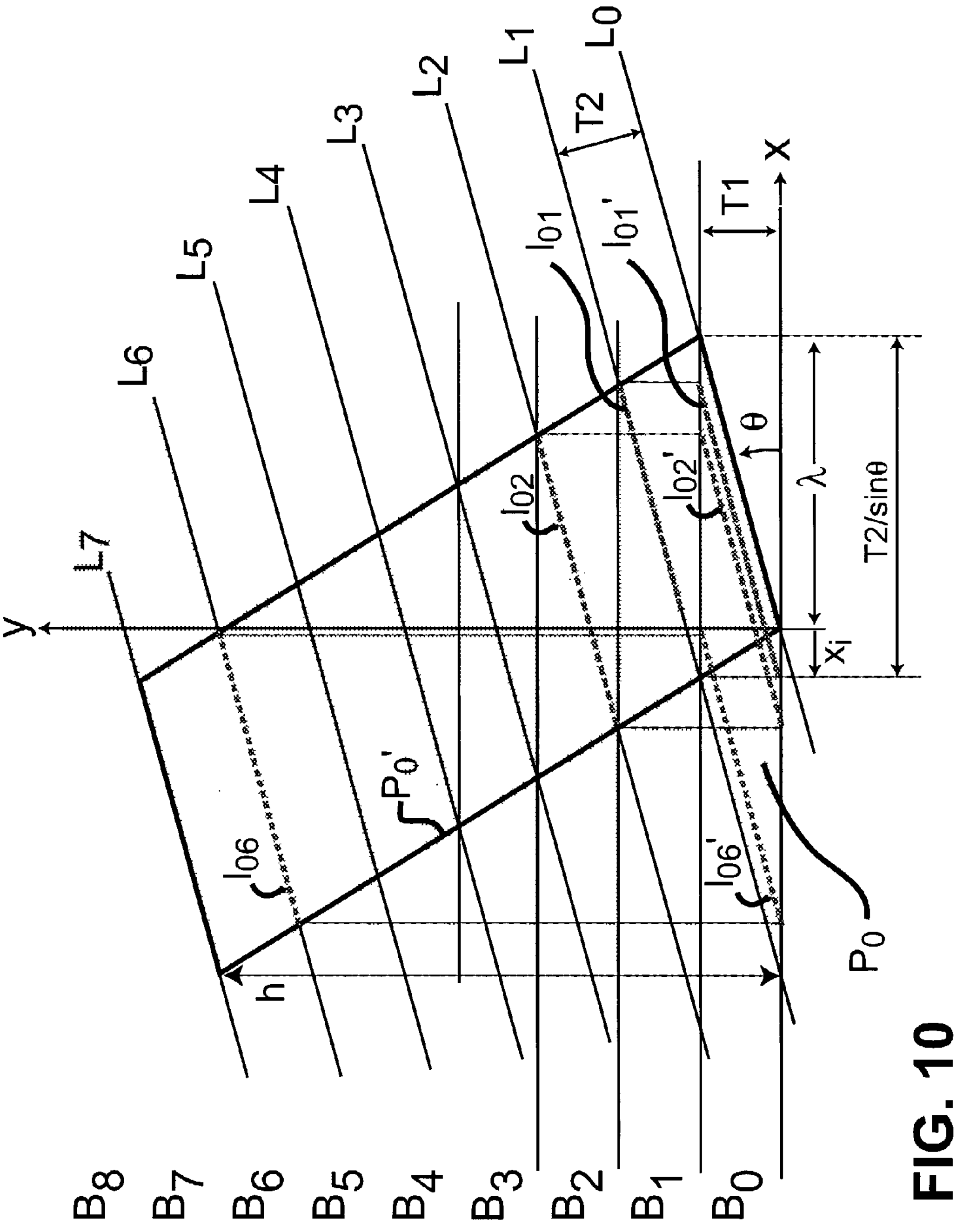
FIG. 10 gives an enlarged view of the the geometry of the superposition of the base band layer and the revealing line grating layer.

FIG. 10 shows that successive lines $L_0$, $L_1$, $L_2$, . . . of the revealing line grating sample within the parallelogram $P_0'$ of the base layer different bands $B_0$, $B_1$, $B_2$ . . . . Since vertical bands are replicates of band B0, the revealing line grating samples different (replicated) instances of the same base band patterns.

Let us consider the parallelogram $P_0$ defined by the intersection of line impulses $L_0$ and $L_1$ (FIG. 10) with the base grating band $B_0$.

Line segment $l_{01}$ of line $L_1$ intersecting band $B_1$ samples the same space as its translated version $l_{01}'$ in band $B_0$. Line segment $l_{02}$ of line $L_2$ intersecting band $B_2$ samples the same space as its translated version $l_{02}'$ in band $B_0$, etc.

Therefore, successive line segments $l_{0j}$ of line impulses $L_j$ intersecting band $B_j$ sample the same space as their translated versions $l_{0j}'$. This establishes a linear mapping between parallelogram $P_0'$ and parallelogram $P_0$ located within band $B_0$.

Figure 11:
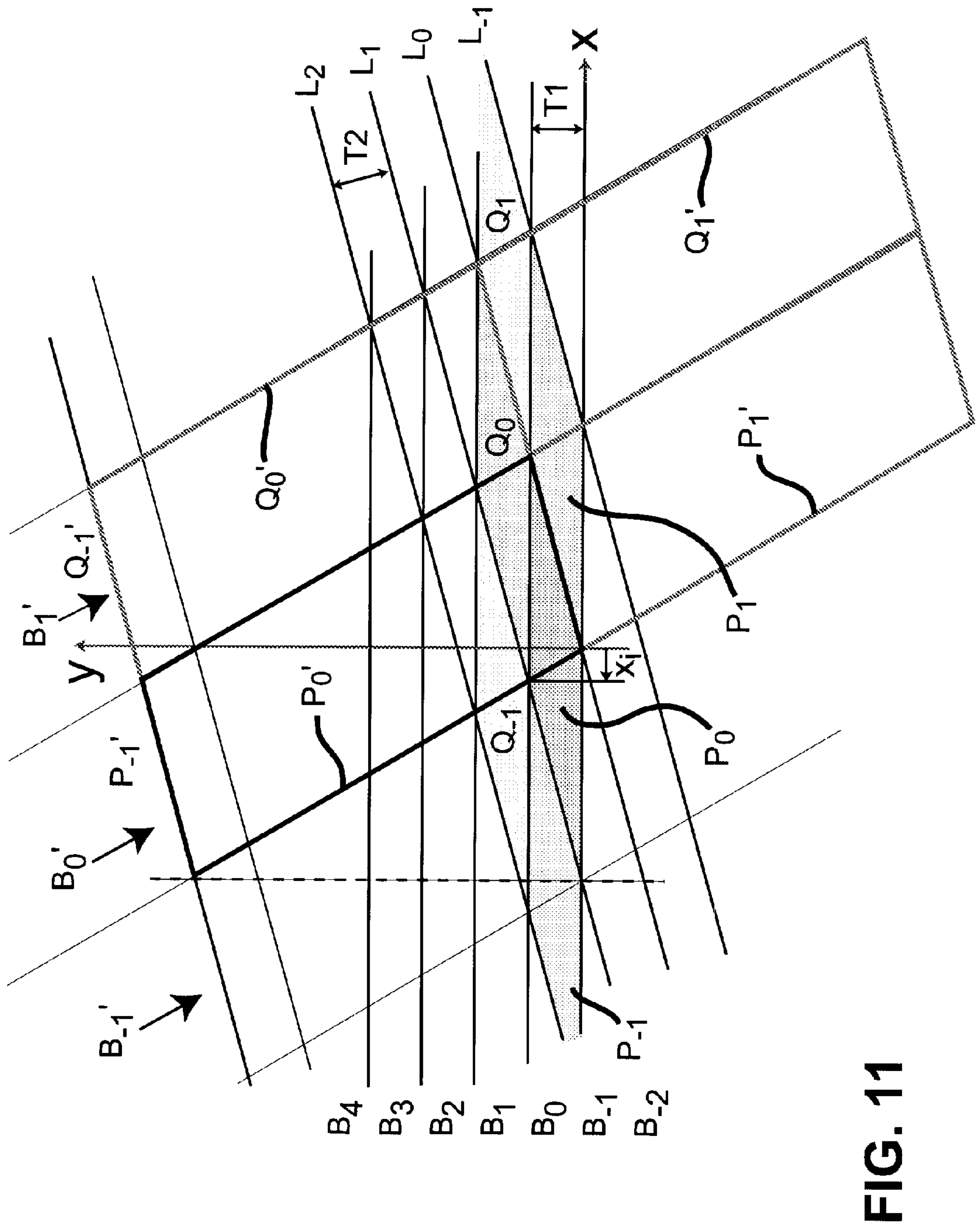
FIG. 11 gives a slightly different view of the geometry of the superposition of the base band layer and of the revealing line grating layer allowing to show that the produced band moiré pattern images are a linear transformation of the base band pattern images.

Similarly, as shown in FIG. 11, a linear mapping exists between parallelogram $P_{-1}$ and parallelogram $P_{-1}'$, parallelogram $P_0$ and parallelogram $P_0'$, parallelogram $P_1$ and parallelogram $P_1'$, etc. The parallelograms making up band $B_0$ are mapped to parallelograms making up band $B_0'$. In a similar manner, the parallelograms $Q_i$ composing band $B_1$ are mapped to parallelograms $Q_i'$ making up band $B_1'$ and so on for all the bands.

This establishes a linear mapping (here an affine mapping) from the x-y plane comprising the base line grating to the $x_m$–$y_m$ plane comprising the moiré. Parameters a,b,c,d of the transformation $$\begin{bmatrix} x_m \\ y_m \end{bmatrix} = \begin{bmatrix} a & b \\ c & d \end{bmatrix} \cdot \begin{bmatrix} x \\ y \end{bmatrix} \qquad \text{(eq. 2)}$$

are obtained by enforcing the mapping of the fixed point (λ,T1)->(λ,T1) and of the point $(x_i,0)$->$(x_i, T1)$ (see FIG. 10).

These parameters are $$a=1,\ b=0,\ c=T1/x_i \text{ and } d=(x_i-\lambda)/x_i, \quad \text{(eq. 3)}$$

where $\lambda=T1/\tan\theta$.

$x_i$ is the x-coordinate of the intersection of $L_1$ and the upper boundary of band $B_0$, i.e. $x_i$ is given by the set of equations $$y=(\tan\theta)x+(T2/\cos\theta)$$

$$y=T1 \quad \text{(eq. 4)}$$

Solving for x gives $$x_i=(T1/\tan\theta)-(T2/\sin\theta),\ \text{when } \theta<>0 \quad \text{(eq. 5)}$$

Recall that bands $B_1$, $B_2$, . . . are translated replicates of band $B_0$. Therefore, moiré bands $B_1'$, $B_2'$ . . . (FIG. 11) are also replicates of moiré band $B_0'$. According to FIG. 9, parallelogram $P_0$ is mapped to parallelogram $P_0'$ in moiré band $B_0'$ and at the same time to parallelogram $P_0''$ in moiré band $B_{-1}'$. Therefore, moiré band $B_0'$ is translated by (0,h) in respect to moiré band $B_{-1}'$, where according to FIG. 10, $$h=\frac{T2}{\sin\theta}\cdot\frac{T1}{x_i}=\frac{T1}{\frac{T1}{T2}\cdot\cos\theta-1} \quad \text{(eq. 6)}$$

Thanks to the linear mapping property, tiny visually significant patterns located within the replicated individual bands, on top of which the revealing layer is applied yield as band moiré patterns their original patterns, sheared, enlarged, and possibly mirrored.

Theoretically, when the revealing layer is made of lines being line impulses, the band moiré image is a sampled and transformed version of the patterns located within the individual bands. However, in practical applications, the grating of lines is a rect function with an aperture $\tau/T1$ ([Amidror00], p. 21). Such a grating of lines used as the revealing layer generate moiré patterns which are a transformed low pass version of the original patterns located within the individual base bands.

One may also slightly translate the content of one band $B_i$ in respect to its previous band $B_{i-1}$ by a value $s_1$. This has the effect of translating horizontally by $s_1$ the location of $l_{01}'$, by $2*s_1$ the location of $l_{01}'$, etc. . . . This yields a different linear mapping whose parameters can be calculated following a similar approach as the one described above.

When rotating the revealing layer, we modify angle $\theta$ and the linear transformation changes accordingly. When translating the revealing layer, we just modify the origin of the coordinate system. Up to a translation, the moiré patterns remain identical.

In the special case where the band grating (base layer) and the revealing layer have the same orientation, $\theta=0$, (and assuming no translation between successive horizontal bands, i.e. $s_1=0$), the moiré patterns are simply a vertically scaled version of the patterns embedded in the replicated base bands, where the vertical scaling factor is T2/(T2 mod T1). One can easily verify by simple algebraic and trigonometric manipulations that for $\theta=0$, and T1<T2<2*T1, the parameters in eq. 3 are c=0 and d=T2/(T2 −T1).

Figure 13:
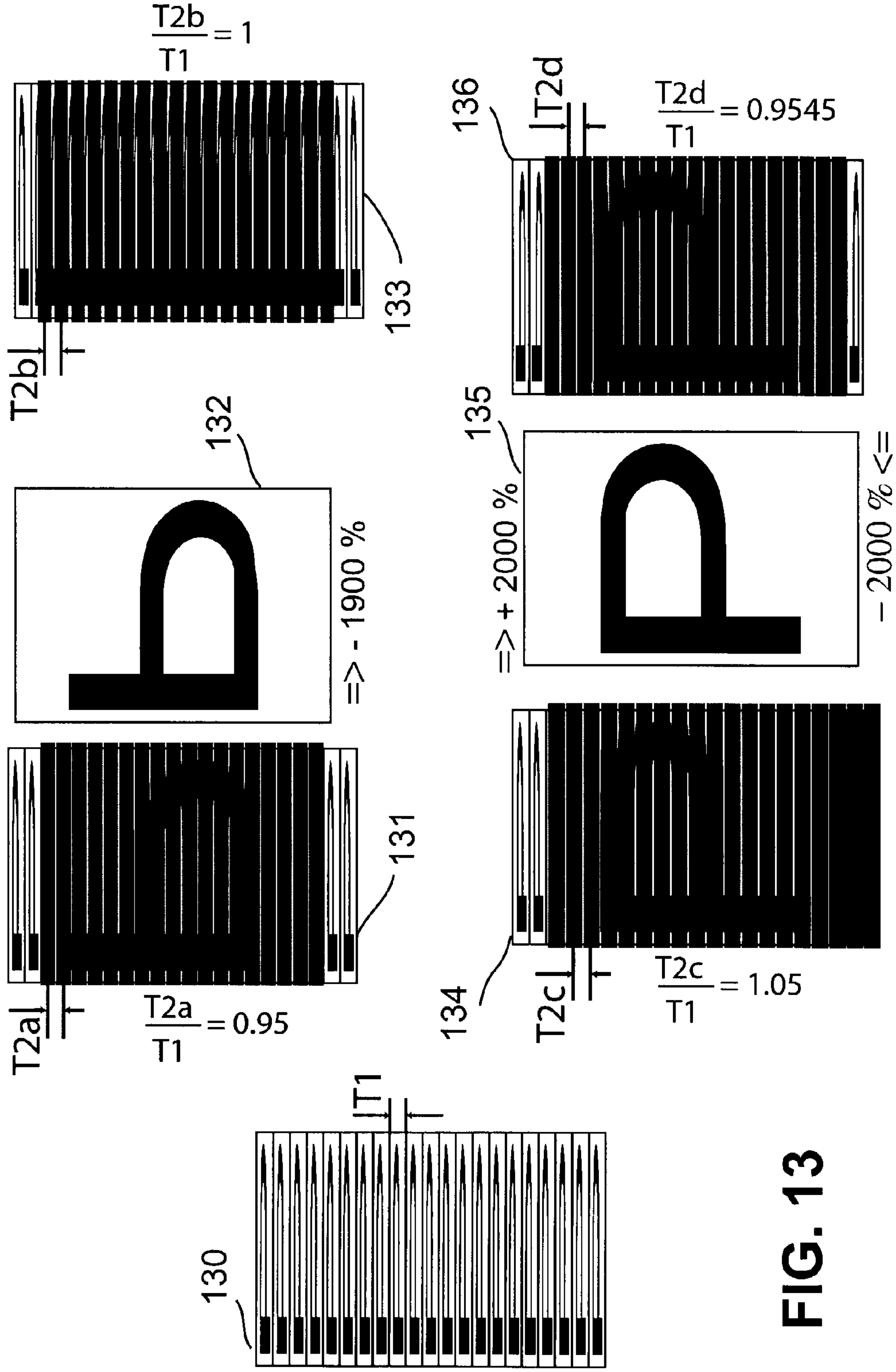
FIG. 13 shows the relationship between base band pattern and moiré pattern according to the ratio between the base band period and the revealing line grating period.

FIG. 13 illustrates a vertical scaling example. FIG. 13, 130 shows a succession of base bands with a period T1 and incorporating a vertically reduced letter "P". In the present examples, the the period T2 of the revealing layer is modified. Three cases may be considered. When the ratio T2/T1 is inferior to 1, the moiré patterns are the mirrored and scaled base band patterns. In FIG. 13, 131, the ratio T2*a*/T1 is 0.95. Thus the scaling factor d=1/(1−T1/T2) is equal to 1/(1−1/0.95)=−19. The moiré patterns (132) are the mirrored image of the base band patterns (d<0). When T1=T2 (133), the revealing layer reveals exactly the same part of each base band and the scaling factor is infinite. When the ratio T2/T1 is superior to 1, the moiré patterns are the scaled base band patterns. In FIG. 13, 134 the ratio T2*c*/T1 is 1.05. Thus the scaling factor d is equal to 20. The moiré patterns (135) are the base band patterns scaled by a factor 20.

With a ratio T2/T1 inferior to 1, i.e. T2 <T1 (FIG. 13, 136), the base band patterns are sampled by more revealing lines of the revealing layer and their corresponding revealed moiré patterns are therefore more accurate. In this case, we may create mirrored base band patterns. Mirrored base band patterns are more difficult to perceive and may therefore be more easily hidden (see section "Combined multiple orientation band moirés").

Generation of Band Patterns

FIG. 9 incorporates the basis layer with the band grating $B_0$, $B_1$, $B_2$, . . . and the revealing layer with the revealing line grating $L_0$, $L_1$, $L_2$. Parallelogram $P_0$, replicated over base bands $B_1$, . . . , $B_6$ yields the moiré parallelogram $P_0'$. Replicating parallelogram $P_0$ over base bands $B_{-1}$, . . . , $B_{-6}$ yields moiré parallelogram $P_0''$. Similarly replicating parallelogram $P_1$ over base bands $B_1$, . . . , $B_6$ yields the moiré parallelogram $P_1'$ and over base bands $B_{-1}$, . . . , $B_{-6}$ yields moiré parallelogram $P_0''$. Successive parallelograms of base band $B_0$ cover successive moiré parallelograms.

Since the forward transformation from band patterns to moiré patterns is known, the inverse of the matrix of eq. 2 specifies the reverse transformation from moiré patterns to band patterns. For the reverse transformation, we obtain $$\begin{bmatrix} x \\ y \end{bmatrix}=\begin{bmatrix} p & q \\ r & s \end{bmatrix}\cdot\begin{bmatrix} x_m \\ y_m \end{bmatrix} \quad \text{(eq. 7)}$$

The parameters are p=1, q=0, $r=T1/(\lambda-x_i)$ and $s=x_i/(x_i-\lambda)$.

The reverse transformation may be useful for conceiving the patterns to be generated in the base bands which, when overlaid with the revealing layer, will produce the desired moiré patterns at a given angle between base layer and revealing layer.

In order to define the base and the revealing layers, one needs to define the moiré patterns that are to be visualized within the moiré bands, knowing that base band parallelograms $P_i$ are mapped to moiré band parallelograms $P_i'$ and $P_i''$. The layout of the band moiré patterns and their corresponding base band patterns influence the selection of the base band period T1, the revealing line grating period T2 and the preferred angle $\theta$. Good results are obtained with periods T1 and T2 which vary only by a small percentage (e.g. 5% to 10%). Angle $\theta$ should be small, generally below 30 degrees.

Bi-level base band patterns may be easily generated by standard software, such as Adobe Illustrator or Adobe Photoshop. Base band patterns may also incorporate scanned and possibly edited bitmaps incorporating the desired repetitive or non-repetitive patterns.

Variable intensity base band patterns may be created by inserting within each base band a dithered image, either black-white or color. The resulting moiré patterns will also be a variable intensity image, either black-white or color.

Figures 12A, 12B, 12C:
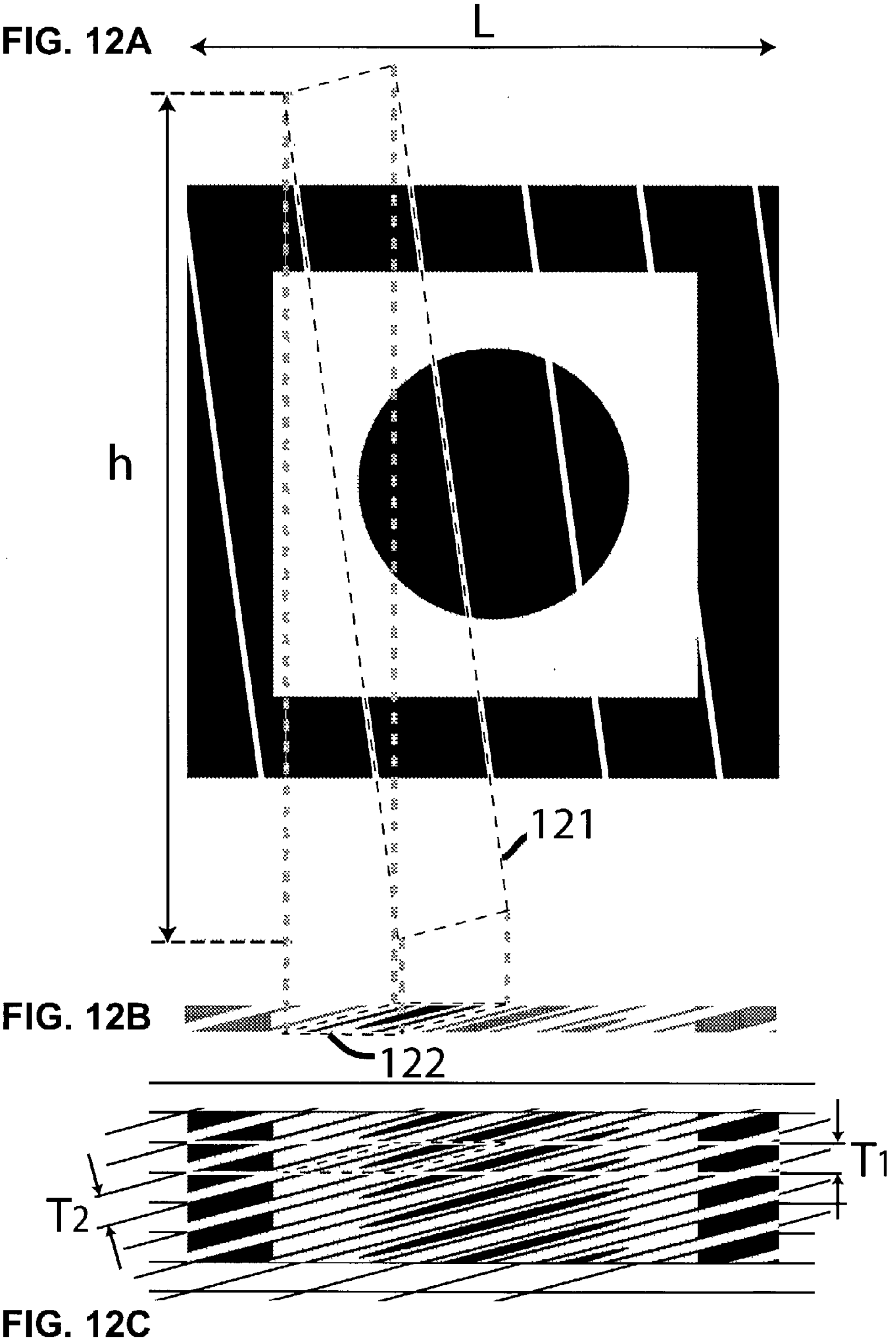
FIGS. 12A, 12B, 12C illustrate the relationship between a moiré pattern (FIG. 12A), a single base band pattern (FIG. 12B) and several base bands located within the base layer (FIG. 12C)

FIGS. 12A, 12B and 12C illustrate the layout of the base band patterns once a desired non-trivial moiré pattern image has been defined and the preferred orientation of the revealing line grating has been chosen. According to FIG. 9, moiré parallelograms $P_i'$ (in FIG. 12A, 121) are mapped to base band parallelograms $P_i$ (in FIG. 12B, 122). The forward transformation given in eq. 2 specifies the mapping of the base band parallelograms (FIG. 12B) to the moiré band parallelograms in the moiré image space (FIG. 12A). FIG. 12C shows a part of the base layer made of a repetition of the base band shown in FIG. 12B.

In order to build a base band capable of yielding a desired band moiré pattern image (FIG. 12A), the base band image (bytemap or bitmap) is traversed pixel by pixel and scanline by scanline. At each pixel, the current base band parallelogram $P_i$ (e.g. 122) and moiré band parallelogram $P_i'$ (e.g. 121) may be identified. According to the forward transformation, the corresponding pixel in the corresponding moiré parallelogram $P_i'$ is located and its intensity is obtained, possibly by interpolation between neighbouring pixels. That intensity is assigned to the current base band pixel intensity. This algorithm generates one single base band (FIG. 12B). By replicating the base band vertically, one generates the base band grating FIG. 12C).

One may optimize that algorithm by associating to a unit horizontal pixel displacement in the base band a displacement vector in the moiré band image computed according to (eq. 2). Scanning the base band horizontally corresponds in the moiré band image (FIG. 12A) to an oblique scan according to the computed displacement vector. After reaching one of the vertical boundaries of the moiré band image given by its height h, the next position is the current position modulo the height h of the band moiré parallelograms (for the calculation of h, see eq. 6).

FIG. 12A shows only one instance of the produced moiré patterns. With many vertically replicated base bands, one obtains vertically several instances of the moiré pattern shown in FIG. 12A. To obtain lateral replications of the moiré pattern, the base band pattern shown in FIG. 12B needs to be replicated horizontally along the base bands. However, one may also choose to have different moiré patterns on the left and right side of the moiré pattern shown in FIG. 12A. This would mean that the corresponding different base band patterns would need to be inserted on the left and on the right side of the pattern shown in FIG. 12B.

In order to offer a strong security against counterfeiting attempts and provide at the same time beautiful security documents, one may halftone a global image (grayscale or color) laid out over the document with a particular microstructure pattern fitted within each band of the base layers. For this purpose, one may use the method described in U.S. patent application Ser. No. 09/902,227, Images and security documents protected by microstructures, inventors R. D. Hersch, E. Forler, B. Wittwer, P. Emmel. This invention teaches how to synthesize microstructure patterns from which a global image is synthesized. Given a bitmap representation of the desired microstructure patterns, that method generates a complex dither matrix incorporating the microstructure patterns. The dither matrix is then used to dither the global image and produce the base layer. In the resulting dithered image, such a dither matrix has the effect of modifying the thicknesses of individual microstructure patterns according to the corresponding local intensities within the global image.

However, dither matrices incorporating microstructure patterns may be synthesized by other means. Oleg Veryovka and John Buchanan in their article "Texture-based Dither Matrices" Computer Graphics Forum Vol. 19, No. 1, pp 51–64, show how to build a dither matrix from an arbitrary grayscale texture or grayscale image. They apply histogram equilibration to ensure a uniform distribution of dither threshold levels. One may obtain the grayscale image from bitmap patterns by simply applying a low-pass filter on the bitmap patterns. The result is of lower quality than the method proposed in U.S. patent application Ser. No. 09/902,227, but may work for simple patterns.

Figure 14:
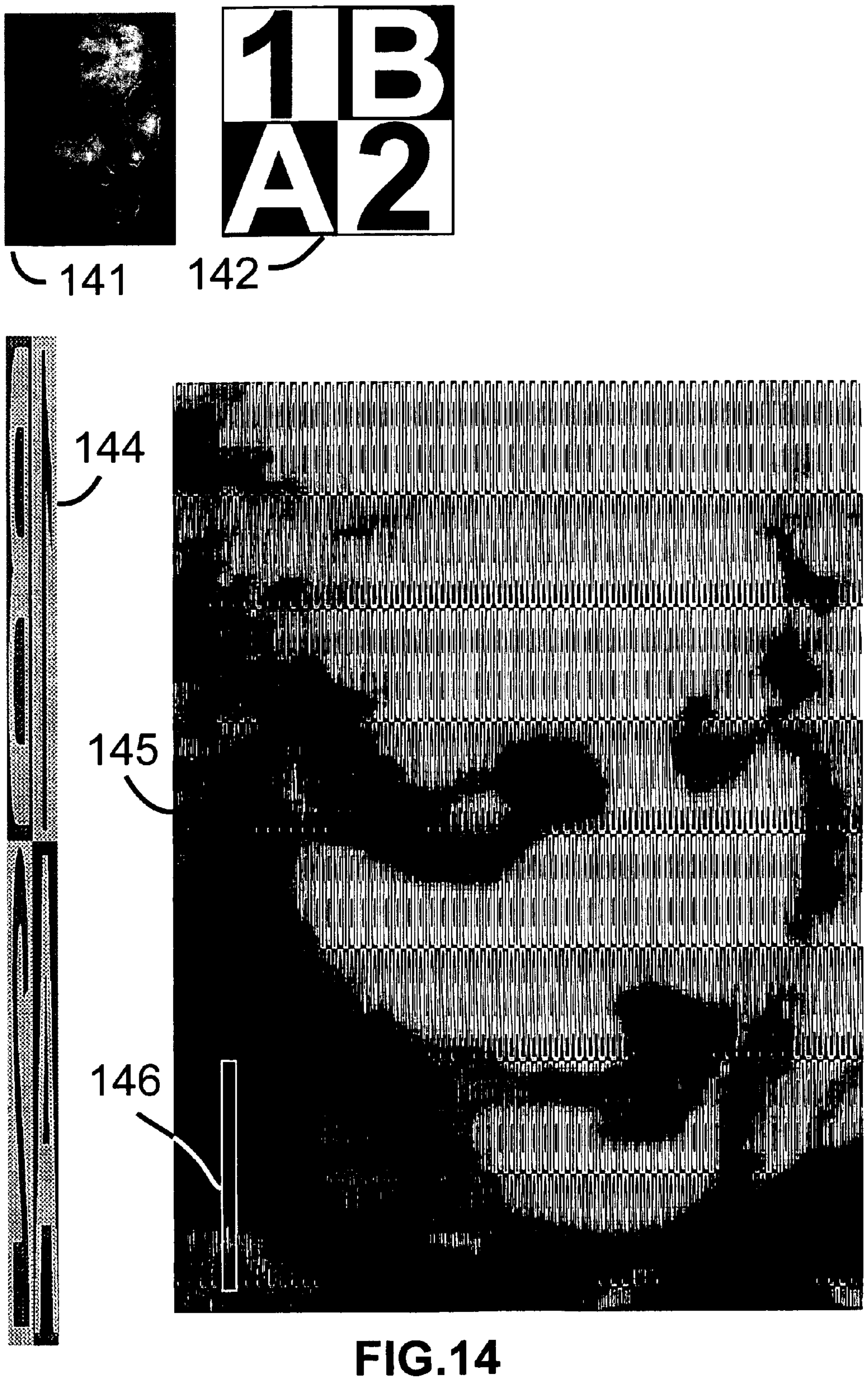
FIG. 14 illustrates the dithering (halftoning) of an image with a dither matrix incorporating base band patterns.

A further method for creating a dither matrix incorporating the desired base band patterns consists in creating a dither matrix which modifies the intensities of respectively the pattern (foreground) or of the pattern background according to the image local intensity to be reproduced. To create such a dither matrix, let us consider the base band patterns as a mask, and let us modify the values of a standard dither matrix, for example a dither matrix producing small clustered dots (see. H. R. Kang, Digital Color Halftoning, SPIE Press, 1999, pp. 214–225). One may chose to scale and possibly shift the initial dither values within the base band pattern mask so as to fit within the first part of a partition (e.g. half) of the full range of dither values and the dither values outside the mask so as to fit within the second part of the partition (e.g. half) of the full range of dither values. Such a modified dither matrix incorporating base band patterns is shown in FIG. 14, 144. A corresponding dithered base band part of the global image is shown in FIG. 14, 146. At dark tones, the pattern is black and the pattern background is dark. At intermediate tones, the pattern is close to black and the pattern background is close to white.

The partition of the full range of dither values may be proportional to the relative surfaces of the pattern (foreground) and of its corresponding pattern background.

As an illustration of the result, FIG. 14, 141 shows a global image, 142 represents the bitmap incorporating the microstructure patterns. 144 shows an enlargement of the modified dither matrix fitted within a single base band and incorporating the base band patterns (microstructure). 145 shows the resulting dithered base band layer. The base layer is the dithered global image and its base bands incorporate the microstructure patterns. The dithering process creates the microstructure patterns within each individual base band. In the present case, base bands differ one from another by the intensity of the patterns or by the intensity of their background. One may also create a dither matrix combining thickness modification (according to U.S. patent application Ser. No. 09/902,227, see above) and modification of the patterns foreground, respectively background intensity values.

One may also generate color patterns in the basic bands within a global image by the color difference method disclosed in European Patent application 99 114 740.6 (inventors R. D. Hersch, N. Rudaz, filed Jul. 28, 1999, assignees: Orell-Füssli and EPFL) and in the publication by N. Rudaz, R. D. Hersch, Protecting identity documents with a just noticeable microstructure, Conf. Optical Security and Counterfeit Deterrence Techniques IV, 2002, SPIE Vol. 4677, pp. 101–109.

Curvilinear Band Moirés

In addition to periodic band moiré patterns, one may also create interesting curvilinear band moiré patterns. It is known from the Fourier analysis of geometrically transformed periodic structures [Amidror98] that the moiré in the superposition of two geometrically transformed periodic layers is a geometric transformation of the moiré formed between the original periodic layers.

For specifying curvilinear band moiré patterns, le us consider according to [Amidror98] a geometric transformation $g_1(x,y)$ between a curvilinear line grating $r_1(x,y)$ and its corresponding original periodic line grating $p_1(x')$, i.e. $r_1(x, y)=p(g(x,y))$. If we keep the same coefficients $c_m$ as in the Fourier serie decomposition of p(x'), then $$r_1(x, y) = \sum_{m=-\infty}^{\infty} c_m^{(1)} \exp[i2\pi m g_1(x, y)] \quad \text{(eq. 8)}$$

We also consider the geometric transformation $g_2(x,y)$ between a revealing curvilinear line grating $r_1(x,y)$ and its corresponding original periodic revealing line grating $p_2(x')$ $$r_2(x, y) = \sum_{m=-\infty}^{\infty} c_n^{(2)} \exp[i2\pi n g_2(x, y)] \quad \text{(eq. 9)}$$

Coefficients $c_m$ and $c_n$ are respectively the coefficients of the Fourier series development of the original periodic straight line grating $p_1(x')$ and of the revealing periodic straight line grating $p_2(x')$.

Then, the superposition between the curvilinear line grating $r_1(x,y)$ and the possibly curvilinear revealing layer $r_2(x,y)$ is given by $$r_1(x, y) \cdot r_2(x, y) = \sum_{m=-\infty}^{\infty} \sum_{n=-\infty}^{\infty} c_n^{(1)} c_m^{(2)} \exp[i2\pi(m g_1(x, y) + n g_2(x, y))] \quad \text{(eq. 10)}$$

Appearing moirés m(x,y) are given by partial sums within eq 8, i.e. by combinations of integer multiples of specific (m,n) terms. Such combinations form $z^*(k_1,k_2)$ terms (with z integer).

$$m_{k_1 k_2}(x, y) = \sum_{z=-\infty}^{\infty} c_{zk_1}^{(1)} c_{zk_2}^{(2)} \exp[i2\pi z(k_1 g_1(x, y) + k_2 g_2(x, y))] \quad \text{(eq. 11)}$$

Each combination of $(k_1,k_2)$ specifies a different moiré. The most visible moirés are those with low values for $(k_1,k_2)$, for example (1,−1).

Eq. 11 defines the geometry of curvilinear line moiré $(k_1,k_2)$. In order to to generate curvilinear moiré bands incorporating patterns of varying shape, we replace the curvilinear line grating by its corresponding curvilinear base band layer. This is done by replacing the original repetitive periodic line grating by its corresponding periodic base band layer and by generating into the bands the patterns that are to be revealed as moiré patterns. Transformation $g_1(x,y)$ allows to generate (e.g. by resampling) the curvilinear base band layer. Similarly, transformation $g_2(x,y)$ allows to generate the curvilinear revealing line grating. If one would like to have a straight line grating as revealing layer, transformation $g_2(x,y)$ may be dropped.

Figure 15:
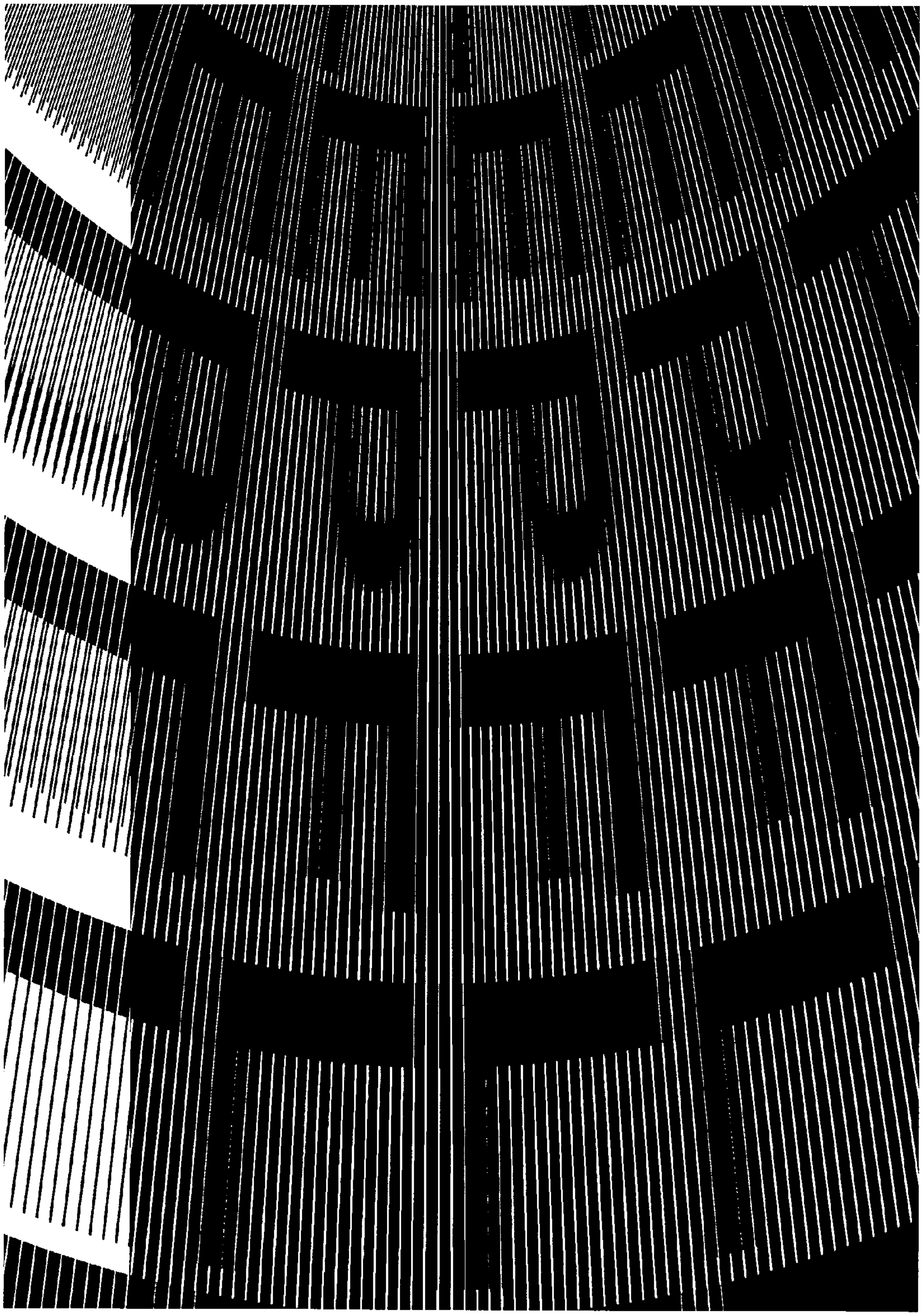
FIG. 15 illustrates the application of a geometric transformation to both the base band layer and the revealing layer and the curvilinear moiré patterns resulting from the superposition of the two layers.

FIG. 15 gives an example of a curvilinear base band layer incorporating the word “EPFL” revealed by a curvilinear line grating. The curvilinear base band layer as well as the curvilinear revealing grating (x,y space) are obtained from corresponding rectilinear gratings (x',y' space) by a transformation $x'=g_x(x,y)$, $y'=g_y(x,y)$ of the type $$x'=e^x \cos y \quad \text{(eq. 12)}$$

$$y'=e^x \sin y \quad \text{(eq. 13)}$$

Figure 16:
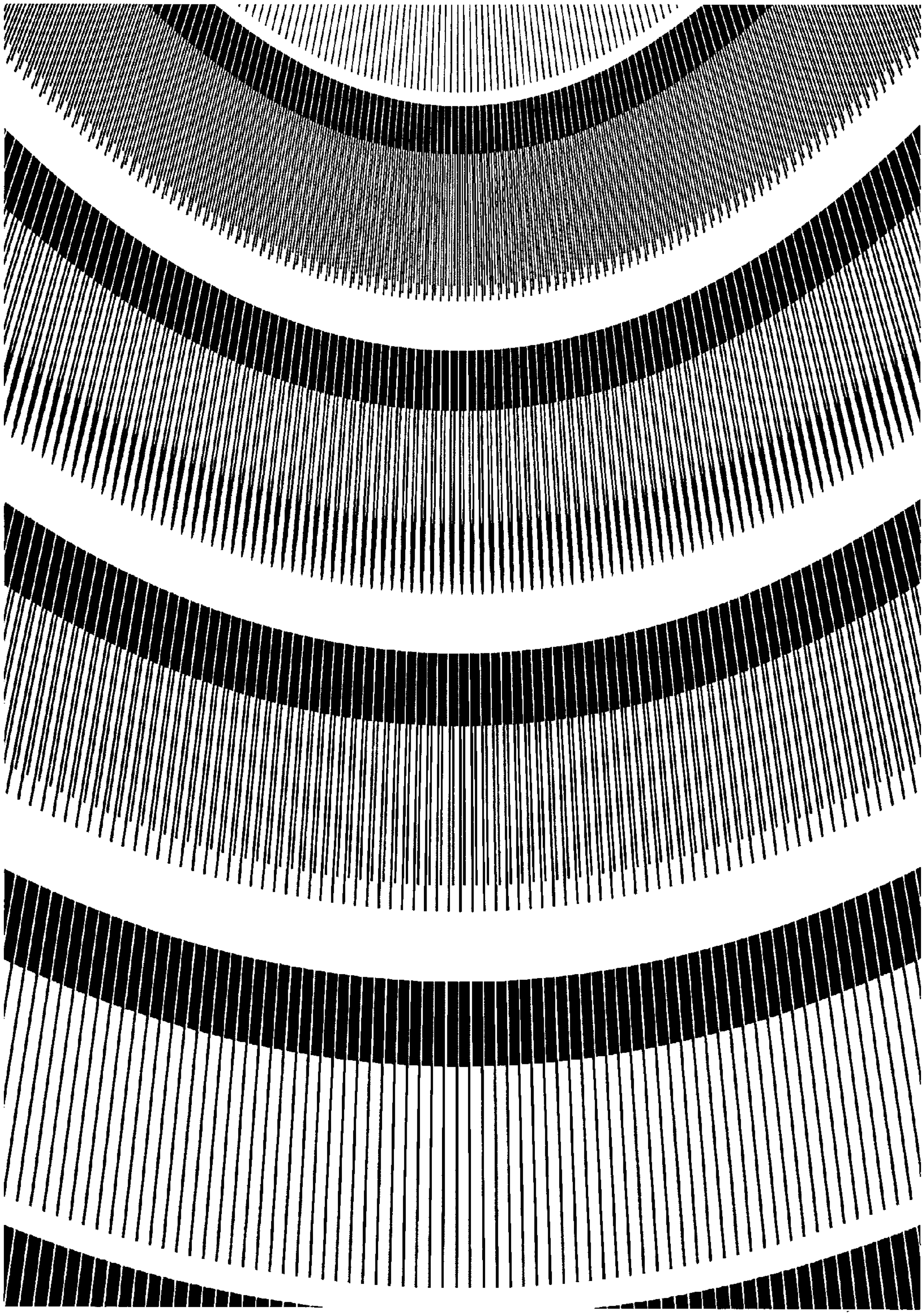
FIG. 16 gives the base band layer of FIG. 15.
Figure 17:
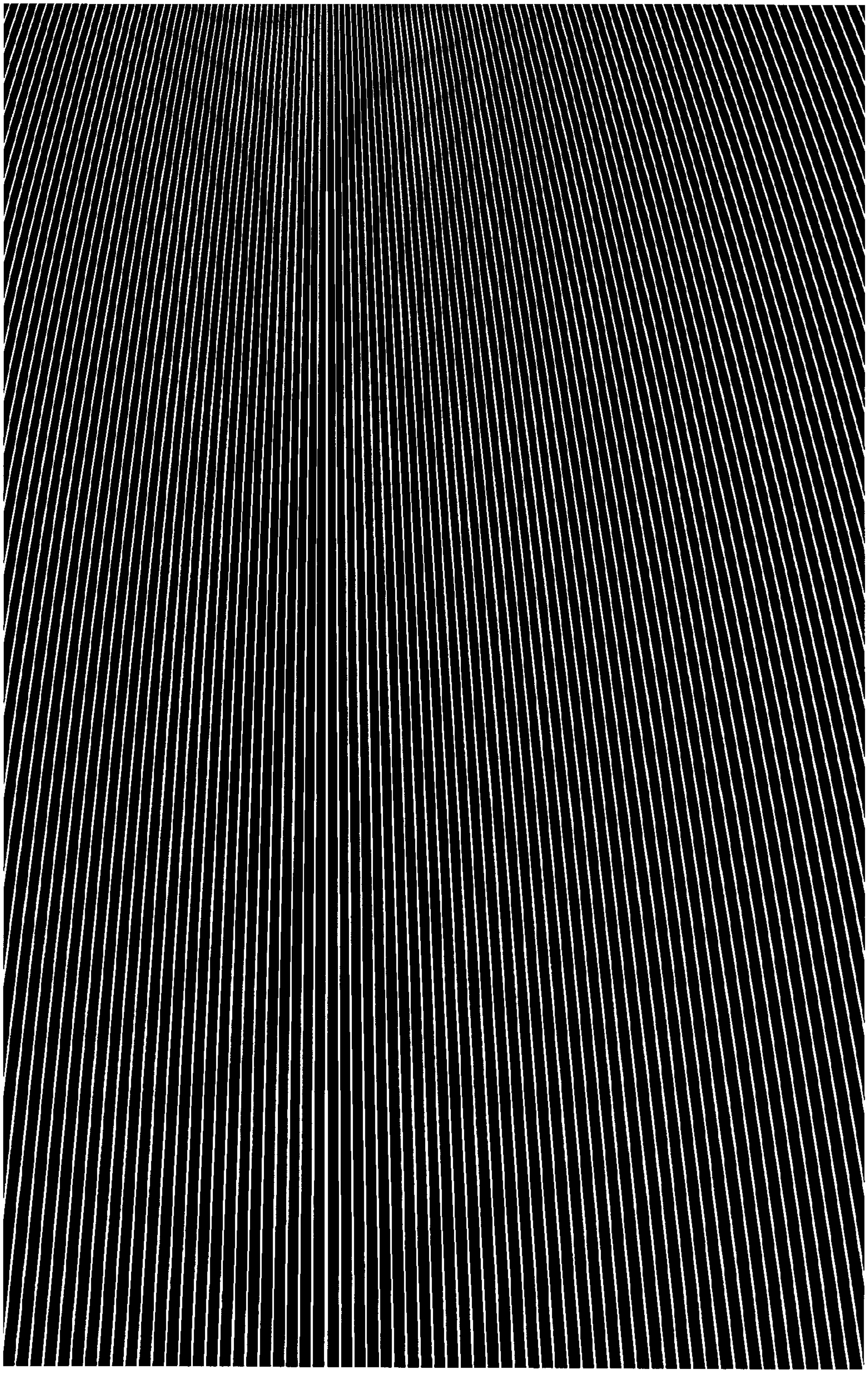
FIG. 17 gives the revealing layer of FIG. 15.

To generate the curvilinear base band layer $r_1(x,y)$, the curvilinear base band layer space is traversed pixel by pixel and scanline by scanline. At each pixel, the corresponding position $(x',y')=g_1(x,y)$ in the original space is found and its intensity (possibly obtained by interpolation of neighbouring pixels) is assigned to the current curvilinear base band layer pixel $r_1(x,y)$. FIG. 16 gives the corresponding base band layer and FIG. 17 the revealing line grating which can be photocopied on a transparent support. When placing the revealing line greating on top of the curvilinear base band layer according to FIG. 15 and rotating the revealing line grating on top of the curvilinear base band layer, one can observe a rotation and a bending of the moiré band as well as a deformation of the moiré shape.

The steps to be carried out for creating a base layer and a revealing layer yielding an attractive curvilinear band moiré are the following:

1. Examine examples of curvilinear line moirés between two curvilinear line gratings or one curvilinear line grating and a straight line grating, such as those described in G. Oster, The Science of moiré Patterns, Edmund Scientific, 1969 or those described in [Amidror00, pp 353–360].

2. Select from the examples a curvilinear line grating or a portion of it as a base band layer and either a curvilinear or a straight line grating as the revealing layer. Determine the mathematical function allowing to create the curvilinear base layer.

3. Consider the single curvilinear bands of the base layer and devise a transformation between these curvilinear bands and the base bands of a straight band grating.

4. Create patterns within the straight band grating with varying shapes, intensities and/or colors according to the capabilities of the original printing or image transfer device. The patterns may be a bi-level image, a grayscale image, a color image or a dither matrix.

5. Use the transformation between curvilinear base bands and the base bands of a straight base band grating to map said pattern into the curvilinear base bands. In the case of a dither matrix, use the transformation in order to obain for positions within the curvilinear base band grating space the dither threshold levels associated to corresponding positions within the dither matrix.

6. With the revealing line grating (curvilinear or straight), verify the shape of the resulting moiré image. The moiré patterns are an enlarged and transformed instance of the base band patterns. However some transformations between base band patterns and moiré patterns yield visually pleasing and other transformations may yield visually unpleasant results. By modifiying the parameters governing the base layer, the parameters governing the revealing layer and the relative position and orientation of base and revealing layers, one can modify the transformation, and therefore the resulting moiré pattern image. The goal is to create a moiré pattern image having a good visual impact and high aesthetic qualities, possibly with a base band layer incorporating different frequencies and orientations.

Figure 18A:
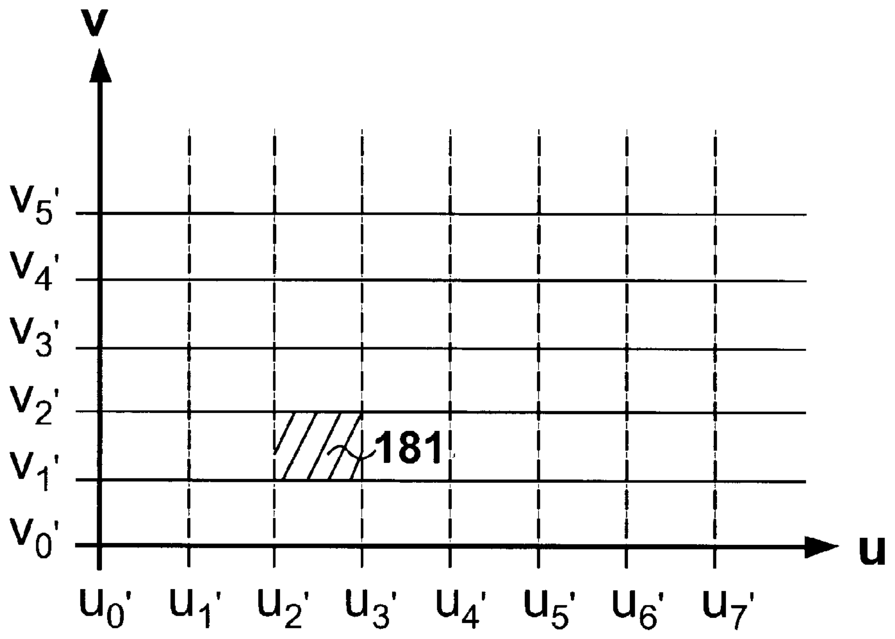
FIGS. 18A and 18B show a possible geometric transformation between an original rectilinear base band layer (FIG. 18A) and a curvilinear target base band layer (FIG. 18B)
Figure 18B:
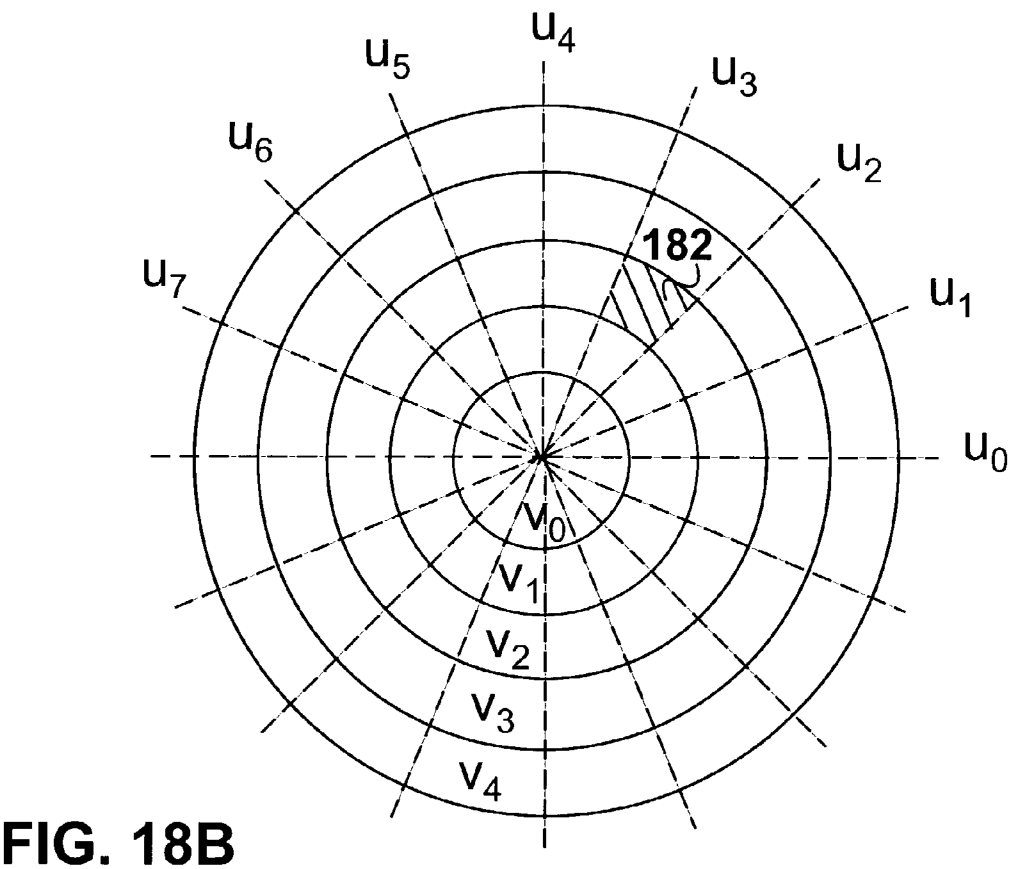

The transformation between curvilinear bands and the bands of a straight band grating is either given by function $g_1(x,y)$ described above which defines the curvilinear band grating, or if the curvilinear base band layer is generated by a separate construction, for example the creation of concentric circles, one may find a piecemeal transformation mapping between curvilinear base bands and the straight band grating. FIG. 18A shows an example of a transformation between a set of rectilinear base bands delimited by $v_0'$, $v_1'$, $v_2'$, . . . and corresponding circular base bands (here rings) delimited by $v_0$, $v_1$, $v_2$. Rectangular elements (FIG. 18A, 181) defined by their boundaries $v_i', v_{i+1}', u_j', u_{j+1}'$ are mapped to circular base band parts (FIG. 18B, 182) defined by their boundaries $v_i, v_{i+1}, u_j', u_{j+1}$.

FIGS. 19 and 20 give further examples of curvilinear moiré patterns obtained by a curvilinear base band layer and a revealing layer made of a curvilinear line grating. Both figures have the same base band and revealing layers, however the superposition of base band and revealing layer is different in each of the two figures. The curved base band layer and the curved revealing line grating in both figures are obtained with a geometric transformation $x'=g_x(x,y)$, $y'=g_y(x,y)$ from curvilinear to rectilinear space of the type $$\rho=\sqrt{x^2+y^2} \quad \text{(eq. 14)}$$

$$x'=\sqrt{\rho+x} \quad \text{(eq. 15)}$$

$$y'=\sqrt{\rho-x} \quad \text{(eq. 16)}$$

Figure 19A:
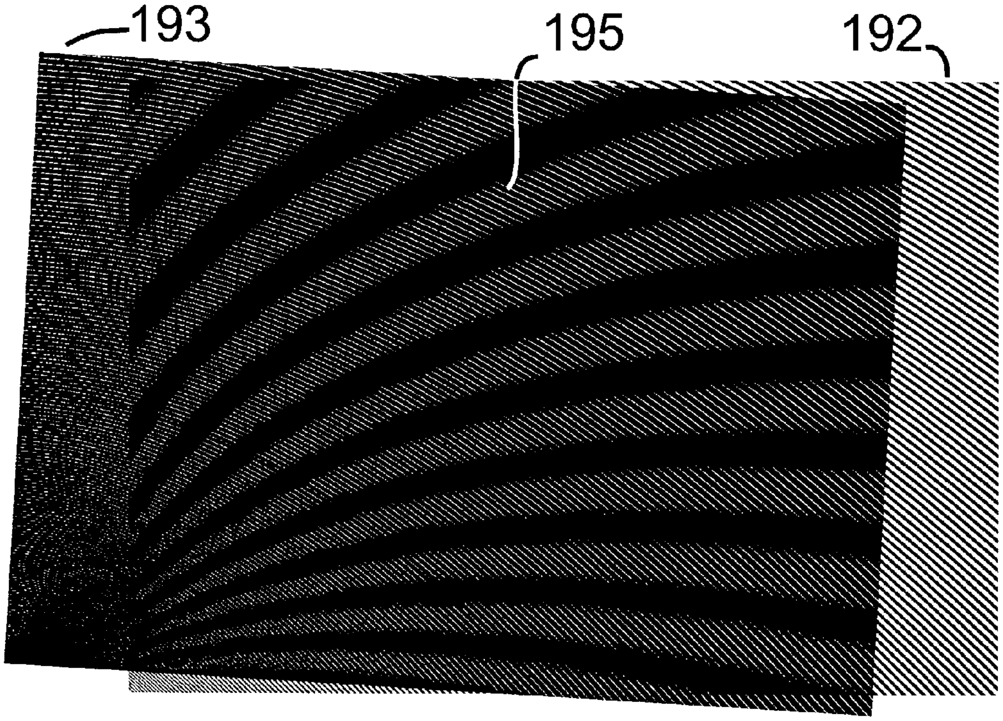
FIGS. 19A and 19B show the similitude between the superposition of a revealing layer and a curvilinear line grating according to the prior art (FIG. 19A) and of the superposition of the same revealing layer and a curvilinear base band layer of the same geometric layout but incorporating the patterns "EPFL" (FIG. 19B)
Figure 19B:
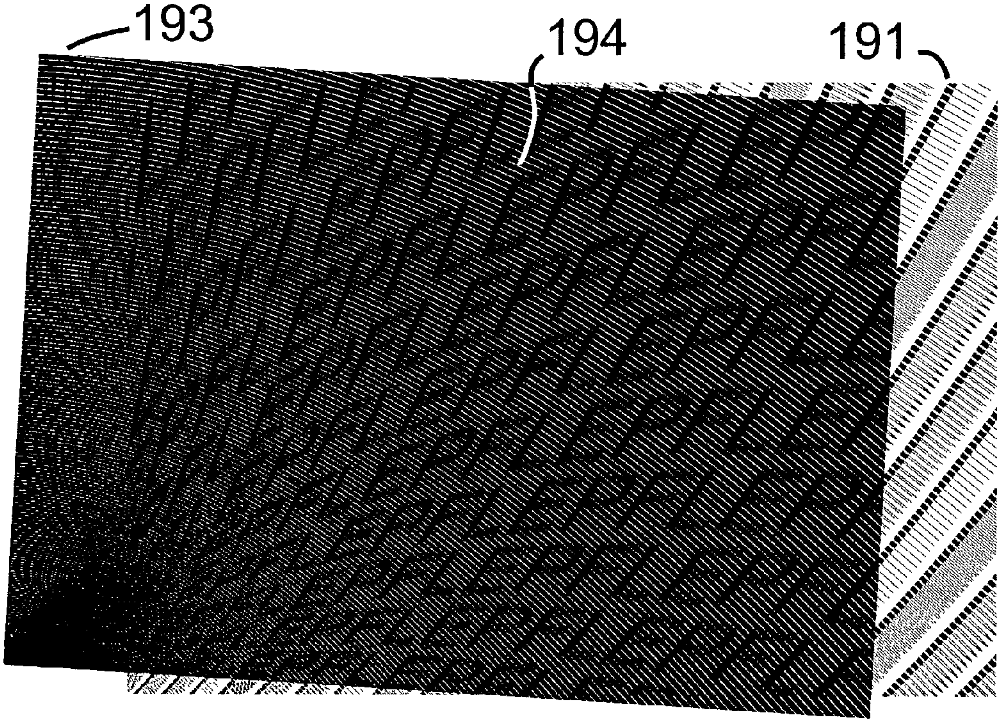
Figure 20A:
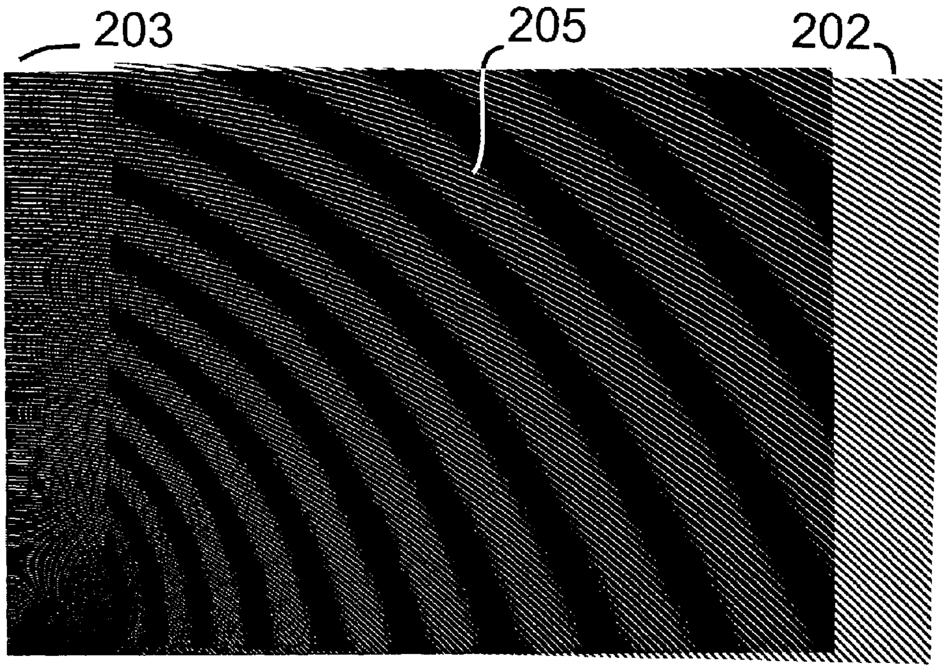
FIGS. 20A and 20B show the superposition of the same layers as in FIGS. 19A and 19B, but at a different relative orientation between base layer and revealing layer.
Figure 20B:
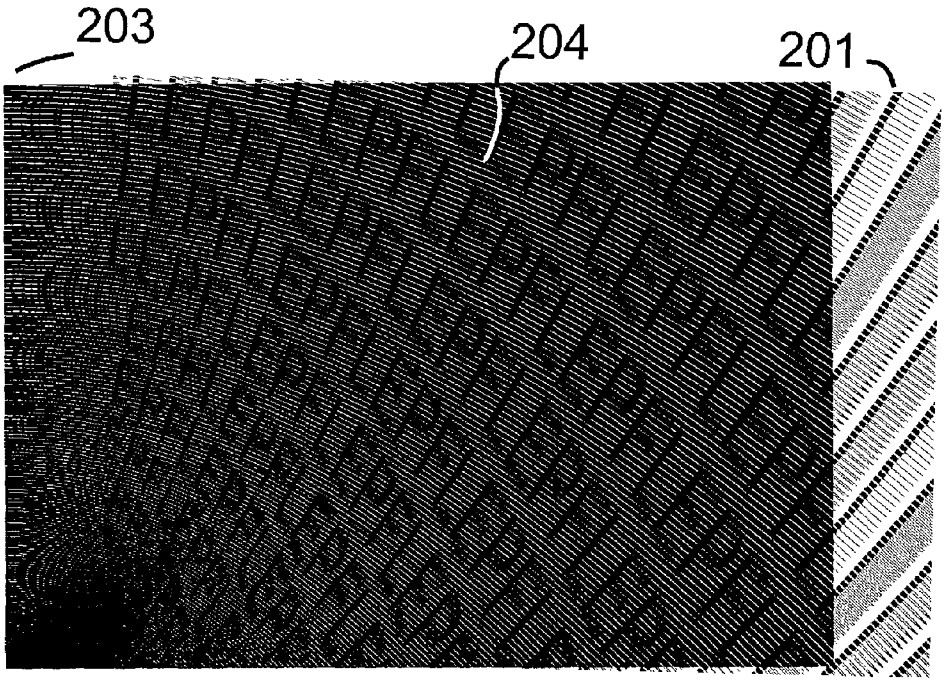

One can observe that the curvilinear band moiré patterns (FIG. 19B, 194) produced by the superposition of a curvilinear base band layer (FIG. 19B, 191) incorporating the "EPFL" pattern and a curvilinear revealing line grating (FIG. 19B, 193) has the same layout as the prior art moiré fringes (curved line moiré FIG. 19A, 195) generated by the superposition of a curvilinear base line grating (FIG. 19A, 192) and a curvilinear revealing line grating (FIG. 19A, 193). A similar observation can be made for FIG. 20B, where 201 shows the base band patterns, 203 the revealing layer, and 204 the revealed band moiré patterns. FIG. 20A, 202 shows the corresponding curved base line grating and FIG. 20A, 205 the revealed prior art line moiré.

The very large number of possible geometric transformations for generating curvilinear base band layers and curvilinear revealing line gratings allows to synthesize individualized base and revealing layers, which, only as a specific pair, are able to produce the desired moiré patterns if they are superposed according to specific geometric conditions (relative position, relative orientation). In addition, it is possible to reinforce the security of widely disseminated documents such as diploma, entry tickets or travel documents by often modifying the parameters which define the geometric layout of the base layer and of its corresponding revealing layer.

Geometric transformations allow to create visually appealing curvilinear band moiré patterns offering various kinds of protective features. Furthermore, special cases can be exploited, where both the base band layer and the revealing layer are curvilinear, but the resulting moiré patterns are periodic. According to [Amidror98, p. 1107], the condition to obtain a periodic moiré with a curvilinear base layer obtained by applying transformation $g_1(x,y)$ to a periodic base layer and transformation $g_2(x,y)$ to a revealing straight line grating is that the coordinate transform $k_1g_1(x,y)+k_2g_2(x,y)$ should be affine, i.e.

$$k_1g_1(x,y)+k_2g_2(x,y)=ax+by+c \quad \text{(eq. 17)}$$

As mentioned above, integer multiples of coefficients $k_1$ and $k_2$ specify the index of the Fourier components of respectively the original periodic base and revealing layers yielding the periodic moiré. Since the strongest moiré effect is generally generated with multiples of the first component ($k_1=1$) of the original layer and of the first negative component ($k_2=-1$) of the revealing layer, for this (1,−1) moiré, eq. 17 is reduced to $$g_1(x,y)-g_2(x,y)=ax+by+c \quad \text{(eq. 18)}$$

The geometric layout of the moiré patterns in the superposition of two given curvilinear gratings can also be computed according to the indicial method described in K. Patorski, The moiré Fringe Technique, Elsevier 1993, pp. 14–21 and summarized in [Amidror00], pp 353–360. The indicial method gives the equations of the centerlines or the borders of the moiré bands in which the curvilinear moiré patterns reside.

Multichromatic Base Band Patterns

The present invention is not limited only to the monochromatic case. It may largely benefit from the use of different colors for producing the patterns located in the bands of the base layer.

One may generate colored band in the same way as in standard multichromatic printing techniques, where several (usually three or four) halftoned layers of different colors (usually: cyan, magenta, yellow and black) are superposed in order to generate a full-color image by halftoning. By way of example, if one of these halftoned layers is used as a base layer according to the present invention, the band moiré patterns that will be generated with a black-and-white revealing line grating will closely approximate the color of this base layer. If several of the different colored layers are used for the base band pattern according to the present invention, each of them will generate with a revealing achromatic line grating a band moiré pattern approximating the color of the base band pattern in question.

Another possible way of using colored bands in the present invention is by using a base layer whose individual bands are composed of patterns comprising sub-elements of different colors. Color images with subelements of different colors printed side by side may be generated according to the multicolor dithering method described in U.S. patent application Ser. No. 09/477,544 filed Jan. 4, 2000 (Ostromoukhov, Hersch) and in the paper "Multi-color and artistic dithering" by V. Ostromoukhov and R. D. Hersch, SIGGRAPH Annual Conference, 1999, pp. 425–432. An important advantage of this method as an anticounterfeiting means is gained from the extreme difficulty in printing perfectly juxtaposed sub-elements of patterns, due to the high precision it requires between the different colors in multi-pass color printing. Only the best high-performance security printing equipment which is used for printing security documents such as banknotes is capable of giving the required precision in the alignment (hereinafter: "registration") of the different colors. Registration errors which are unavoidable when counterfeiting the document on lower-performance equipment will cause small shifts between the different colored sub-elements of the base layer elements; such registration errors will be largely magnified by the band moiré, and they will significantly corrupt the form and the color of the moiré patterns obtained by the revealing line grating layer.

The document protection by microstructure patterns is not limited to documents printed with black-white or standard color inks (cyan, magenta, yellow and possibly black). According to pending U.S. patent application Ser. No. 09/477,544 (Method an apparatus for generating digital halftone images by multi-color dithering, inventors V. Ostromoukhov, R. D. Hersch, filed Jan. 4, 2000), it is possible, with multicolor dithering, to use special inks such as non-standard color inks, metallic inks, fluorescent or iridescent inks (variable color inks) for generating the patterns within the bands of the base layer. In the case of metallic inks for example, when seen at a certain viewing angle, the moiré patterns appear as if they would have been printed with normal inks and at another viewing angle (specular observation angle), due to specular reflection, they appear much more strongly. A similar variation of the appearance of the moiré patterns can be attained with iridescent inks. Such variations in the appearance of the moiré patterns completely disappear when the original document is scanned and reproduced or photocopied.

Another advantage of the multichromatic case is obtained when non-standard inks are used to create the pattern in the bands of the base layer. Non-standard inks are often inks whose colors are located out the gamut of standard cyan magenta and yellow inks. Due to the high frequency of the colored patterns located in the bands of the base layer and printed with non-standard inks, standard cyan, magenta, yellow and black reproduction systems will need to halftone the original color thereby destroying the original color patterns. Due to the destruction of the patterns within the bands of the base layer, the revealing layer will not be able to yield the original band moiré patterns. This provides an additional protection against counterfeiting.

One possible way for printing color images using standard or non-standard color inks (standard or non-standard color separation) has been described in U.S. patent application Ser. No. 09/477,544 filed Jan. 4, 2000 (Ostromoukhov, Hersch) and in the paper "Multi-color and artistic dithering" by V. Ostromoukhov and R. D. Hersch, SIGGRAPH Annual Conference, 1999, pp. 425–432. This method, called "multicolor dithering", uses dither matrices similar to standard dithering, as described above, and provides for each pixel of the base layer (the halftoned image) a means for selecting its color, i.e. the ink, ink combination or the background color to be assigned for that pixel. In the case of a curvilinear base layer, the patterns within the corresponding straight base band layer may be given by a dither matrix incorporating the microstructure patterns. A geometric transformation ($x'=g_x(x,y), y'=g_y(x,y)$) is used in order to obain for positions (x,y) within the curvilinear base band grating space the dither threshold levels associated to corresponding positions (x',y') within the dither matrix. As explained in the above mentioned references, the multicolor dithering method ensures by construction that the contributing colors are printed side by side. This method is therefore ideal for high-end printing equipment that benefits from high registration accuracy, and that is capable of printing with non-standard inks, thus making the printed document very difficult to falsify, and easy to authenticate as explained above.

Mask Based Multiple Band Moiré Patterns

Figure 21:
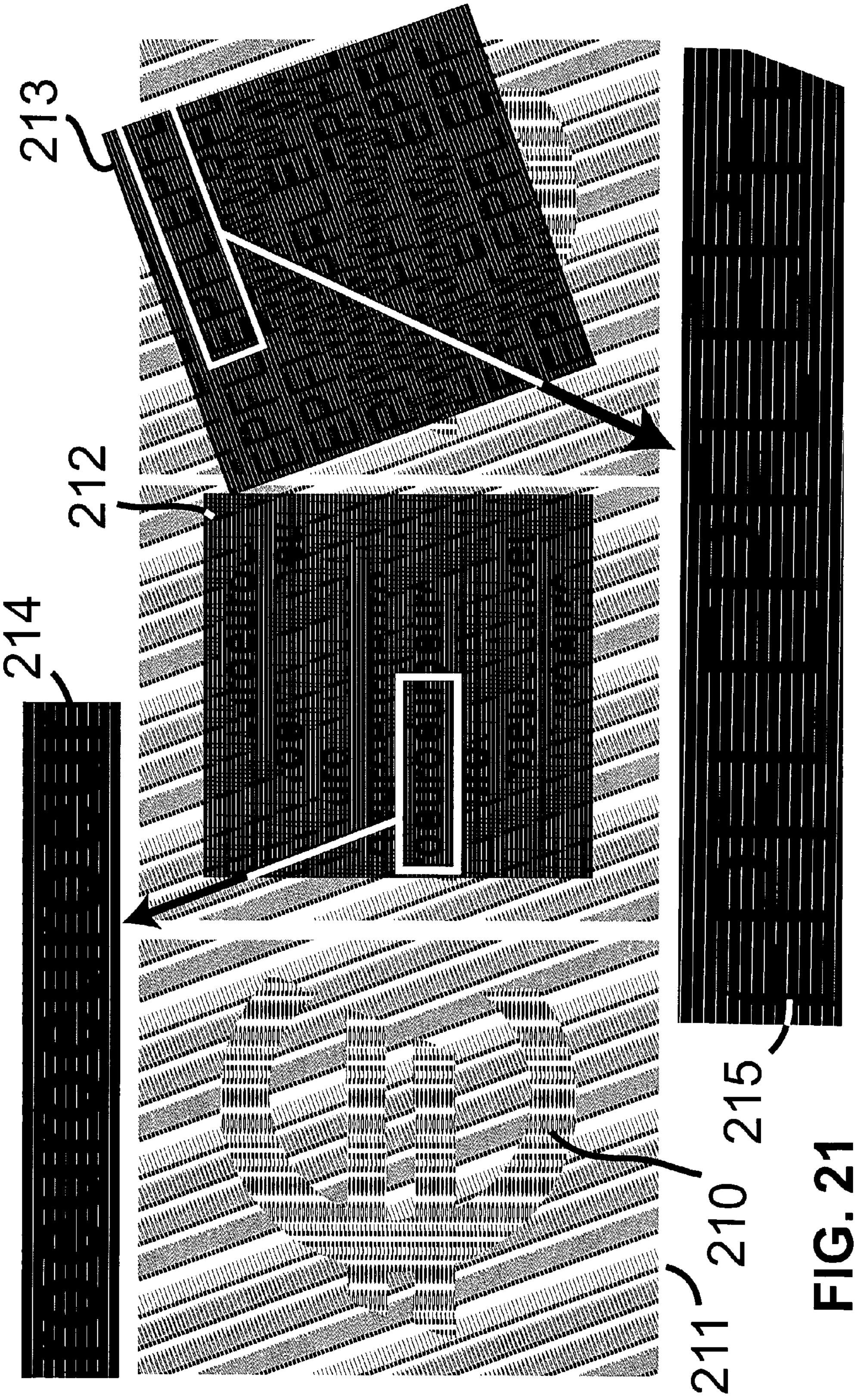
FIG. 21 illustrates the possibility of having different moiré patterns revealed at different orientations of the revealing line grating by having a mask specifying the placement of a first set of base bands at one orientation and the mask background specifying the placement of a second set of base bands at another orientation.

One further interesting variation consists in having a mask specifying the area of the base layer to be rendered according to one base band orientation (FIG. 21, 210) and the surrounding area according to another base band orientation (FIG. 21, 211). According to its orientation, the revealing line grating may then reveal either the band moiré patterns inside (212, enlarged 214) or outside (213, enlarged 215) the mask. By having many masks, one may create many different sets of base band patterns with different orientations and/or periods. One may create a revealing layer with several revealing line gratings either side by side or one on top of the other, thereby allowing to reveal multiple band moiré patterns with a single revealing layer.

Such varieties of base bands offer a high protection against counterfeits, since photocopying devices, especially color photocopiers, tend to reproduce differently small patterns or structures (for example patterns printed with non-standard colors) according to their orientation. Therefore, the revealed moiré patterns may be revealed at some orientations and disappear at other orientations.

Combined Multiple Orientation Band Moiré Patterns

Figure 22:
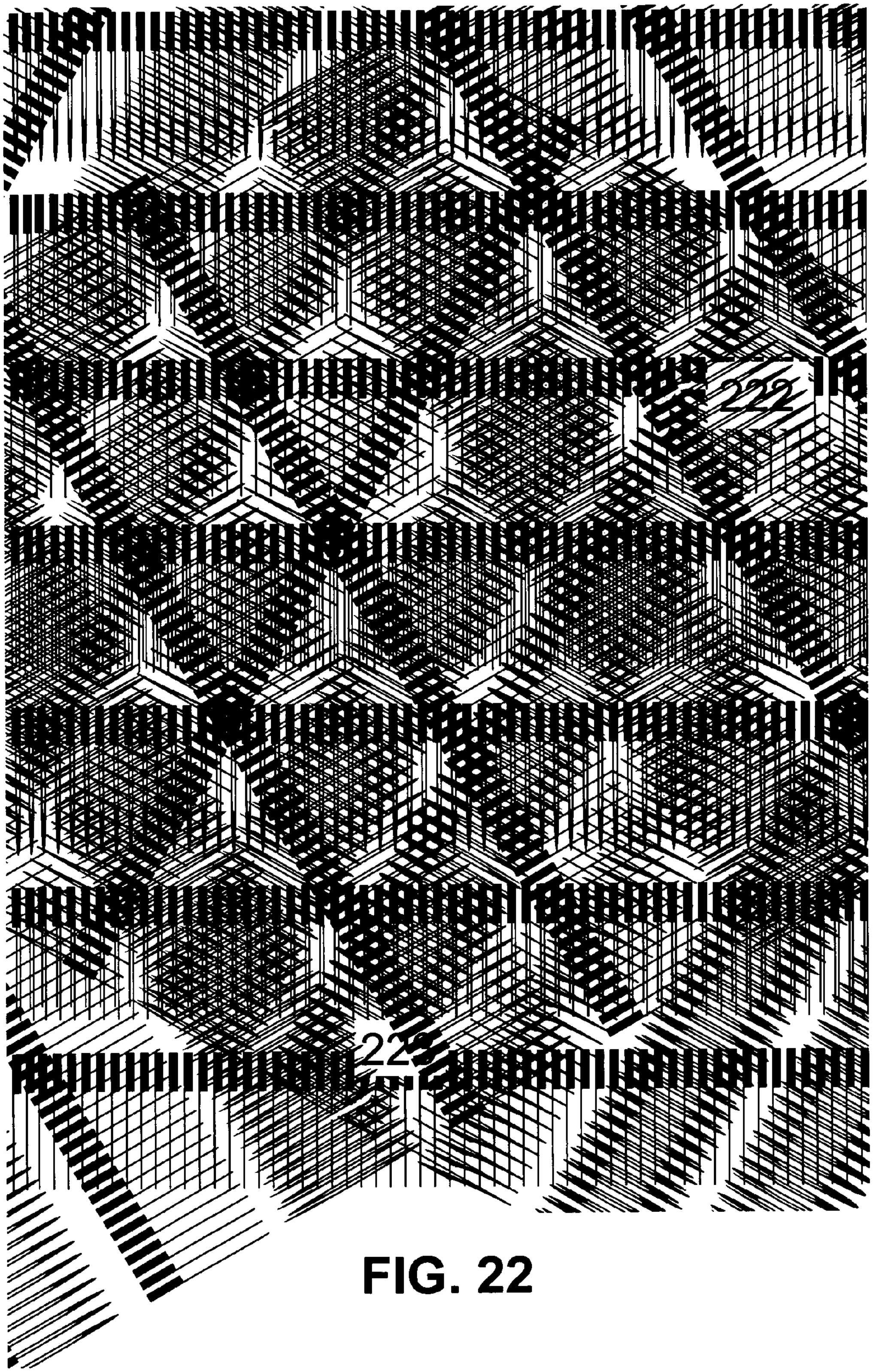
FIG. 22 shows the possibility of superposing within a base layer several sets of base bands which may be revealed at several orientations of the revealing line grating.

Since the band moiré patterns are formed by sampling many different base band patterns, these base band patterns may be disturbed, partially broken or overlaid with other patterns. One may for example embed the base band patterns within other overlaid patterns having various colors or intensities and still be able to generate the desired band moiré patterns. One method enhancing the security of documents is the superposition of multiple band patterns at the same or possibly different orientations and/or periods. FIG. 22 shows as an example a base layer comprising three superimposed base band gratings each having a different orientation and a different base band pattern. The band moiré patterns are revealed by a line grating at different orientations (221, 222, 223). One may observe that as more base band gratings are incorporated into the base layer, it becomes more difficult to recover the shape of the base band patterns incorporated within the base band gratings.

This method offers a large design freedom, since the individual superimposed base band layers may differ in color, intensity, shape, period and orientations. The revealing layers may also differ in orientation and period. Furthermore, one or several base band layers and possibly their revealing layers may be curvilinear. One can then create various levels of authentications, for example by making some moiré patterns public and by keeping other moiré patterns (hidden patterns) secret.

Phase-Based Multi-Pattern Moiré

Figure 23:
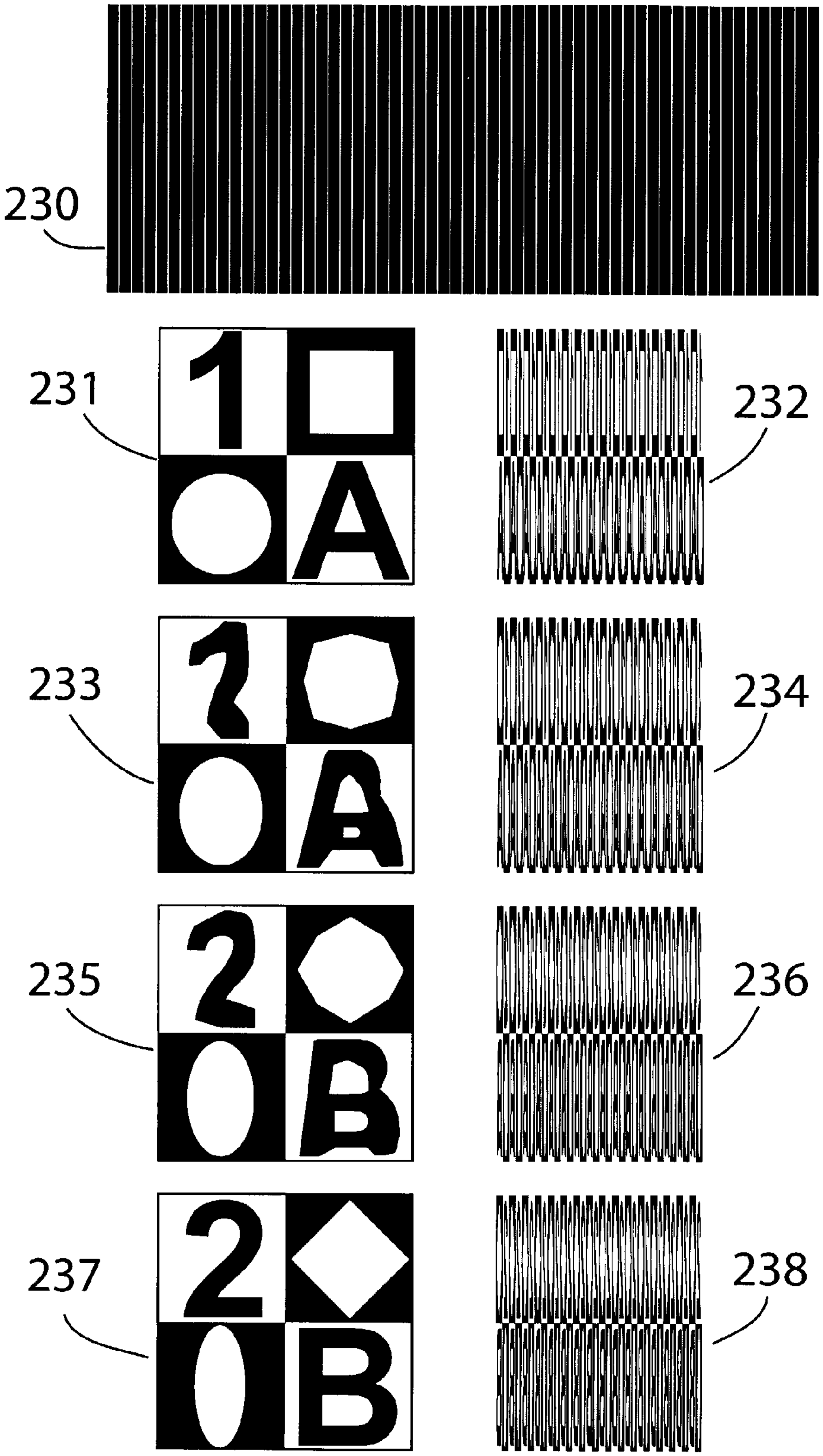
FIG. 23 shows four base band patterns, corresponding base bands and a revealing layer.

An additional very attractive possibility of creating combined multiple band moiré patterns relies on the composition of base bands with multiple interlaced patterns imaged at different phases of the base band layer. The different patterns may for example represent a smoothly evolving shape blended between a first and a second basic shape. For example, FIG. 23 shows 4 base patterns 231, 233, 235, and 237 where 231 represents one fundamental shape, 237 represents the second fundamental shape and where shapes 233 and 235 are intermediate blended shapes. These 4 base patterns are horizontally compressed, horizontally mirrored, rendered and replicated within their respective base layers 232, 234, 236 and 238. The corresponding band moiré patterns may be revealed by superimposing line grating 230 on these base layers.

Figure 24:
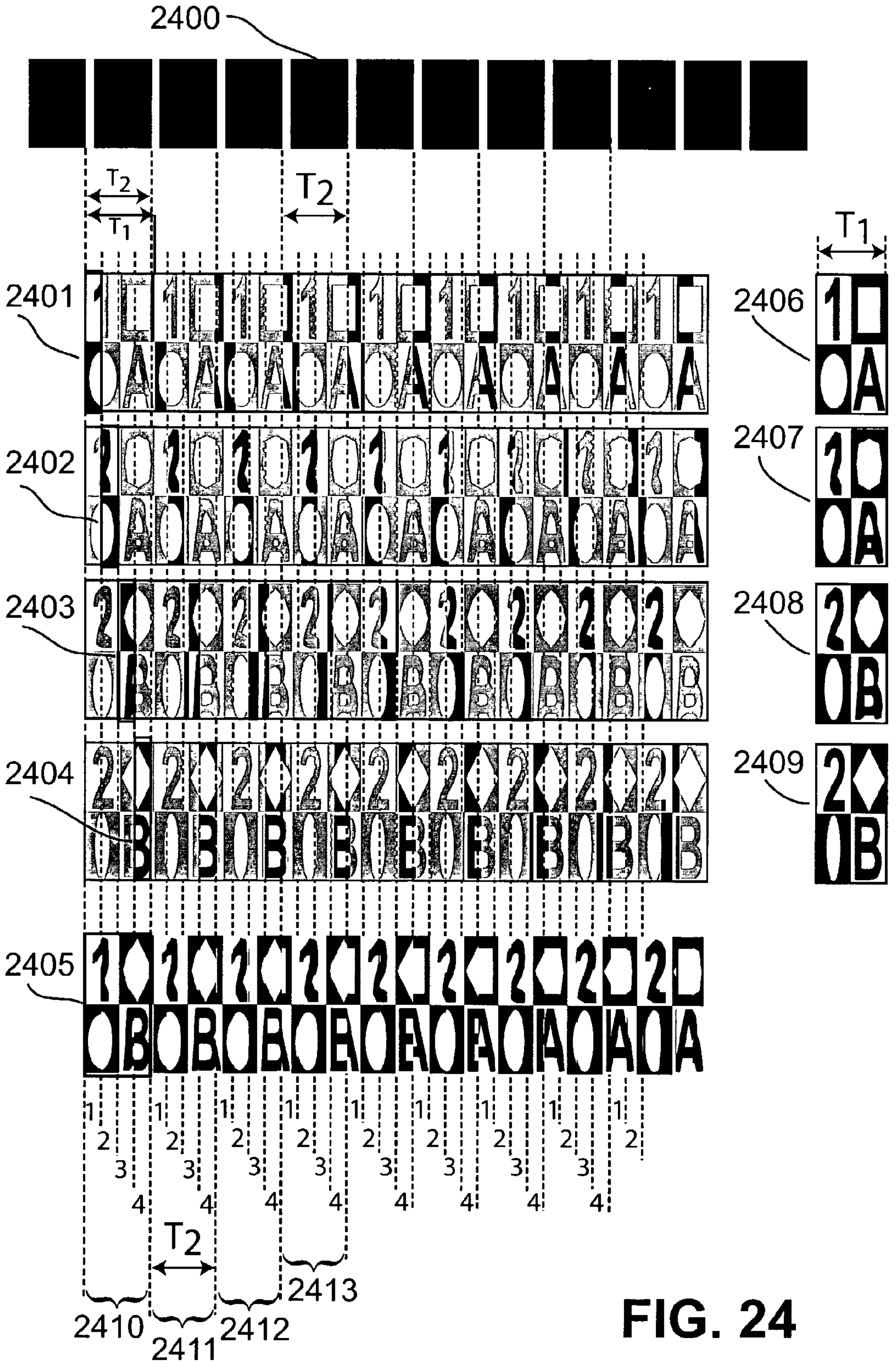
FIG. 24 shows how to conceive a multi-pattern base layer by interleaving small portions of each base band pattern within the base bands of the multi-pattern base layer.

Let us explain how to incorporate a multi-pattern within a base layer (hereinafter called multi-pattern base layer). FIG. 24 shows a horizontally enlarged view of a revealing layer 2400 and of a multi-pattern base layer 2405. When shifting horizontally the revealing layer 2400, the generated multi-pattern moiré is an enlarged and transformed version of the successive base patterns 2406, 2407, 2408, 2409 interlaced within the base layer 2405.

To construct the base layer, let us create a number k of base band patterns 2406, 2407, 2408, and 2409 of width T1. The period T2 of the revealing layer may for example be subdivided according to the selected number of patterns k. Then, the base layer is created by copying a first fraction 1/k of the width of the revealing layer from the first base band pattern into the base layer (2401), then a second fraction 1/k of the width of the revealing layer from the 2nd base band pattern into the base layer (2402), etc. . . . until a kth 1/k fraction of the width of the revealing layer is copied from the kth base band pattern to the base layer. This yields the portions 1, 2, 3, 4 of the first base layer segment 2410 of width T2. The next base layer segment 2411 is constructed by pursuing the copies of successive fractions of the base band patterns into the base layer. The slices extracted from the base band patterns are wrap-around, i.e. these patterns behave as if they would be horizontally repeated within a pattern plane. All other base layer segments 2412, 2413, etc. . . . are constructed until the desired base layer width is filled. The base layer is made of the segments shown in 2405, possibly repeated vertically over the base layer. This creates a base band with multiple interlaced patterns.

Figure 25:
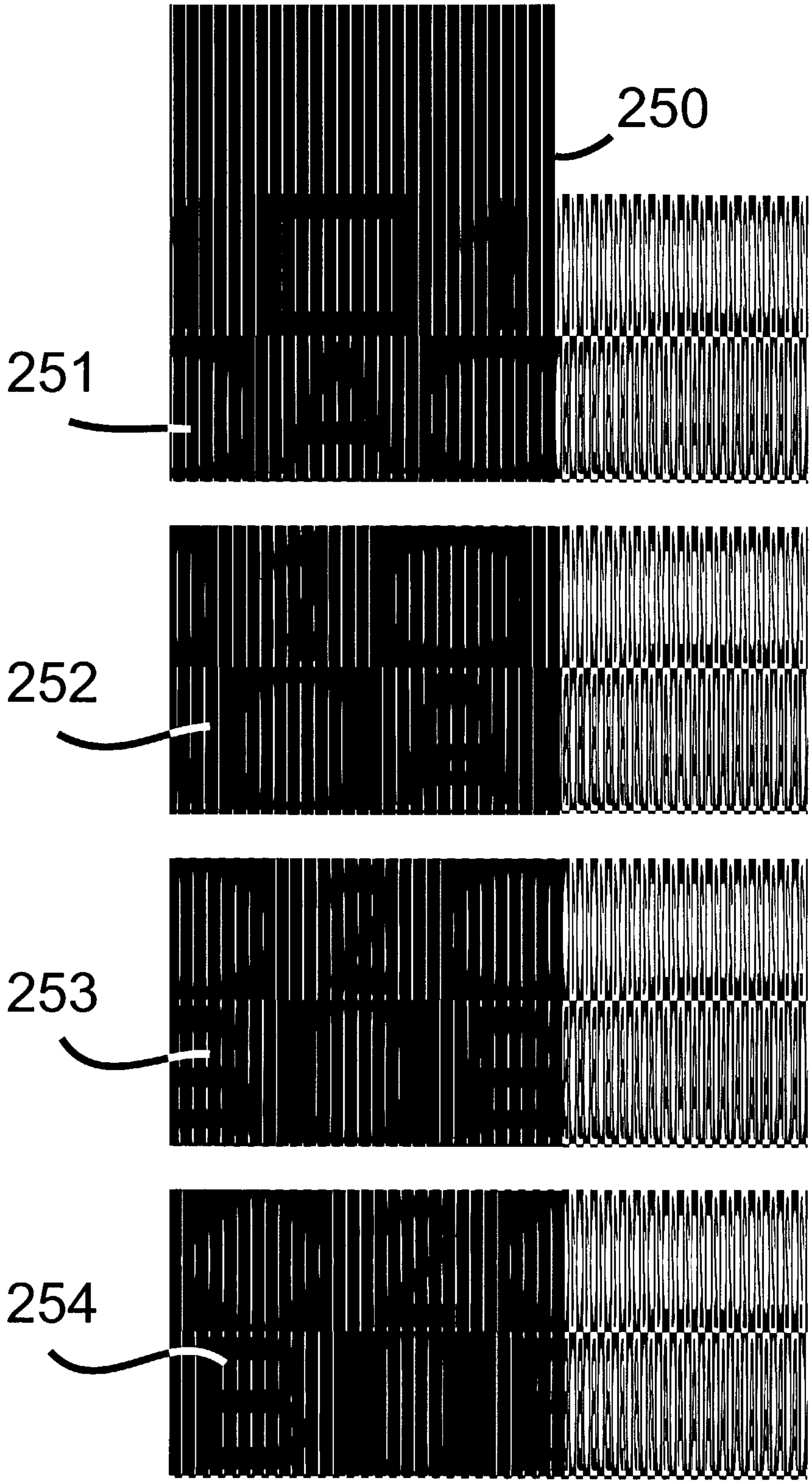
FIG. 25 shows the multi-pattern base layer created according to FIG. 24 and its superposition at different phases with the revealing layer of FIG. 23, producing moiré patterns which represent a smooth blending between successive base band pattern images.

FIG. 25 gives an example of the results: we superpose the same multi-pattern base layer with the revealing line grating 250 and produce, depending on the relative position (phase) of the revealing line grating, moiré patterns 251, 252, 253 or 254-representing intermediate patterns either at or between the base band patterns 2406, 2407, 2408, and 2409 of FIG. 24. Therefore, the produced moiré patterns comprise transformed and blended-instances of the multiple interlaced patterns incorporated into the base layer.

Figure 26:
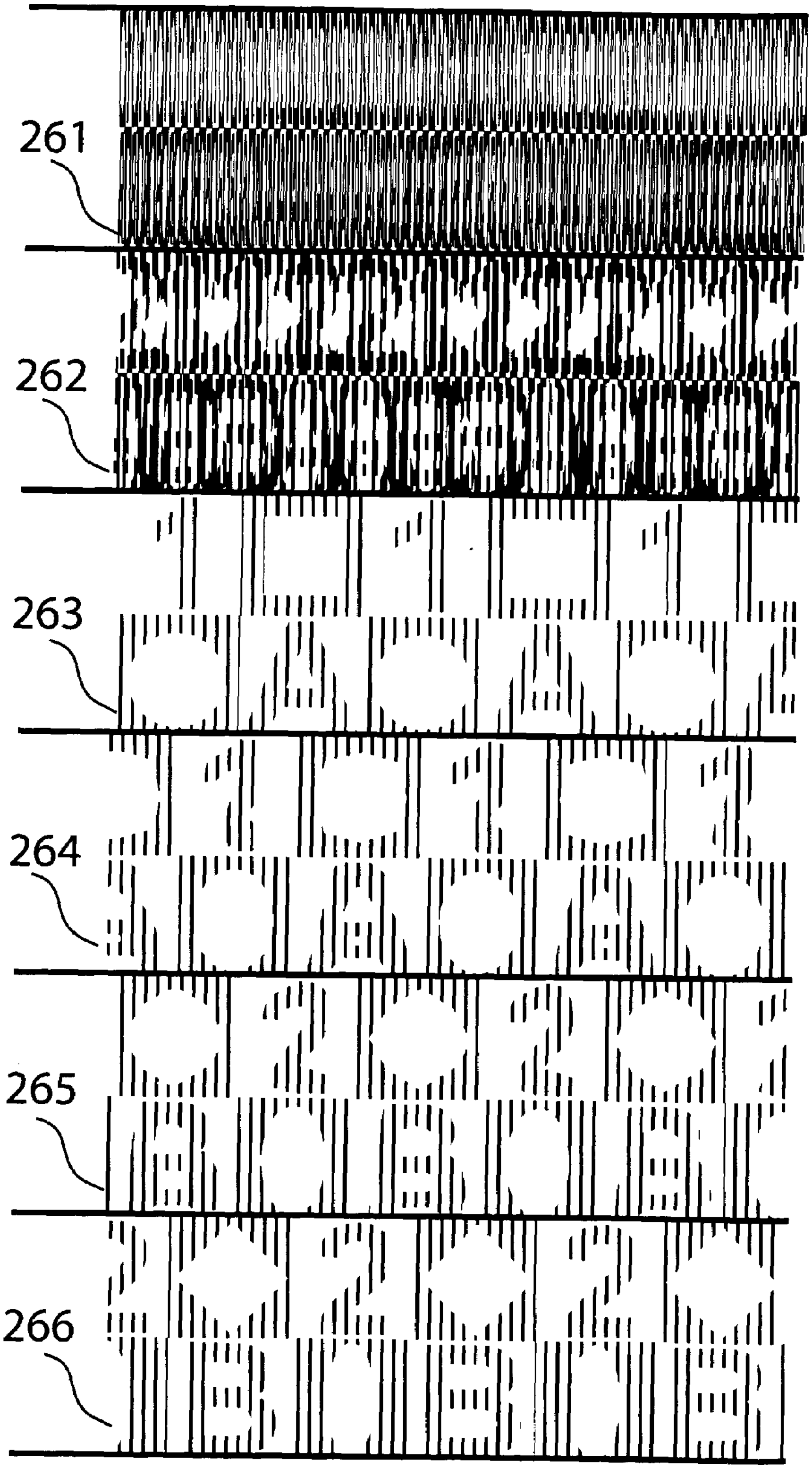
FIG. 26 gives the base and revealing layers for carrying out a comparison between the new invented multi-pattern moiré technique and a prior art method using latent images.

FIG. 26 shows that the invented phase-based multi-pattern moiré method described above is completely different from prior art methods creating interleaved images (latent images) which are revealed by the superposition of a line grating (e.g. the methods described in U.S. Pat. No. 5,396,559, McGrew). In our invention, shifting revealing layer (FIG. 26, 260) placed on top of multi-pattern base layer 261 yields moiré patterns, which are enlarged and transformed instances of the patterns embedded into the base layer. However, in the prior art, the revealed patterns have the same size as the patterns forming the base layer. The prior art base layer 262 is formed by superposing the latent image patterns 263, 264, 265 and 266. One can easily verify, by superposing revealing line grating 260 on top of the prior art base layer 262 that the latent image present in 262 is not enlarged in the revealed pattern. In addition, when displacing the revealing layer horizontally above the base layer, our invention yields smoothly moving and smoothly evolving moiré patterns. This is not the case with the illustrated prior art method. Finally, when slightly rotating the revealing layer, the moiré patterns generated by our method are sheared, but remain well perceptible, whereas prior art revealed patterns get quickly destroyed.

Multi-pattern moiré can also be generated by superposing a revealing line grating on top of a global image dithered with a dither matrix incorporating a multi-pattern microstructure, i.e. a microstructure with several base band patterns at different phases. Such a multi-pattern dither matrix may be generated from a multi-pattern base layer according to the method described in U.S. patent application Ser. No. 09/902,227, Images and security documents protected by microstructures, inventors R. D. Hersch, E. Forler, B. Wittwer, P. Emmel or in the same way as when embedding base band patterns into a dithered image (see section above, "Generation of band patterns").

Figure 27:
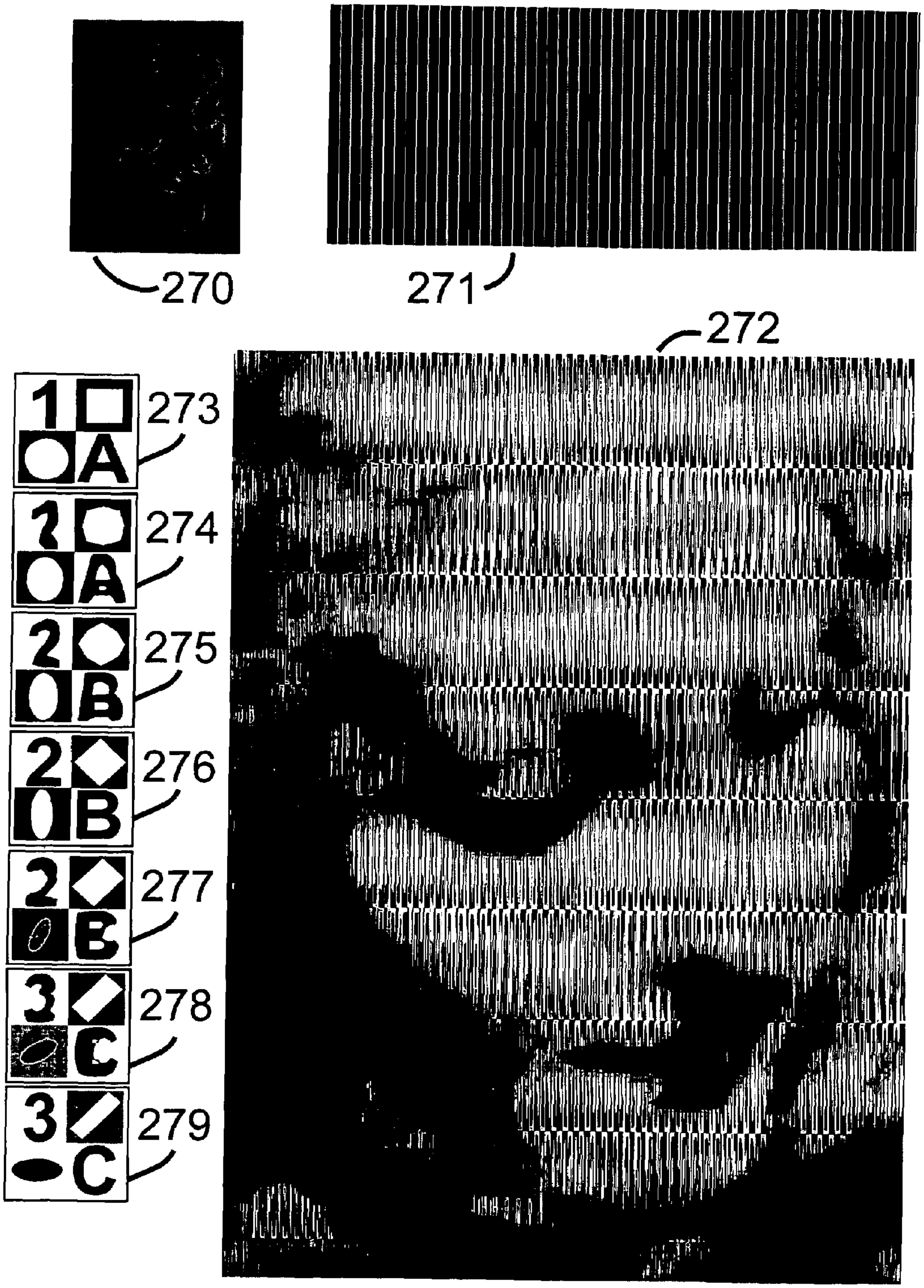
FIG. 27 gives a base layer embodied by an image dithered with a dither matrix incorporating multi-pattern base bands and a revealing layer, which when superposed on the dithered image, produces moiré patterns which evolve according to the patterns shown on the left side of the figure.

FIG. 27 shows an example of such a dithered global image. Without superposition of the revealing layer, only the global image is visible. When superposing and moving horizontally revealing line grating 271 on top of dithered image 272, multi-phase moiré patterns are visible which evolve successively from pattern 273 to 274, 274 to 275, 275 to 276, 276 to 277, 277 to 278, 278 to 279 and from 279 back to 273 or vice-versa.

Evolving Moiré Patterns

Figure 28:
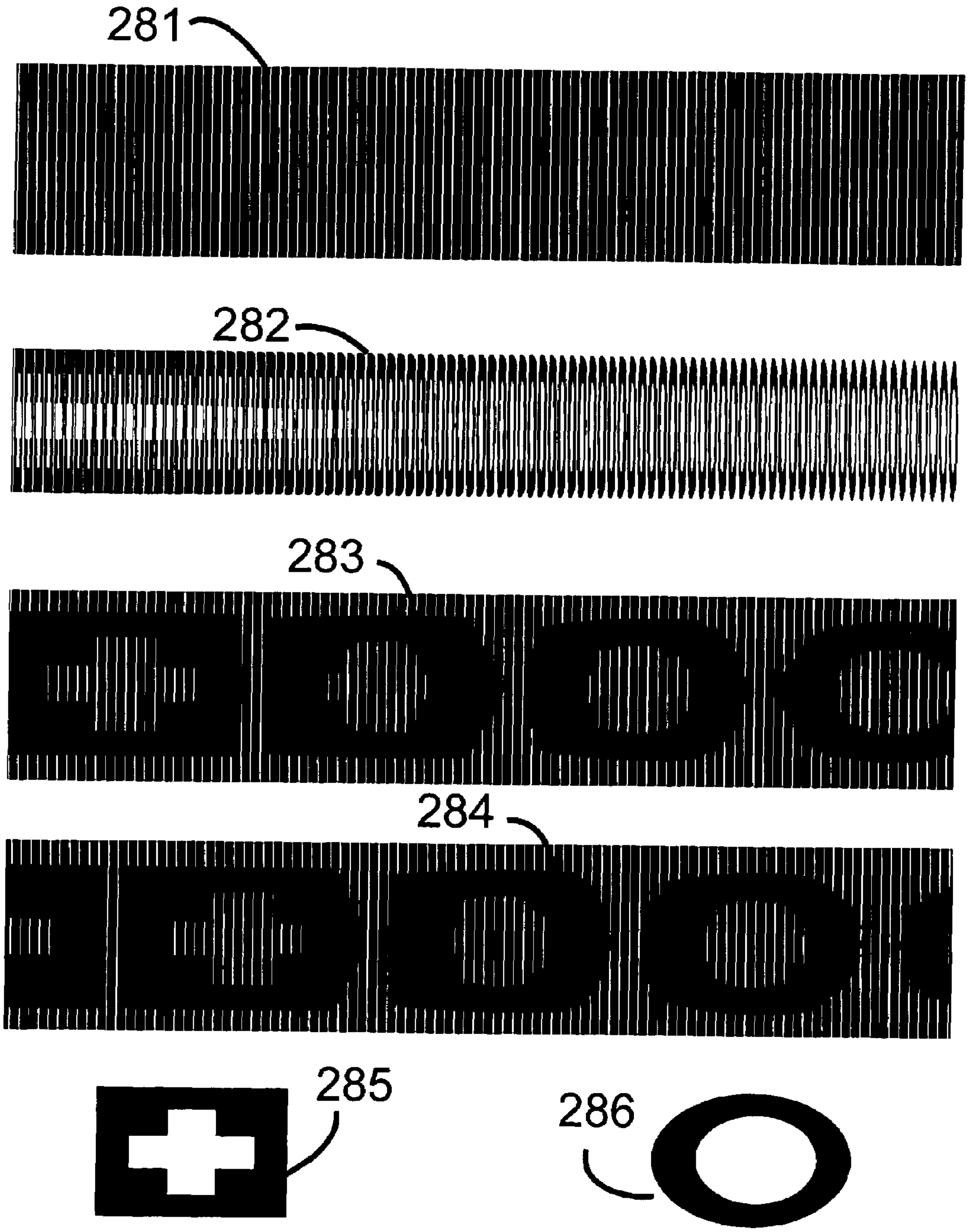
FIG. 28 shows a revealing layer (top) and a base layer incorporating base band patterns evolving smoothly from one base band to the next, which, when superposed with the revealing layer shifted horizontally, produce smoothly evolving moiré patterns.

Base bands need not be exactly repeated. One may create evolving moiré patterns by incorporating evolving patterns within successive base bands. As an example, FIG. 28 gives a revealing line grating layer (281), a base band layer with evolving base band patterns and the corresponding moiré patterns (283, 284) when positioning the revealing line grating layer at different horizontal positions in respect to the base layer. One can see the moiré patterns evolving from a Swiss cross (285) to a "o" like typographic shape (286). When shifting horizontally to the right the revealing layer on top of the base layer, the moiré patterns move smoothly from the left to the right and at the same time continuously modify their shape. FIG. 28, 282 shows clearly at the left side the compressed cross within the base bands and at the right side the compressed "o" shape. At intermediate positions, the base band pattern shape is a blending between these two extremal pattern shapes.

Intermediate base bands incorporate patterns which are blended (or morphed) between the extremal pattern shapes. The relative weights of the left and right extremal base band pattern shapes may be inversely proportional to their respective distances $d_l$, $d_r$ of the current base-band, i.e. the left base band pattern shape has the weight $d_r/(d_l+d_r)$ and the right base band pattern shape has the weight $d_l/(d_l+d_r)$ in the blending (or morphing) process. Shape blending may be carried out with state of the art techniques, such as one of the techniques described in the article: Thomas Sederberg, "A Physically Based Approach to 2D Shape Blending", Proc. Siggraph '92, Computer Graphics, Vol 26. No. 2, July 1992, 25–34.

Protective Features of Straight and Curvilinear Band Moirés

Strong protection against document anticounterfeiting is provided by the fact that any tiny pattern, either black white or color can be generated within the individual bands of the base grating. Such patterns may not be reproducible by standard means such as photocopiers or printers. Thanks to the revealing line grating, the patterns generated by the original document become easily visible either by the naked eye or by an adequate apparatus. Illegal means of reproduction working at a lower resolution than the original pattern printing equipment will not be able to reproduce the original patterns. Since such counterfeited documents do not incorporate the original patterns, the revealing layer will not be able to reveal the original moiré shapes and an inspection by visual means or with an adequate apparatus will reveal that the document is counterfeited.

Protection of Security Documents by Incorporating Verification Information into the Base Bands A further protective feature of the present invention lies in the fact that the revealed moiré patterns may incorporate a code (a number, several numbers or a string of characters) that allows to verify the authenticity of the document. For example, the passport number or a crypted number corresponding to the passport number may be inserted into the base bands of the photograph of the passport holder. One may also incorporate into the base bands a character string corresponding to the name of the passport holder (either directly the name or a crypted instance of the name). By revealing this number, respectively this character string, with a revealing line grating, one may check (either directly by visual inspection, or with an apparatus acting as a verification system) if the number, respectively the character string appearing as moiré patterns corresponds to the passport number or respectively to the name of the passport holder. Thanks to the possibility of having multiple base bands at different orientations and periods within the base layer, one may also conceive several levels of verification. Some verifications could be carried out in a straightforward manner, by looking at the moiré patterns, and some verifications would need to decrypt the appearing moiré patterns in order to verify the authenticity of the document. This is particularly useful to protect for example an identity document as well as the photograph of its holder. Without revealing layer, the photograph is apparent. With a revealing layer, the moiré patterns incorporating the verification code become apparent.

Embodiments of Base and Revealing Layers

The base layer with the bands incorporating the patterns to appear as moiré patterns and the revealing layer may be embodied with a variety of technologies. Important embodiments for the base layer are offset printing, ink-jet printing, dye sublimation printing and foil stamping.

It should be noted that the layers (the base layer, the revealing layer, or both) may be also obtained by perforation instead of by applying ink. In a typical case, a strong laser beam with a microscopic dot size (say, 50 microns or even less) scans the document pixel by pixel, while being modulated on and off, in order to perforate the substrate in predetermined pixel locations. A revealing line grating may be created for example by emboding lines as partially perforated lines made of perforated segments of length l and unperforated segments of length m, with pairs of perforated and unperforated parts (l,m) repeated over the whole line length. For example, one may choose $l=8/10$ mm and $m=2/10$ mm. Successive lines may have their perforated segments at the same or at different phases. Different parameters for the values l and m may be chosen for different successive lines in order to ensure a high resistance against tearing attempts. Different laser microperforation systems for security documents have been described, for example, in "Application of laser technology to introduce security features on security documents in order to reduce counterfeiting" by W. Hospel, SPIE Vol. 3314, 1998, pp. 254–259.

In yet another category of methods, the layers (the base layer, the revealing layer, or both) may be obtained by a complete or partial removal of matter, for example by laser or chemical etching.

To vary the color of moiré patterns, one may also chose to have the revealing line grating made of a set of colored lines instead of transparent lines (see article by I. Amidror, R. D. Hersch, Quantitative analysis of multichromatic moiré effects in the superposition of coloured periodic layers, Journal of Modern Optics, Vol. 44, No. 5, 1997, 883–899)

Although the revealing layer (line grating) will generally be embodied by a film or plastic support incorporating a set of transparent lines on an opaque background, it may also be embodied by a line grating made of cylindric microlenses. Cylindric microlenses offer a higher light intensity compared with corresponding partly transparent line gratings. When the period of the base band layer is small (e.g. less than 1/3 mm), cylindric microlenses as revealing layer may also offer a higher precision. For producing curvilinear band moiré patterns, one can also use as revealing layer curvilinear cylindric microlenses. One may also use instead of cylindric microlenses a diffractive device emulating the behavior of cylindric microlenses, in the same manner as it is possible to emulate a microlens array with a diffractive device made of Fresnel Zone Plates (see B. Saleh, M. C. Teich, Fundamentals of Photonics, John Wiley, 1991, p. 116).

In the case that the base layer is incorporated into an optically variable surface pattern, such as a diffractive device, the image forming the base layer needs to be further processed to yield for each of its pattern image pixels or at least for its active pixels (e.g. black pixels) a relief structure made for example of periodic function profiles (line gratings) having an orientation, a period, a relief and a surface ratio according to the desired incident and diffracted light angles, according to the desired diffracted light intensity and possibly according to the desired variation in color of the diffracted light in respect to the diffracted color of neighbouring areas (see U.S. Pat. No. 5,032,003 inventor Antes and U.S. Pat. No. 4,984,824 Antes and Saxer). This relief structure is reproduced on a master structure used for creating an embossing die. The embossing die is then used to emboss the relief structure incorporating the base layer on the optical device substrate (further information can be found in U.S. Pat. No. 4,761,253 inventor Antes, as well as in the article by J. F. Moser, Document Protection by Optically Variable Graphics (Kinemagram), in Optical Document Security, Ed. R. L. Van Renesse, Artech House, London, 1998, pp. 247–266).

It should be noted that in general the base and the revealing layers need not be complete: they may be masked by additional layers or by random shapes. Nevetheless, the moiré patterns will still become apparent.

Authentication of Documents with Band Moiré Patterns

The present invention concerns methods for authenticating documents and valuable articles, which are based on band moiré patterns. Although the present invention may have several embodiments and variants, several embodiments of particular interest are given here by way of example, without limiting the scope of the invention to these particular embodiments.

In one embodiment of the present invention, the band moiré patterns can be visualized by superposing the base layer and the revealing layer which both appear on two different areas of the same document or article (banknote, check, etc.). In addition, the document may incorporate, for comparison purposes, in a third area of the document an image showing the expected band moiré patterns when base layer and revealing layer are placed one on top of the other according to a preferred orientation and possibly according to a preferred relative position.

In a second embodiment of the present invention, only the base layer appears on the document itself, and the revealing layer is superposed on it by a human operator or an apparatus which visually or optically validates the authenticity of the document. For comparison purposes, the expected band moiré patterns may be represented as an image on the document or on a separate device, for example on the revealing device. The revealing layer may be a line grating imaged on a film or on a transparent sheet of plastic. It may also be realized by cylindric microlenses.

The method for authenticating documents comprises the steps of:

a) superposing a document with a base layer comprising base bands incorporating patterns and a revealing layer comprising a grating of lines, thereby producing moiré patterns and b) comparing said moiré patterns with reference moiré patterns, and depending on the result of the comparison, accepting or rejecting the document, where successive lines of the revealing grating of lines sample within the base layer different instances of the base band patterns and where the produced moiré patterns are a transformation of the base layer patterns comprising an enlargement and possibly other transformations such as mirroring and shearing.

It should be mentioned that in the present invention either the base band layer, the line grating revealing layer or both may be geometrically transformed, and hence aperiodic.

The comparison in step b) above can be done either by human biosystems (a human being with an eye and a brain), or by means of an apparatus described later in the present disclosure.

The reference moiré patterns can be obtained either by image acquisition (for example by a camera) of the superposition of a sample base band layer and a line grating revealing layer, or it can be obtained by computation, using the mathematical formula given above. When the authentication is made by a human, the reference moiré patterns may be also memorized reference moiré patterns, based on previously seen reference band moiré patterns.

In the case where the base band layer is formed as a part of a halftoned image printed on the document, the base band layer patterns will not be distinguishable by the naked eye from other areas on the document. However, when authenticating the document according to the present invention, the moiré patterns will become immediately apparent.

Any attempt to falsify a document produced in accordance with the present invention by photocopying, by means of a desk-top publishing system, by a photographic process, or by any other counterfeiting method, be it digital or analog, will inevitably influence (even if slightly) the size or the shape base band layer pattern incorporated in the document (for example, due to dot-gain or ink-propagation, as is well known in the art). But since moiré patterns between superposed line layers are very sensitive to any microscopic variations in the base or revealing layers, any document protected according to the present invention becomes very difficult to counterfeit, and serves as a means to distinguish between a real document and a falsified one.

If the base band layer is printed on the document with a standard printing process, high security is offered without requiring additional costs in the document production. However, the base band layer may be imaged into the document by other means, for example by generating the base layer on an optically variable device (e.g. a kinegram) and by embedding this optically variable device into the document or article to be protected.

Various embodiments of the present invention can be used as security devices for the protection and authentication of multimedia products, including music, video, software products, etc. that are provided on optical disk media. For instance, the base layer may be printed on an optical disk such as a CD or a DVD while the revealing layer is incorporated in its plastic box or envelope.

Authentication of Valuable Articles by Band Moiré Patterns

Various embodiments of the present invention can be also used as security devices for the protection and authentication of industrial packages, such as boxes for pharmaceutics, cosmetics, etc. For example, the box lid may incorporate the base layer, while the revealing layer is located on the box. Packages that include a transparent part or a transparent window are very often used for selling a large variety of products, including, for example, audio and video cables, casettes, perfumes, etc., where the transparent part of the package enables customers see the product inside the package. However, transparent parts of a package may be also used advantageously for authentication and anticounterfeiting of the products, by using a part of the transparent window as the revealing layer (where the base layer is located on the product itself). It should be noted that the base layer and the revealing layer can be also printed on separate security labels or stickers that are affixed or otherwise attached to the product itself or to the package. A few possible embodiments of packages which can be protected by the present invention are illustrated below, and are similar to the examples described in U.S. patent application Ser. No. 09/902,445 (Amidror and Hersch) in FIGS. 17–22, therein. However, since in the present invention, the moiré patterns are clearly visible in reflective mode, the incorporation of base band patterns in the base layer and the use of a line grating as the revealing layer makes the protection of valuable articles much more effective than with the methods described in U.S. patent application Ser. No. 09/902,445 (Amidror and Hersch).

Figure 29A:
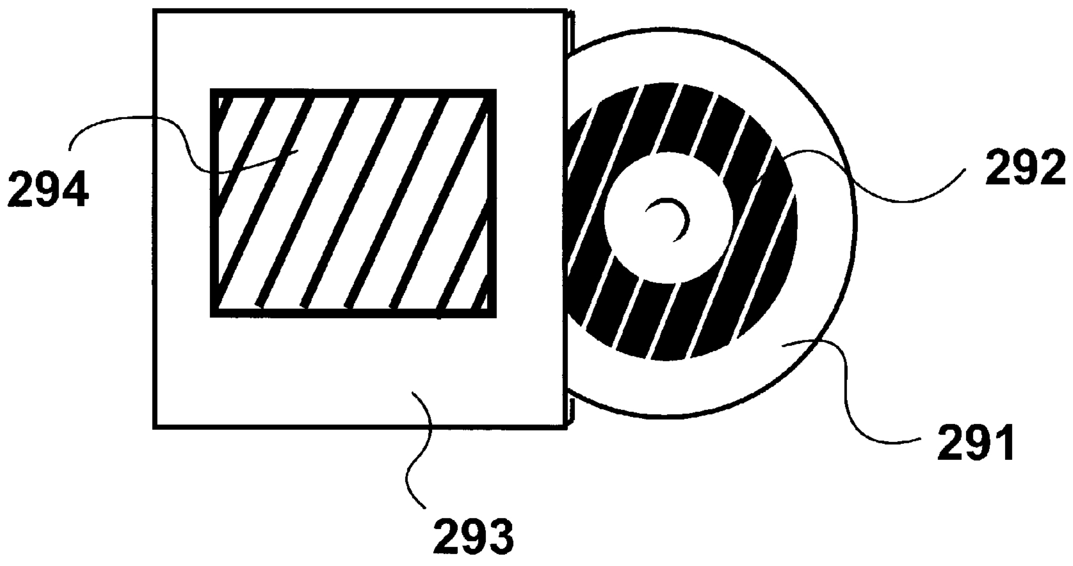
FIGS. 29A and 29B, illustrate schematically a possible embodiment of the present invention for the protection of optical disks such as CDs, CD-ROMs and DVDs.
Figure 29B:
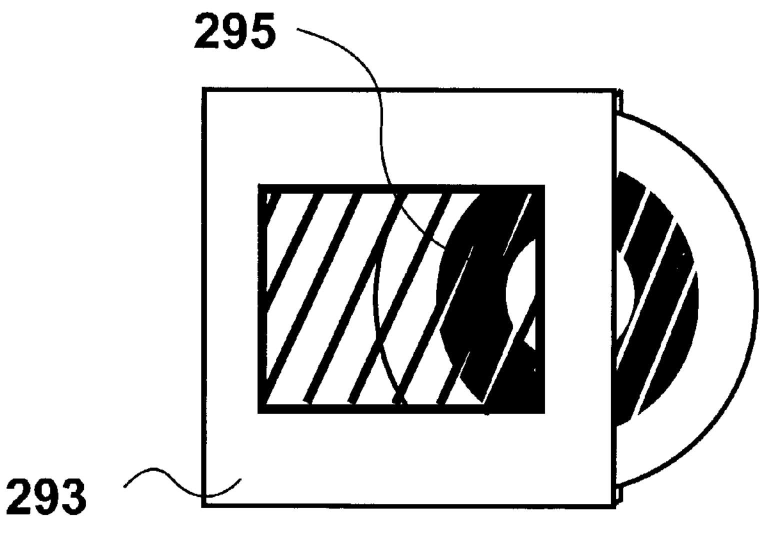

FIG. 29A illustrates schematically an optical disk 291, carrying at least one base layer 292, and its cover (or box) 293 carrying at least one revealing layer (revealing line grating) 294. When the optical disk is located inside its cover (FIG. 29B), moiré patterns 295 are generated between one revealing layer and one base layer. While the disk is slowly inserted or taken out of its cover 293, these moiré patterns vary dynamically. These moiré patterns serve therefore as a reliable authentication means and guarantee that both the disk and its package are indeed authentic. In a typical case, the moiré patterns may comprise the logo of the company, or any other desired text or symbols, either in black and white or in color.

Figure 30:
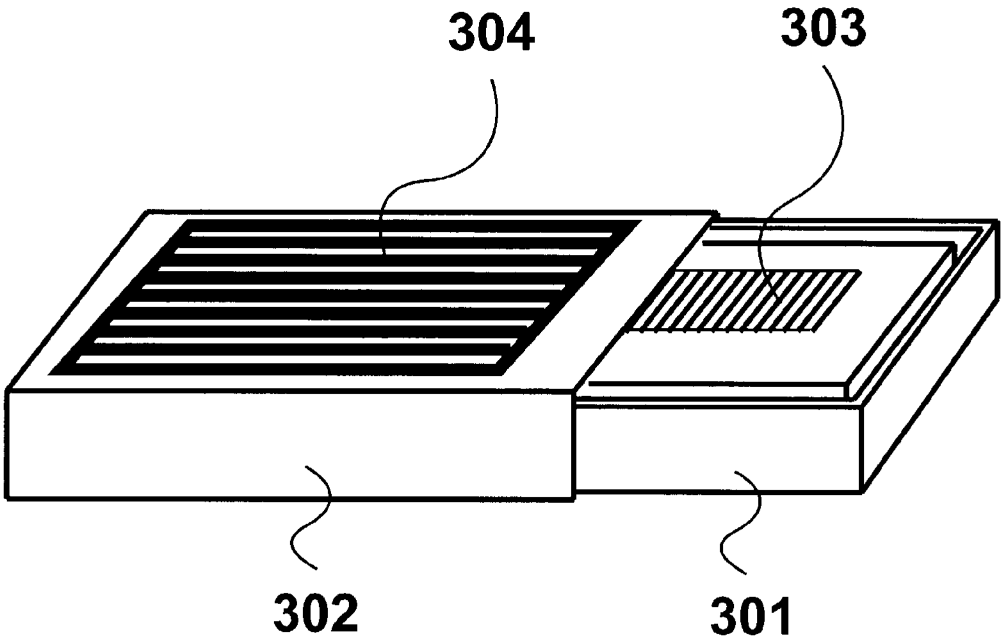
FIG. 30 illustrates schematically a possible embodiment of the present invention for the protection of products that are packed in a box comprising a sliding part.

FIG. 30 illustrates schematically a possible embodiment of the present invention for the protection of products that are packed in a box comprising a sliding part 301 and an external cover 302, where at least one element of the moving part, e.g. a product, carries at least one base layer 303, and the external cover 302 carries at least one revealing layer (revealing line grating) 304. By sliding the product into the cover, dynamic moiré patterns such as evolving moiré patterns or multi-pattern moiré may be generated.

Figure 31:
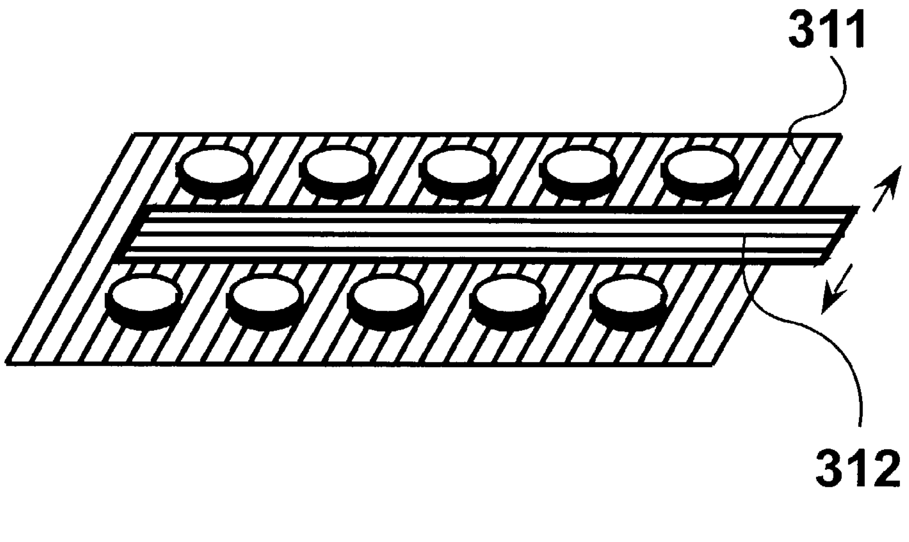
FIG. 31 illustrates schematically a possible embodiment of the present invention for the protection of pharmaceutical products.

FIG. 31 illustrates a possible protection for pharmaceutical products such as medical drugs. The base layer 311 may cover the full surface of the possibly opaque support of the medical product. The revealing layer 312 may be embodied by a moveable stripe made of a sheet of plastic incorporating the revealing line grating. By pulling the revealing layer in and out or by moving it laterally, the revealed moiré patterns become dynamic.

Figure 32:
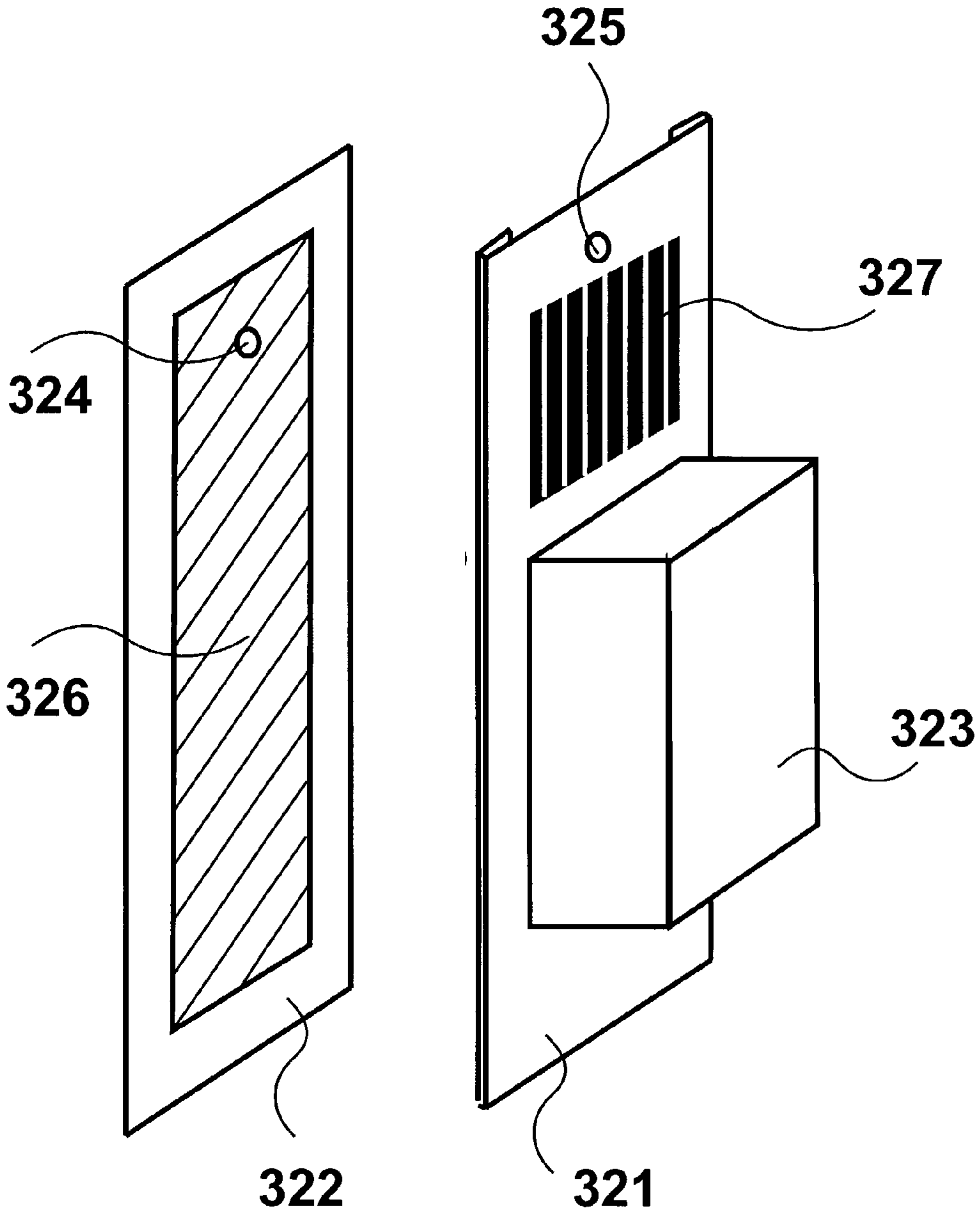
FIG. 32 illustrates schematically a possible embodiment of the present invention for the protection of products that are marketed in a package comprising a sliding transparent plastic front.

FIG. 32 illustrates schematically another possible embodiment of the present invention for the protection of products that are marketed in a package comprising a sliding transparent plastic front 321 and a rear board 322, which may be printed and carry a description of the product. Such packages are often used for selling video and audio cables, or any other products, that are kept within the hull (or recepient) 323 of plastic front 321. Often packages of this kind have a small hole 324 in the top of the rear board and a matching hole 325 in plastic front 321, in order to facilitate hanging the packages in the selling points. The rear board 322 may carry at least one base layer 326, and the plastic front may carry at least one revealing layer 327, so that when the package is closed, moiré patterns are generated between at least one revealing layer and at least one base layer. Here, again, while the sliding plastic front 321 is slided along the rear board 322, the moiré patterns vary dynamically.

Figure 33:
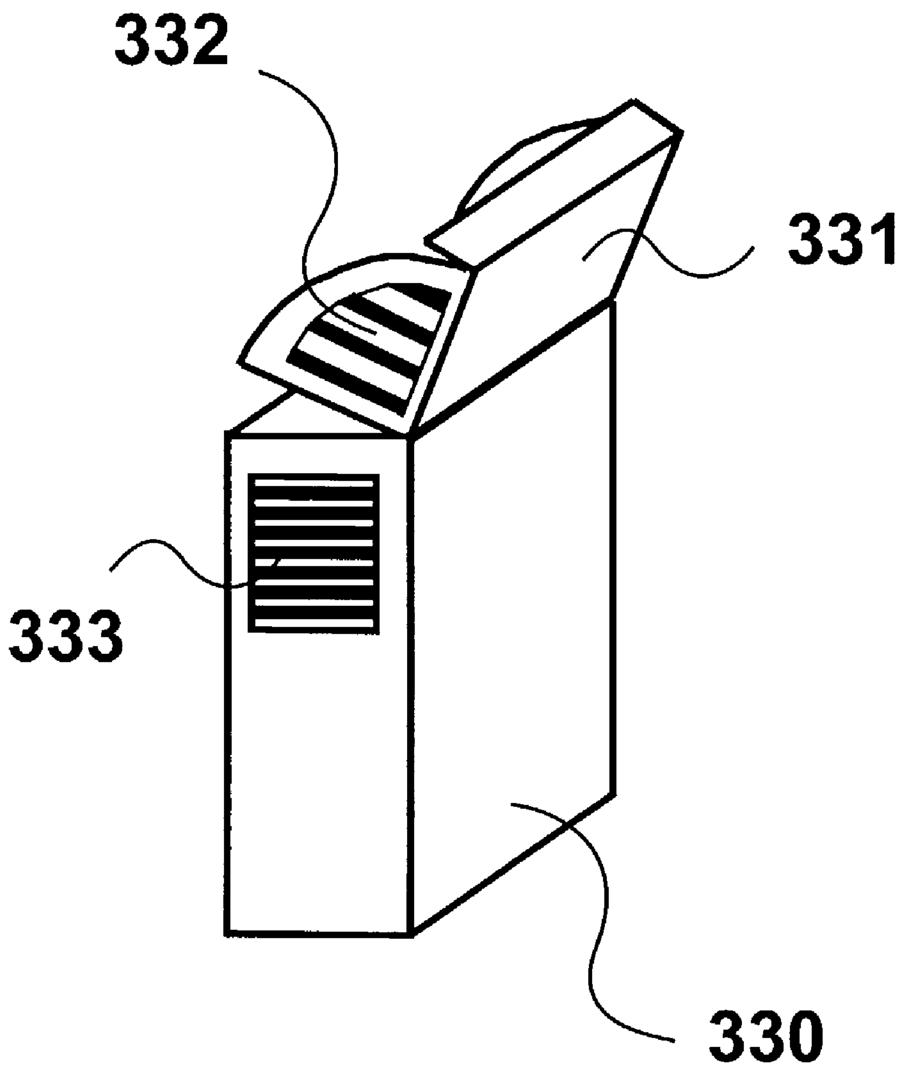
FIG. 33 illustrates schematically a possible embodiment of the present invention for the protection of products that are packed in a box with a pivoting lid.

FIG. 33 illustrates schematically yet another possible embodiment of the present invention for the protection of products that are packed in a box 330 with a pivoting lid 331. The pivoting lid 331 carries at least one base layer 332, and the box itself carries at least one revealing layer 333. When the box is closed, base layer 332 is located just behind revealing layer 333, so that moiré patterns are generated. And while pivoting lid 331 is opened or closed, the moiré patterns vary dynamically.

Figure 34:
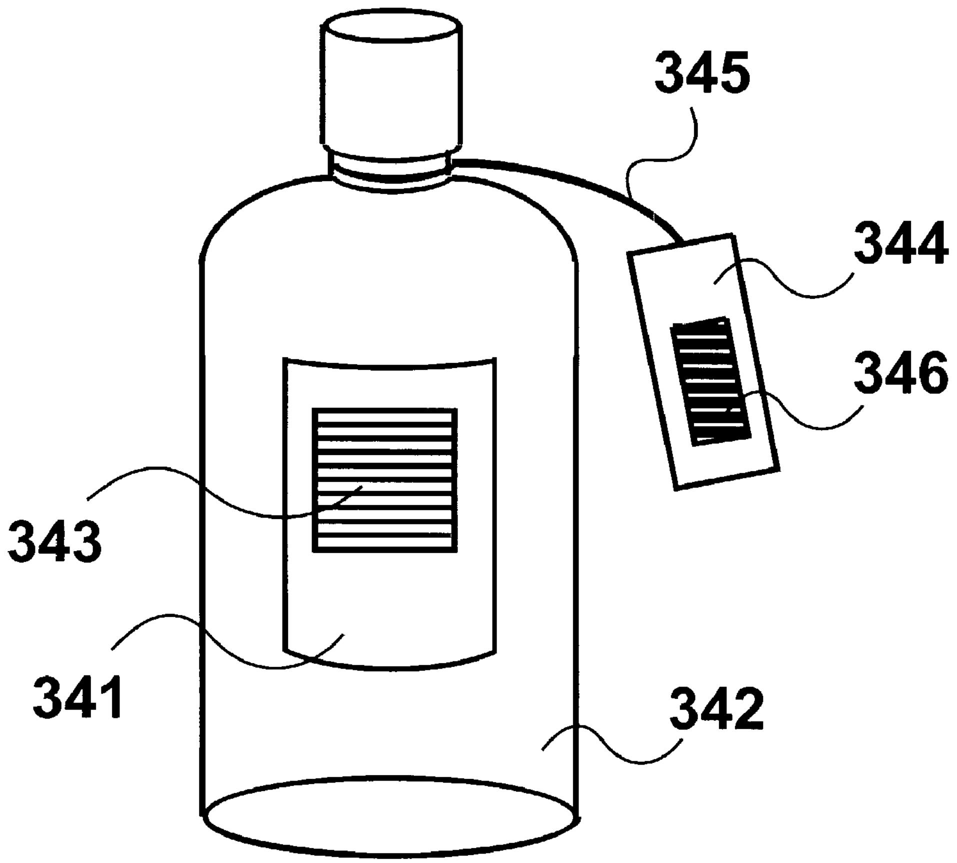
FIG. 34 illustrates schematically a possible embodiment of the present invention for the protection of products that are marketed in bottles (such as whiskey, perfumes, etc.)

FIG. 34 illustrates schematically yet another possible embodiment of the present invention for the protection of products that are marketed in bottles (such as vine, whiskey, perfumes, etc.). For example, the product label 341 which is affixed to bottle 342 may carry base layer 343, while another label 344, which may be attached to the bottle by a decorative thread 345, carries the revealing layer 346. The authentication of the product can be done in by superposing the revealing layer 346 of label 344 on the base layer 343 of label 341, so that clearly visible moiré patterns are generated, for example with the name of the product.

In cases where the revealing layer and the base layer may slide on top of each other, mainly along one direction, such as in the embodiments shown in FIGS. 29A, 29B, 30, 31, 32, one may conceive multi-pattern moirés or evolvable moiré patterns, where the translation of the revealing layer makes successively different moiré patterns visible and therefore creates an animation.

In case where the revealing layer and the base layer may rotate on top of each other as in FIG. 33, one may preferably conceive the base layer and revealing layer so as to yield specially attractive moiré patterns for this purpose.

Sometimes it is possible to exchange the revealing layer and the base layer in their locations or in their roles.

Authentication of Dynamically Printed Personalized Documents

Thanks to the capabilities of generating automatically microstructure images explained for example in U.S. patent application Ser. No. 09/902,227, Images and security documents protected by microstructures, inventors R. D. Hersch, E. Forler, B. Wittwer, P. Emmel, filed 3 Dec. 2001 or in successor PCT application PCT/IB02/02686, R. D. Hersch, B. Wittwer, E. Forler, P. Emmel, D. Biemann, D. Gorostidi filed Jul. 5, 2002, it is possible to generate and print on the fly personalized documents such as travel documents and entry tickets. These documents include images made of microstructure incorporating text giving information about the document holder as well as about the purpose of the document, e.g. a travel document specifying the departure and arrival locations and the date of validity, or an entry ticket to a sport event specifying the event, the place number and the validity in terms of date and hour. To make falsification very difficult, these inventions propose methods for generating two layers of microstructures, one at a low frequency, i.e. easily visible by simple visual inspection and one at high frequency which needs careful visual inspection or inspection with a magnifying glass.

In the present invention, we propose to synthesize this second microstructure layer as a base band layer and reveal it thanks to a revealing line grating. This allows a straightforward direct inspection of the first microstructure pattern layer and the inspection of the second microstructure pattern layer with a revealing line grating, embodied either as a film, as a piece of plastic, as cylindric microlenses or as a diffractive device emulating cylindric microlenses.

A simple method for generating images incorporating first level, directly visible microstructure patterns as well as tiny second level microstructure patterns revealable with a revealing line grating consists in creating a dither matrix incorporating the tiny second level base band patterns and to use this dither matrix as the high-frequency dither array for the target image equilibration by postprocessing described in detail in U.S. patent application Ser. No. 09/902,227, Images and security documents protected by microstructures, inventors R. D. Hersch, E. Forler, B. Wittwer, P. Emmel.

An alternative method for generating images incorporating first level, directly visible microstructure patterns as well as tiny second level microstructure patterns revealable with a revealing line grating consists in applying the following steps:

a) select a global image, for example a landscape or the photograph of the document holder;
b) create the first level microstructure, possibly as a bitmap or as a multi-intensity image according to the information associated with the document;
c) create, possibly according to U.S. patent application Ser. No. 09/902,227, (R. D. Hersch, et. al), or according to the article by Oleg Veryovka and John Buchanan "Texture-based Dither Matrices" Computer Graphics Forum Vol. 19, No. 1, pp 51–64, a dithered global image incorporating the first level microstructure;
d) create the second level microstructure patterns (also called nanostructure patterns) as a bitmap or as a multi-intensity image;
e) create, in a similar manner as in (c) the dithered global image incorporating the second level microstructure patterns (nanostructure patterns);
f) Generate the final dithered global image by an operation combining the two dithered images, i.e. by creating for each pixel a combination, e.g. a weighted mean or a logical operation between the dithered global image incorporating the first level microstructure and the dithered global image incorporating the second level microstructure patterns. The type of operation and possibly the relative weights can be tuned so as to make either the first level microstructure or the second level microstructure patterns more apparent. The weighted mean operation can be applied either on the pixel intensity values, yielding a final grayscale image or it can be applied spatially, for example by selecting the size of the final combined bi-level image to be 4×4 times higher than the size of the dithered images. To carry out the spatial weighted mean, one may replicate a 4×4 (or 8×8) pixel matrix and depending on the relative weights of the two dithered images to be combined, associate a given number of pixels within the 4×4 matrix to one of the two dithered images and the remaining pixels to the other dithered image. To yield good results, the order of assignment of pixels within the 4×4 matrix may follow the distribution of the Bayer dither threshold levels (H. R. Kang, Digital Color Halftoning, SPIE Press, 1999, pp. 279–282, $T_4$).

In order to provide a smooth global image, one may also chose to dither only a fraction (e.g. ¼) of the base bands covering the global image with the dither matrix incorporating the second level microstructure patterns and the remaining fractions (e.g. ¾) according to standard dithering methods, for example with a dither matrix comprising small clustered dots. This is somehow similar to multi-pattern dithering, where one set of base band patterns are the second level microstructure patterns and the other sets of base band patterns are standard clustered dots.

The resulting final combined two-level dithered global image incorporates both an easily readable microstructure and microstructure patterns revealable with a revealing line grating. More complex variants of such a document may incorporate several first level microstructures at different orientations and periods and possibly several second level microstructure patterns, also at different orientations and periods.

Apparatus for the Authentication of Documents Using the Moiré Pattern Image

An apparatus for the visual authentication of documents comprising a base layer may comprise a revealing layer made of a line grating prepared in accordance with the present disclosure, which is to be placed on top of the base layer of the document. The document may be illuminated from above (reflective mode) or possibly from below (transmission mode).

If the authentication is made by visualization, i.e. by a human operator, human biosystems (a human eye and brain) are used as a means for the acquisition of the moiré patterns produced by the superposition of the base layer and the revealing layer, and as a means for comparing the acquired moiré patterns with reference (or memorized) moiré patterns. The source of light in this case may be either natural (such as daylight) or artificial.

Figure 35:
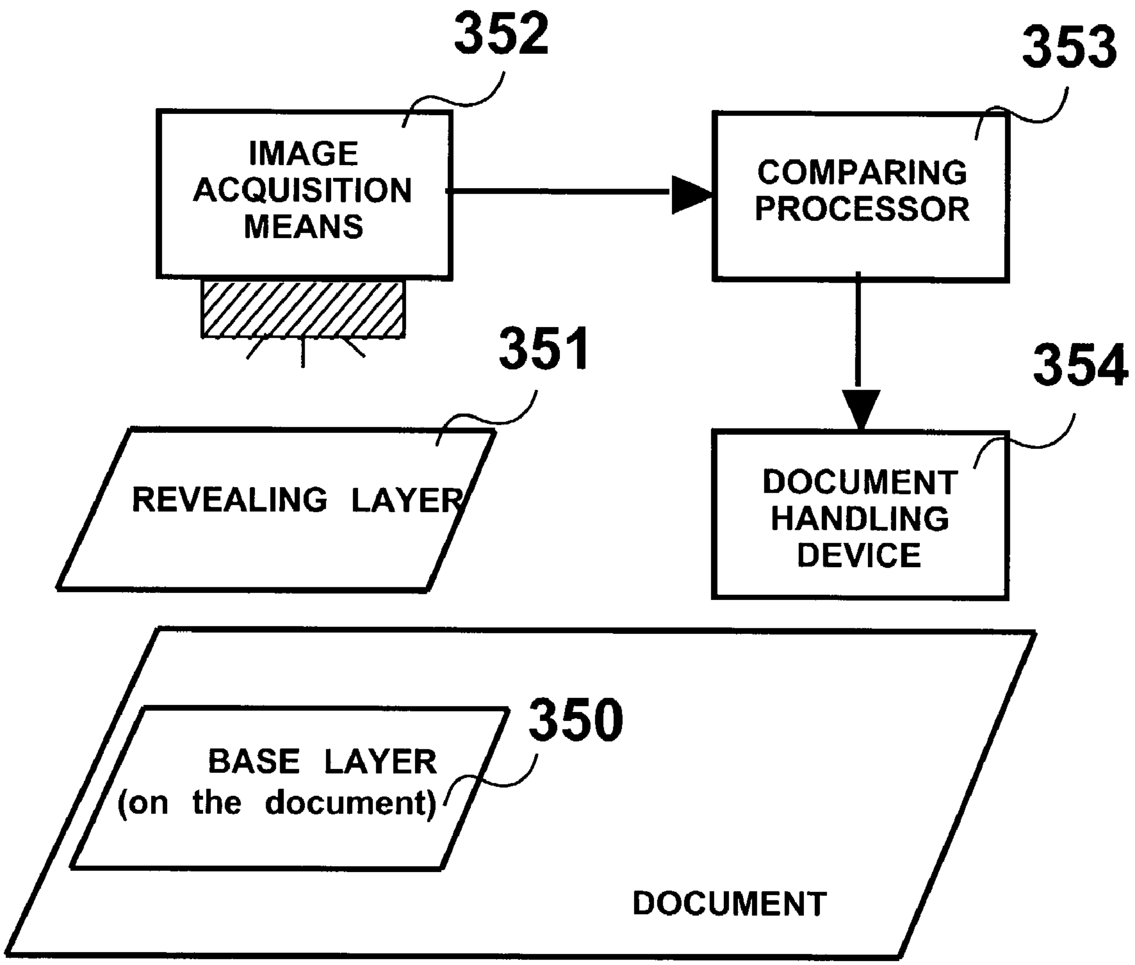
FIG. 35 illustrates a block diagram of an apparatus for the authentication of documents by using moiré patterns.

An apparatus for the automatic authentication of documents, whose block diagram is shown in FIG. 35, comprises a revealing layer 351 made of a grating of lines, an image acquisition means 352 such as a camera, a source of light (not shown in the drawing), and a comparing system 353 for comparing the acquired moiré patterns with reference moiré patterns. In case the match fails, the document will not be authenticated and the document handling device of the apparatus 354 will reject the document. The comparing system 353 can be realized by a microcomputer comprising a processor, memory and input-output ports. An integrated one-chip microcomputer can be used for that purpose. For automatic authentication, the image acquisition means 352 needs to be connected to the microcomputer incorporating the comparing processor 353, which in turn controls a document handling device 354 for accepting or rejecting a document to be authenticated, according to the comparison operated by the microprocessor.

The reference moiré pattern image can be obtained either by image acquisition (for example by means of a camera) of the superposition of a sample base layer and the revealing layer, or it may be computed as a preprocessing step by superposing in a bytemap the basic layer and the revealing layer at the desired position(s) and angle(s). Multiple positions and/or angles may correspond to different moiré patterns and allow a more thorough authentication.

The comparing processor makes the image comparison by matching the acquired moiré pattern image with a reference image; examples of ways of carrying out this comparison have been presented in detail by Amidor and Hersch in U.S. Pat. No. 5,995,638. This comparison produces at least one proximity value giving the degree of proximity between the acquired moiré patterns and a reference moiré pattern image. These proximity values are then used as criteria for making the document handling device accept or reject the document.

Figure 36:
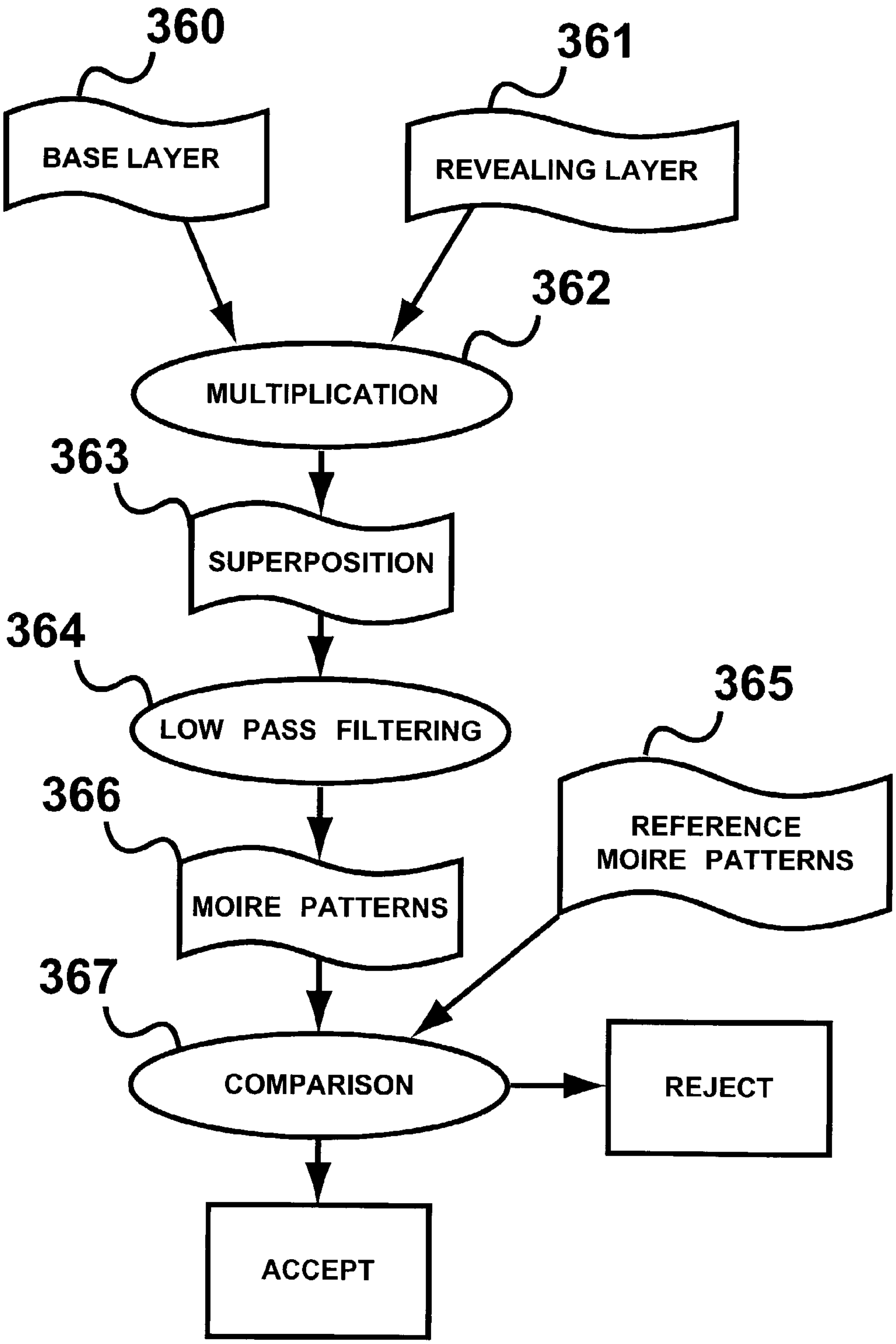
FIG. 36 shows a flow chart of the operations performed by program modules running on a computing system operable for authenticating documents.

Computing System for the Authentication of Documents Using the Moiré Pattern Image The presented apparatus may also be replaced by a computing system in order to allow the revealing line grating (revealing layer, see FIG. 36, 361) to be superposed electronically on the acquired base layer image (FIG. 36, 360). The superposition is simply an integer multiplication operation (FIG. 36, 362) between the revealing line grating bitmap and the correctly positioned base layer image acquired by the camera. At the place where the revealing line grating is transparent ("1"), corresponding base layer pixels will appear and at places where the revealing line grating is opaque ("0") black pixels will be generated instead of the corresponding base layer pixels. The resulting multi-intensity image representing the digital image of the superposition of base layer and revealing layer (FIG. 36, 363) is then filtered with a low pass filter (FIG. 36, 364) in order to eliminate high frequencies, i.e. frequencies which would not be visible by the human eye or by a camera from a normal viewing distance (such a filter is described in the paper V Ostromoukhov and R. D. Hersch, Multi-color and artistic dithering, SIGGRAPH Annual Conference, 1999, pp. 425–432). The resulting filtered multi-intensity image is the moiré pattern image (FIG. 36, 366) and may be compared (FIG. 36, 367) with a reference moiré pattern image (FIG. 36, 365) in order to decide if the document is to be accepted or rejected.

The computing system for the authentication of documents by moiré patterns will therefore comprise an image acquisition means (similar to FIG. 35, 352), e.g. a camera, for the acquisition of documents with a base layer comprising base bands, said base bands comprising patterns. It further comprises a program module multiplying in memory the acquired base layer image with a corresponding revealing layer image comprising a line grating and producing the digital image of the superposition of base layer and revealing layer. It further comprises a program module performing a low-pass filtering operation to that digital image in order to obtain the moiré patterns. It also comprises a program module comparing the computed moiré patterns with reference moiré patterns and according to the comparison, accepting or rejecting the document.

Such a computing system allows to automatically authenticate documents having base layer geometric layouts which possibly vary from one document to the next and therefore offer a much stronger protection against counterfeiting attempts. To each document base layer geometric layout corresponds a given geometric layout of the revealing layer which when electronically superposed (i.e. multiplied) produces the expected (reference) moiré patterns. The document may comprise information, such as a bar code or a computer readable number identifying the revealing layer to be applied. The computing system may read that information and apply the correct revealing layer in order to compute the moiré pattern image and compare it with the corresponding reference moiré pattern image in order to decide if the document is to be accepted or rejected.

Advantages of the Present Invention

The advantages of the new authentication and anti-counterfeiting methods disclosed in the present invention are numerous.

1. The present invention has the important advantage compared with previous inventions made by I. Amidror and R. D. Hersch (U.S. Pat. No. 6,249,588 and its continuation-in-part U.S. Pat. No. 5,995,638, U.S. patent application Ser. No. 09/902,445) and by I. Amidror (U.S. patent application Ser. No. 10/183,550) that the revealing line grating allows much more light to pass though than a revealing 2D dot screen (master screen). This allows to authenticate a document in reflective mode without needing neither a microlens array, nor a special light source beneath the document. A further advantage resides in the fact that in the present invention the length of the base band space is not limited and that therefore the produced moiré may comprise a large number of patterns, for example many typographic characters forming a text sentence (several words) or a paragraph of text.

2. The present invention offers a large degree of freedom in incorporating patterns into the base bands. Patterns may vary strongly along a base band and may also slightly vary across different base bands.

3. Since the moiré patterns can be revealed in reflective mode, patterns incorporated into the base bands may incorporate opaque inks, such as metallic inks. Metallic inks have the additional advantage of yielding specially strong moiré patterns at specular light reflection angles. In addition, the base bands may be printed on totally opaque materials, such as metallic foils or metallic boxes.

4. Curvilinear band gratings and curvilinear band moiré patterns can be generated by applying geometric transformations to the base layer and possibly to the revealing layer. Such curvilinear band gratings may incorporate many different orientations and frequencies, which may generate undesired secondary moirés when scanned by a scanning device (color photocopier, desktop scanner). If the curvilinear band grating contains a large range of gradually varying frequencies, the falsifier's scanning or reproduction frequencies will clash with some of the band grating frequencies or their harmonics and generate in the falsified document highly visible undesired moiré effects (similar to the effects described in United Kingdom Pat. No. 1,138,011 as mentioned above in the section "background of the invention"). In addition, curvilinear moirés tend to strongly enlarge specific parts of the curvlinear base layer and have a smaller enlargement on other parts. The strong enlargement may be useful for visualizing complex microstructure patterns (.e.g including color microstructures) embedded in the base bands.

5. When non-standard inks are used to create the pattern in the bands of the base layer, standard cyan, magenta, yellow and black reproduction systems will need to halftone the original color according to their own halftoning algorithms and thereby destroying the original color patterns. Due to the destruction of the patterns within the bands of the base layer, the revealing layer will not be able to yield the original moiré patterns.

6. Base bands may be populated with opaque color patterns printed side by side at a high registration accuracy, for example with the method described in U.S. patent application Ser. No. 09/477,544 (Ostromoukhov, Hersch). Since the moiré patterns generated between by the superposition of the base grating and of the revealing line grating are very sensitive to any microscopic variations of the pattern residing in the base bands of the base layer, any document protected according to the present invention is very difficult to counterfeit. The revealed moiré patterns serve as a means to easily distinguish between a real document and a falsified one.

7. A further important advantage of the present invention is that it can be used for authenticating documents printed on any kind of support, including paper, plastic materials, etc., which may be opaque or transparent. Furthermore, the present invented method can be incorporated into halftoned B/W or color images (simple constant images, tone or color gradations, or complex photographs). Because it can be produced using the standard original document printing process, the present method offers high security without additional cost.

8. Furthermore, the base layer printed on the document in accordance with the present invention need not be of a constant intensity level. On the contrary, it may include in its base bands patterns possibly of gradually varying sizes and shapes or having a pattern foreground and background of variable intensity. These patterns can be incorporated (or dissimulated) within any variable intensity halftoned image on the document (such as a photograph, a portrait, a landscape, or any decorative motif, which may be different from the motif generated by the moiré patterns in the superposition). When varying the patterns along a base band, the corresponding moiré patterns will also vary within their moiré bands. Similarly, the color within the base bands may be also gradually varied according to its position. The corresponding color moiré patterns will then also vary within their moiré bands. Each of these variants has the advantage of making falsifications still more difficult, thus further increasing the security provided by the present invention.

9. In addition, one can create a base layer with different base bands placed in different regions of a document according to specific masks or with the different base bands placed on top of one another. This enables creating moiré patterns which may have different orientations, shapes, intensities and possibly colors and which may be revealed by a revealing layer incorporating either a single revealing line grating or multiple revealing line gratings. The superposition of different base band patterns may allow to hide some of the base band patterns, providing thereby support for covert means of protection, only detectable by the competent authorities or by specialized authentication devices.

10. One further advantage of the invention resides in its capability of creating dynamic moiré patterns which vary when the base layer and the revealing layer are shifted or rotated one in respect to the other. By varying smoothly the patterns located within the base bands, one may create smoothly varying moiré patterns. As an alternative, by incorporating into the base bands at different phases different variants of base band patterns, one may create multi-pattern moirés whose shapes intensities or colors may smoothly or strongly vary when shifting the revealing layer on top of the base layer. Such a variation in the produced moiré pattern shapes, intensities and/or colors may become a reference and provide an easy means of authenticating a document or a valuable article.

11. A further advantage lies in the fact that moiré patterns revealed from a variable intensity (or color) image may represent a code which can be used to check the authenticity of the document. This is particularly useful to protect for example an identity document as well as the photograph of its holder. Without revealing layer, the photograph is apparent. With a revealing layer, the moiré patterns incorporating the verification code becomes apparent.

12. The incorporation of base band patterns into a variable intensity (or color) image may provide a second level of tiny microstructure patterns which, when revealed by a revealing line grating, produce moiré patterns giving information related to the validity of document incorporating that image, e.g. a travel document with departure, arrival and validity information or an entrance ticket with the event name and the data of validity of the ticket.

13. Geometric transformations allow to create a large number of base band designs according to different critera (e.g. the geometric layout of base band gratings may change each month), which are revealed by corresponding transformed revealing line gratings. This large variety of design capabilities makes it very difficult for potential counterfeiters to continuously adapt faked designs to new geometric transformations.

REFERENCES CITED

U.S. Patent Documents

U.S. Pat. No. 5,995,638 (Amidror, Hersch), November 1999. Methods and apparatus for authentication of documents by using the intensity profile of moiré patterns, due assignee EPFL.

U.S. Pat. No. 6,249,588 (Amidror, Hersch), June 2001. Method and apparatus for authentication of documents by using the intensity profile of moiré patterns, due assignee EPFL.

U.S. Pat. No. 5,018,767 (Wicker), May 1991. Counterfeit protected document.

U.S. Pat. No. 5,396,559 (McGrew), March 1995. Anticounterfeiting method and device utilizing holograms and pseudorandom dot patterns.

U.S. Pat. No. 5,712,731 (Drinkwater et. al.), January 1998, Security device for security documents such as bank notes and credit cards.

U.S. Pat. No. 5,032,003, (Antes), July 1991, Optically variable surface pattern.

U.S. Pat. No. 4,984,824 (Antes and Saxer), January 1991, Document with an optical diffraction safety element.

U.S. Pat. No. 4,761,253 (Antes), July 1998, Method and apparatus for producing a relief pattern with a microscopic structure, in particular having an optical diffraction effect U.S. Pat. No. 6,273,473, Self-verifying security documents, (Taylor, Hardwick; Bruce, Jackson, Wayne, Zientek, Hibbert, Cameron), August 2001, U.S. patent application Ser. No. 09/477,544 (Ostromoukhov, Hersch). Method and apparatus for generating digital halftone images by multi color dithering. filed 4 Jan. 2000, due assignee EPFL.

U.S. patent application Ser. No. 09/902,445, (Amidror and Hersch), June 2001, Authentication of documents and valuable articles by using the moiré intensity profile, filed 11 Jun. 2001, due assignee EPFL.

U.S. patent application Ser. No. 09/902,227, July 2001 (R. D. Hersch and B. Wittwer), Method and computing system for creating and displaying images with animated microstructures, filed 11 Jul. 2001, due assignee EPFL.

U.S. patent application Ser. No. 09/998,229 Images and security documents protected by microstructures, inventors R. D. Hersch, E. Forler, B. Wittwer, P. Emmel, filed 3 Dec. 2001, due assignee EPFL and its successor application PCT application PCT/IB02/02686, R. D. Hersch, B. Wittwer, E. Forler, P. Emmel, D. Biemann, D. Gorostidi filed Jul. 5, 2002.

U.S. patent application Ser. No. 10/183,550, June 2002 Amidror, "Authentication with build-in encryption by using moiré intentsity profiles between random layers, filed 28 Jun. 2002, due assignee EPFL.

European Patent application 99 114 740.6, published as EP1073257A1, Method for generating a security document, inventors R. D. Hersch, N. Rudaz, filed Jul. 28, 1999, due assignee Orell-Füssli and EPFL.

Foreign Patent Documents

United Kingdom Patent No. 1,138,011 (Canadian Bank Note Company), December 1968. Improvements in printed matter for the purpose of rendering counterfeiting more difficult.

Other Publications

I. Amidror and R. D. Hersch, Fourier-based analysis and synthesis of moirés in the superposition of geometrically transformed periodic structures, Journal of the Optical Society of America A, Vol. 15, 1998; pp. 1100–1113.

I. Amidror, The Theory of the Moiré Phenomenon, Kluwer Academic Publishers, 2000, p. 21, pp 353–360, I. Amidror, R. D. Hersch, Quantitative analysis of multichromatic moiré effects in the superposition of coloured periodic layers, Journal of Modern Optics, Vol. 44, No. 5, 1997, 883–899

R. N. Bracewell, Two Dimensional Imaging, Prentice Hall, 1995, pp. 120–122, 125–127

W. Hospel, Application of laser technology to introduce security features on security documents in order to reduce counterfeiting, SPIE Vol. 3314, 1998, pp. 254–259.

H. R. Kang, Digital Color Halftoning, SPIE Press, 1999, pp. 214–225, 279–282,

O. Mikami, New imaging functions of Moiré by fly's eye lenses, Japan Journal of Applied Physics, Vol. 14, No. 3, 1975; pp. 417–418.

O. Mikami, New image-rotation using Moiré lenses, Japan Journal of Applied Physics, Vol. 14, No. 7, 1975; pp. 1065–1066.

J. F. Moser, Document Protection by Optically Variable Graphics (Kinemagram), in Optical Document Security, Ed. R. L. Van Renesse, Artech House, London, 1998, pp. 247–266

K. Patorski, The moiré Fringe Technique, Elsevier 1993, pp. 14–21

G. Oster, The Science of moiré Patterns, Edmund Scientific, 1969.

V. Ostromoukhov and R. D. Hersch, Artistic screening, SIGGRAPH Annual Conference, 1995, pp. 219–228.

V. Ostromoukhov and R. D. Hersch, Multi-color and artistic dithering, SIGGRAPH Annual Conference, 1999, pp. 425–432.

N. Rudaz, R. D. Hersch, Protecting identity documents with a just noticeable microstructure, Conf. Optical Security and Counterfeit Deterrence Techniques IV, 2002, SPIE Vol. 4677, pp. 101–109.

B. Saleh, M. C. Teich, Fundamentals of Photonics, John Wiley, 1991, p. 116
Thomas Sederberg, "A Physically Based Approach to 2D Shape Blending", Proc. Siggraph '92, Computer Graphics, Vol 26. No. 2, July 1992, 25–34.
Oleg Veryovka and John Buchanan, "Texture-based Dither Matrices" Computer Graphics Forum Vol. 19, No. 1, pp 51–64,

We claim:

1. A device for authenticating items selected from the group of documents and articles, said device comprising (a) a base layer comprising base bands that are repeated along one direction only, said base bands comprising therealong a non-repetitive sequence of base band patterns having specific shapes, and (b) a revealing layer comprising a revealing line grating, where the superposition of the base bands and the revealing layer produces moire patterns having specific shapes, which are a transformation of the base band patterns' specific shapes, the transformation comprising an enlargement in one direction only of said base band patterns' specific shapes, and where the presence of said moire pattern specific shapes indicates that said items are authentic.

2. The device of claim 1, where the enlargment is along one orientation, said enlargment being specified by a scaling factor d which depends on base band period T1, on line grating period T2 and on relative angle θ between the base band and the line grating orientations.

3. The device of claim 2, where the scaling factor d is given by $d=(x_i-\lambda)/x_i$, where $\lambda=T1/\tan\theta$ and where $x_i=(T1/\tan\theta)-(T2/\sin\theta)$, the scaling factor becoming after algebraic simplification $d=T2/(T2-T1\cos\theta)$.

4. The device of claim 1, where at least one set of base bands is curvilinear.

5. The device of claim 1, where the revealing line grating is curvilinear.

6. The device of claim 1, where the base layer and the revealing layer are non-linearly geometrically transformed according to a set of transformation parameters, the set of transformation parameters enabling the individualization of said device.

7. The device of claim 1 where the base layer comprises multiple sets of base bands characterized by different parameters selected from the group of orientation parameters, period parameters and geometric transformation parameters.

8. The device of claim 1, where the revealing line grating comprises lines selected from the group of continuous lines, dotted lines, interrupted lines and partially perforated lines.

9. The device of claim 1, where the base layer comprises multiple interlaced pattern shapes and where shifting the revealing layer on top of the base layer produces moire pattern shapes which comprise transformed and blended instances of the multiple interlaced patterns.

10. The device of claim 1, where the specific moire pattern shapes are memorized reference moire pattern shapes seen previously in a superposition of a base layer and a revealing layer in items that are known to be authentic.

11. The device of claim 1, where the base layer is imaged on an opaque support and the revealing layer on a transparent support.

12. The device of claim 1, where the base layer and the revealing layer are located on two different parts of said item, thereby enabling the visualization of the moire pattern shapes to be performed by superposition of the base layer and of the revealing layer of said item.

13. The device of claim 1, where the base layer is created by a process for transferring an image onto a support, said process being selected from the set comprising lithographic, photolithographic, photographic, electrophotographic, engraving, etching, perforating, embossing, ink jet and dye sublimation processes.

14. The device of claim 1, where the base layer is embodied by an element selected from the set of transparent devices, opaque devices, optically variable devices and diffractive devices.

15. The device of claim 1, where the revealing layer is an element selected from the group comprising an opaque surface with transparent lines, cylindric microlenses and a diffractive device emulating the behavior of cylindric microlenses.

16. The device of claim 1, whose base layer is located on an item selected from the group comprising banknote, check, trust paper, identification card, passport, travel document, ticket, optical disk, product, label affixed on a product and package of a product.

17. The device of claim 16, where at least one layer selected from the set comprising the base layer and the revealing layer is located on the product, and where at least one other layer selected from the same set is located on the product's package.

18. The device of claim 1, where the base layer pattern shapes comprise colors which gradually vary according to their position, thereby generating in the layer superposition moire pattern shapes which vary in their colors according to their position.

19. The device of claim 1, where the base layer pattern shapes vary according to their position, thereby generating in the layer superposition moire pattern shapes which also vary according to their position.

20. The device of claim 1, where the base layer pattern shapes vary according to local intensity and form a variable intensity image.

21. The device of claim 1, where the base layer pattern shapes vary according to local color and form a variable color image.

22. The device of claim 1, where the base layer comprises an image dithered with a dither matrix incorporating base band pattern shapes, where without revealing layer the image appears and with the revealing layer moire pattern shapes appear which allow to verify the authenticity of the item.

23. The device of claim 22, where the image is the photograph of the document holder and where the revealed moire pattern shapes are related to information printed on the document.

24. The device of claim 1 where the base layer pattern shapes are printed using at least one non-standard ink, thus making its faithful reproduction difficult using the standard cyan, magenta, yellow and black inks available in common photocopiers and desktop systems, said non-standard ink being selected from the set comprising out of gamut color inks, opaque inks, fluorescent inks, iridescent inks, metallic inks and inks visible under UV light.

* * * * *